United States Patent
Liu et al.

(10) Patent No.: US 12,095,108 B2
(45) Date of Patent: Sep. 17, 2024

(54) ELECTRIC ENERGY STORAGE DEVICE AND ELECTRIC TOOL SYSTEM

(71) Applicant: Globe (Jiangsu) Co., Ltd., Changzhou (CN)

(72) Inventors: Chuanjun Liu, Changzhou (CN); Xinzhong Guo, Changzhou (CN); An Yan, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 577 days.

(21) Appl. No.: 17/344,934

(22) Filed: Jun. 10, 2021

(65) Prior Publication Data

US 2021/0305653 A1   Sep. 30, 2021

Related U.S. Application Data

(63) Continuation of application No. PCT/CN2019/114239, filed on Oct. 30, 2019.

(30) Foreign Application Priority Data

Dec. 20, 2018   (CN) .......................... 201811564074.2
Dec. 20, 2018   (CN) .......................... 201811564236.2
(Continued)

(51) Int. Cl.
*H01M 50/269*   (2021.01)
*B25F 5/00*   (2006.01)
(Continued)

(52) U.S. Cl.
CPC ............. *H01M 50/269* (2021.01); *B25F 5/00* (2013.01); *B25F 5/02* (2013.01); *B25F 5/023* (2013.01);
(Continued)

(58) Field of Classification Search
CPC ............. H01M 50/269; H01M 50/247; H01M 50/519; H01M 50/50; H01M 50/509;
(Continued)

(56) References Cited

U.S. PATENT DOCUMENTS 3,886,426 A     5/1975   Daggett
2011/0250484 A1   10/2011   Meng
(Continued)

FOREIGN PATENT DOCUMENTS

CN   204190691 U   3/2015
CN   107078533 A   8/2017
(Continued)

*Primary Examiner* — Jane J Rhee

(57) ABSTRACT

An electric energy storage device, comprising N energy units with a same rated voltage and provided with a socket, wherein the N energy units are equally divided into M energy modules. Each energy module comprises K energy units, wherein M≥2 and K≥2, and can be switched between parallel and series connection states. The disclosure also provides an electric tool system, wherein the electric tools with different rated voltages have different plugs, and the electric energy storage device outputs different voltages after connecting with the socket. The electric energy storage device with multiple output voltages can be suitable for electric energy storage devices with different rated voltages, and reduces the cost.

19 Claims, 43 Drawing Sheets

(30) Foreign Application Priority Data

| Dec. 20, 2018 | (CN) | 201811564279.0 |
| Dec. 20, 2018 | (CN) | 201811566089.2 |
| Dec. 20, 2018 | (CN) | 201822145919.6 |
| Dec. 20, 2018 | (CN) | 201822145933.6 |
| Dec. 20, 2018 | (CN) | 201822146566.1 |
| Dec. 20, 2018 | (CN) | 201822146585.4 |
| Dec. 20, 2018 | (CN) | 201822146597.7 |

(51) Int. Cl.

| B25F 5/02 | (2006.01) |
| H01M 10/04 | (2006.01) |
| H01M 10/42 | (2006.01) |
| H01M 10/46 | (2006.01) |
| H01M 50/204 | (2021.01) |
| H01M 50/247 | (2021.01) |
| H01M 50/50 | (2021.01) |
| H01M 50/509 | (2021.01) |
| H01M 50/519 | (2021.01) |
| H01M 50/543 | (2021.01) |
| H01R 13/05 | (2006.01) |
| H01R 13/11 | (2006.01) |
| H02J 7/00 | (2006.01) |

(52) U.S. Cl.
CPC ... *H01M 10/0445* (2013.01); *H01M 10/4207* (2013.01); *H01M 10/46* (2013.01); *H01M 50/204* (2021.01); *H01M 50/247* (2021.01); *H01M 50/50* (2021.01); *H01M 50/509* (2021.01); *H01M 50/519* (2021.01); *H01M 50/543* (2021.01); *H01R 13/05* (2013.01); *H01R 13/113* (2013.01); *H02J 7/0024* (2013.01); *H02J 7/0063* (2013.01); *H01M 2220/30* (2013.01)

(58) Field of Classification Search
CPC ............ H01M 50/543; H01M 50/204; H01M 10/0445; H01M 10/4207; H01M 10/46; H01M 2220/30
See application file for complete search history.

(56) References Cited

U.S. PATENT DOCUMENTS

| 2012/0133310 | A1 | 5/2012 | Lee |
| 2015/0100259 | A1* | 4/2015 | Driemeyer-Franco ........ G01R 31/3842 702/63 |
| 2016/0020443 | A1 | 1/2016 | White et al. |
| 2016/0126533 | A1 | 5/2016 | Velderman et al. |
| 2016/0204475 | A1 | 7/2016 | White et al. |
| 2016/0336558 | A1 | 11/2016 | White et al. |
| 2016/0336559 | A1 | 11/2016 | White et al. |
| 2017/0072553 | A1 | 3/2017 | Bakker |
| 2017/0104243 | A1 | 4/2017 | Velderman et al. |
| 2017/0149372 | A1 | 5/2017 | White et al. |
| 2017/0170671 | A1* | 6/2017 | Mergener .............. H02J 7/0048 |
| 2017/0222454 | A1 | 8/2017 | Bakker |
| 2017/0338452 | A1 | 11/2017 | Varipatis et al. |
| 2018/0076651 | A1 | 3/2018 | Cox et al. |
| 2018/0076652 | A1 | 3/2018 | Cox et al. |
| 2018/0076754 | A1 | 3/2018 | White et al. |
| 2018/0262150 | A1 | 9/2018 | White et al. |
| 2018/0262151 | A1 | 9/2018 | White et al. |
| 2018/0262152 | A1 | 9/2018 | White et al. |
| 2018/0278196 | A1 | 9/2018 | White et al. |

FOREIGN PATENT DOCUMENTS

| JP | S6424370 A | 1/1989 |
| WO | WO2018079722 A1 | 5/2018 |
| WO | WO2018079723 A1 | 5/2018 |
| WO | WO2018098628 A1 | 6/2018 |

* cited by examiner

ELECTRIC ENERGY STORAGE DEVICE AND ELECTRIC TOOL SYSTEM

CROSS REFERENCE TO RELATED APPLICATIONS

The present application is a Continuation Application of PCT application No. PCT/CN2019/114239 filed on Oct. 30, 2019, which claims the benefit of CN201811564279.0 filed on Dec. 20, 2018, CN201811564074.2 filed on Dec. 20, 2018, CN201811566089.2 filed on Dec. 20, 2018, CN201811564236.2 filed on Dec. 20, 2018, CN201822146585.4 filed on Dec. 20, 2018, CN201822146597.7 filed on Dec. 20, 2018 CN201822145919.6 filed on Dec. 20, 2018, CN201822146566.1 filed on Dec. 20, 2018, CN201822145933.6 filed on Dec. 20, 2018. All the above are hereby incorporated by reference.

TECHNICAL FIELD

The disclosure relates to the technical field of electric tools, and more particular to an electric energy storage device and an electric tool system using the same.

BACKGROUND

In the garden machinery and electric tool industries, electric tools usually have a rated working voltage, which means electric tools with different voltage platforms require battery packs with different voltages to provide electric. Therefore, different battery packs need to be prepared to adapt to electric tools with different rated voltages, which causes a high cost and a waste of resources.

Therefore, it is necessary to provide a kind of improved electric energy storage device and an electric tool system using the electrical energy storage device to solve the above problems.

SUMMARY

In an aspect of this disclosure, an electric energy storage device with multiple output voltages and an electric tool system using the electric energy storage device are provided.

Provided is a kind of electric energy storage device, comprising N energy units with a same rated voltage and a socket. The N energy units are equally divided into M energy modules, and each energy module includes K energy units, Wherein M≥2 and K≥2. The K energy units in each energy module is capable of being switched to connect to each other in series or in parallel.

In an embodiment, the socket includes an in-module control unit corresponding to the energy module, and the in-module control unit includes a plurality of parallel switches connecting the K energy units in parallel connection and one or a plurality of series switches connecting the K energy units in series connection corresponding to each of the energy modules.

when the plurality of the parallel switches is switched on and the one or the plurality of the series switches is switched off, the K energy units are connected in parallel; and when the plurality of the parallel switches is switched off and the one or the plurality of the series switches is switched on, the K energy units are connected in series.

In an embodiment, the in-module control unit includes 2*(K−1) parallel switches, and the parallel switches are respectively connected to electrodes of the K energy units with a same polarity of the K energy units in pairs. And the in-module control unit includes (K−1) series switches, the series switches are respectively connected to electrodes with different polarities of the K energy unit in pairs.

In an embodiment, the parallel switches normally switch off, the series switch(es) normally switches on, and the K energy units in the energy module are connected in parallel in an initial state. Or the parallel switches normally switch on, the series switch(es) normally switches off, and the K energy units in the energy module are connected in series in a initial state.

In an embodiment, the socket further comprises an inter-module control unit, which comprises a parallel switch connecting M of the energy modules in parallel and a series switch connecting M of the energy modules in series. When the parallel switch of the inter-module control unit switches on and the series switch of the inter-module control unit switches off, the M energy modules are connected in parallel. When the parallel switch of the inter-module control unit switches off and the series switch switches on, the M energy modules are connected in series.

In an embodiment, the socket further comprises two voltage output terminals.

In an embodiment, each of the energy units is provided with a positive electrode and a negative electrode. The socket includes eight electrode terminals set independently which include four positive terminals connected to positive electrodes of the four energy units and four negative terminals connected to negative electrodes of the four energy units.

In an embodiment, a number of output voltage of the electric energy storage device is equal to the number of factors of N.

In an embodiment, when N≥8, the energy units can be equally divided into multi-level modules. Each level of energy modules includes 2 or 3 secondary modules, and energy module with the lowest level includes 2 or 3 energy units.

An electric tool system is provided, comprising an electric tool and an electric energy storage device; the electrical energy storage device includes N energy units with a same rated voltage. The N energy units are equally divided into M energy modules, and each of the energy modules includes K energy units, wherein M≥2 and K≥2. The K energy units in each energy module is capable of being switched to connect to each other in series or in parallel. The electrical energy storage device further comprises a socket; and the electric tool is provided with a plug that matches with the socket In an embodiment, the socket includes an in-module control unit corresponding to each of the energy modules, and the in-module control unit includes a plurality of parallel switches connecting the K energy units in parallel connection and one or a plurality of series switches connecting the K energy units in series connection. When the plurality of the parallel switches is switched on and the one or the plurality of the series switches is switched off, the K energy units are connected in parallel; and when the plurality of the parallel switches is switched off and the one or the plurality of the series switches is switched on, the K energy units are connected in series.

In an embodiment, the plug is provided with an internal switching part which cooperates with the in-module control unit, and simultaneously switches the parallel connection state and the series connection state of the in-module control unit, which makes the K energy units in the energy module switch from parallel connection to series connection or from series connection to parallel connection.

In an embodiment, the internal switching part includes an insulating part and a conductive part. One kind of the parallel switch and the series switch of the in-module control unit is initially closed and disconnected by the insulating part, and the other one is initially opened and connected by the conductive part.

In an embodiment, the socket further comprises an inter-module control unit which comprises a parallel switch connecting M of the energy modules in parallel and a series switch connecting M of the energy modules in series. When the parallel switch is switched on and the series switch is switched off, M of the energy modules are connected in parallel; and when the parallel switch is switched off and the series switch is switched on, M of the energy modules are connected in series.

In an embodiment, the plug is provided with an external switching part, which cooperates with the inter-module control unit and switches connection states of the parallel switch and the series switch of the inter-module control unit, which makes the M energy units switch from parallel to series or from series to parallel.

In an embodiment, the external switching part includes an insulating part and a conductive part. One kind of the parallel switch and the series switch of the inter-module control unit is initially closed and disconnected by the insulating part, and the other one is initially opened and connected by the conductive part.

In an embodiment, each of the energy modules is provided with a positive electrode and a negative electrode of the energy modules. The plug includes 2*M voltage output terminals which respectively connected to the positive electrode and the negative electrode of the energy modules. The plug is provided with a connecting piece connected with the voltage output terminal, and a series or a parallel connection between the M energy modules can be determined by the connecting piece.

An electric tool system is provided, comprising a low-voltage electric tool, a medium-voltage electric tool and a high-voltage electric tool, wherein: the electric tool system comprises the electric energy storage device according to any one above. The low-voltage electric tool is provided with a low-voltage plug which is connected with the socket and makes the N energy units in a full parallel connection state, the medium-voltage electric tool is provided with a medium-voltage plug which is connected to the socket and makes the N energy units in a medium-voltage state, and the high-voltage electric tool is provided with a high-voltage plug, which is connected to the socket and makes the N energy units in a full series connection state.

In an embodiment, in the medium-voltage state, K of the energy units in the energy module are connected in series, and M of the energy modules are connected in parallel, which correspond to an output voltage of K*nV. Or in the medium-voltage state, K of the energy units in the energy module are connected in parallel, and M of the energy modules are connected in series, which correspond to the output voltage M*nV.

In an embodiment, the electric tool system further comprises a low-voltage battery pack connected with the low-voltage electric tool, a medium-voltage battery pack connected with the medium-voltage electric tool, or a high-voltage battery pack connected with the high-voltage electric tool.

The electric energy storage device and the electric tool system of the disclosure provide a variety of output voltages, which increases the application range of the electric energy storage device and reduces the cost.

DETAILED DESCRIPTION

Figure 1:
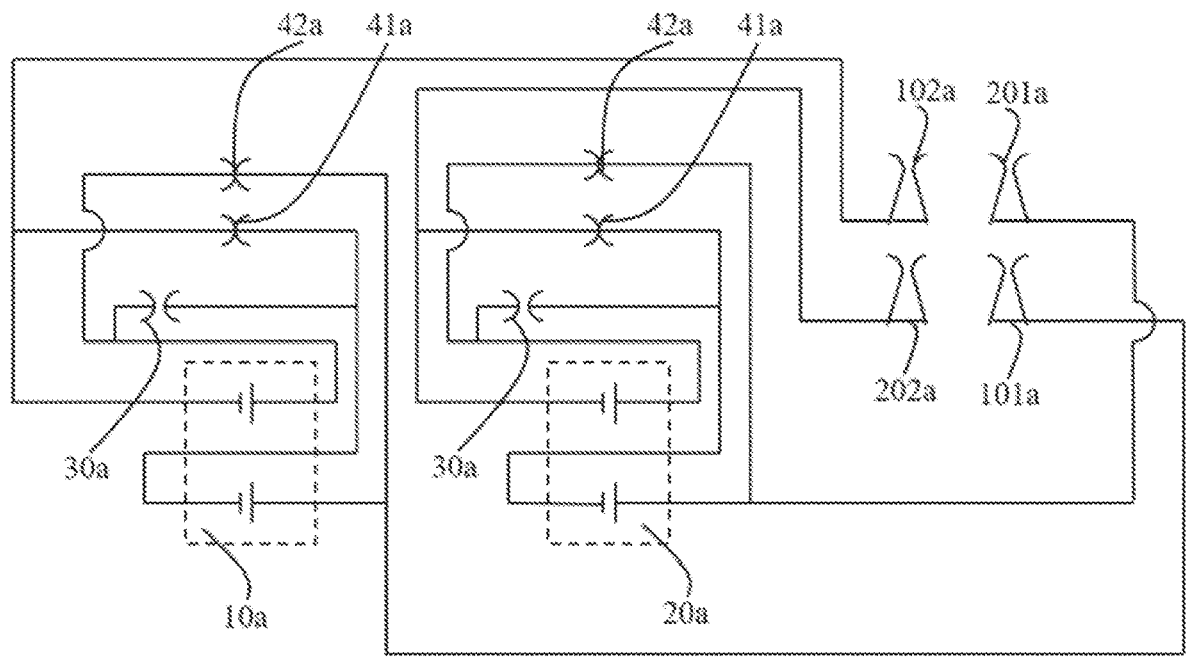
FIG. 1 is a schematic view of the connection of the four internal energy units, according to the first embodiment of the electric energy storage device.

In order to make the objectives, technical solutions, and advantages of the disclosure clearer, the disclosure will be described in detail below with reference to the drawings and specific embodiments.

It should be noted that, in order to avoid obscuring the disclosure due to unnecessary details, only the structure and/or steps closely related to the solution of the disclosure are shown in the drawings, and other details which are not related to the disclosure are omitted.

In addition, it should also be noted that the terms "including", "comprising" or any other variations thereof which means non-exclusive inclusion, mean that a process, method, article or equipment not only includes those elements, but also includes other elements that are not explicitly listed, or also includes inherent elements of the process, method, article, or equipment.

The disclosure provides an electric energy storage device which includes N energy units with equal voltages. An energy unit means a kind of object capable of providing electrical energy, such as a battery cell, a lithium battery or other energy carriers. Of course, multiple batteries can also be combined to form one energy unit; the batteries include, but are not limited to, rechargeable batteries such as lithium batteries, nickel-metal hydride batteries, nickel-cadmium batteries or the like. The rated voltage of the energy unit is nV. It should be noted that the measured voltages of each energy unit are n+5% V, which can be regarded as equal voltages. N is a composite number, which can be divisible by other numbers (except 0) in addition to 1 and itself. N energy units are equally divided into M energy modules, each energy module includes K energy units, wherein N=M*K, M≥2, K≥2, which means that the minimum value of N is 4, 4 energy units can be equally divided into 2 groups, and each group has two energy units.

There are two optional states of the circuit connection among K energy units in the energy module: parallel connection and series connection, and there are also two optional states of the circuit connection among M energy modules: parallel connection and series connection. Therefore, the N energy units of the electric energy storage device have the following four connection states: 1. K energy units in the energy module are connected in parallel, and M energy modules are connected in parallel, so that all N energy units are connected in parallel, which means full parallel state, and the output voltage is nV. 2. K energy units in the energy module are connected in series, and M energy modules are connected in series, so that all N energy units are connected in series which means full series state, and the output voltage is N*nV. 3. K energy units in the energy module are connected in series, and the M energy modules are connected in parallel, which means internal-series and external-parallel state, and the output voltage is K*nV. 4. K energy units in the energy module are connected in parallel, and M energy modules are connected in series, which means internal-parallel and external-series state, and the output voltage is M*nV.

This electric energy storage device can output a rated voltage to match different electric tools. When N is the minimum value 4, the output voltage of the third internal-series and external-parallel connection state and the fourth internal-parallel and external-series connection state are both 2 nV, which means that these four connection states have 3 kinds of output voltages. Therefore, the electric energy storage device can provide at least three kinds of output voltages. It should be noted that in any of the connection states mentioned above, all of energy units work.

Next the specific embodiments of the disclosure will be described below with reference to the accompanying drawings.

First Embodiment

Please refer to FIG. 1 through FIG. 7, a electric energy storage device in the first embodiment of the disclosure includes 4 energy units with a same voltage, and a rated voltage of each energy unit is nV. The 4 energy units are equally divided into two energy modules: the first energy module 10a and the second energy module 20a; each of the first energy module 10a, and the second energy module 20a includes two energy units, which means that corresponding to the situation of N=4, M=2, and K=2 mentioned above, the electric energy storage device can provide 3 output voltages.

The socket (not shown) of the electric energy storage device includes a plurality of voltage output terminals. Each of the first energy module 10a and the second energy module 20a is respectively provided with a positive electrode and a negative electrode, and the plurality of voltage output terminals are set corresponding to the positive and negative electrodes of each energy module, which means that there are 2*M voltage output terminals. In this embodiment, M is 2, so there are 4 voltage output terminals. The four voltage output terminals are: a first voltage output terminal 101a connected to the positive electrode of the first energy module 10a, a second voltage output terminal 102a connected to the negative electrode of the first energy module 10a, and a third voltage output terminal 201a connected to the positive electrode of the second energy module 20a, and a fourth voltage output terminal 202a connected to the negative electrode of the second module 20a. It is understandable that the connection state among the M energy modules can be controlled by controlling the connection mode among the 4 voltage output terminals, and the connection mode among the 4 voltage output terminals can be confirmed by one or more connecting pieces of the plugs, which content will be described in detail later.

The socket (not shown) of the electric energy storage device includes in-module control units. The inter-module control units are set corresponding to each energy module, which means that there are M in-module control units. In this embodiment, M is 2, so there are two in-module control units. The in-module control units are used to control the connection state of the K energy units in the energy module. The in-module control units can be switched by the internal switching part of the docking plug, which part will be detailed later.

The connection between each control unit and the energy unit in the energy module is the same as the other one. The following takes one of the control units as an example for description.

The in-module control units include parallel switches and series switches. The parallel switches connect the positive and negative ends of each energy unit in parallel. Therefore, the number of parallel switches is set to (K−1) pairs corresponding to K energy units, that is, 2*(K−1); each series switch connects each energy unit in series, and the number of the series switches is set to (K−1) corresponds to K energy units. In this embodiment, K is 2, so the in-module control units includes one series switch 30a and two parallel switches 41a, 42a.

All of the series switch 30a and each parallel switch 41a, 42a include two contact parts (not numbered) connected to the electrodes of the energy unit, and the two contact parts of the parallel switches 41a, 42a are respectively connected to electrodes with the same polarity of two energy units. For example, as shown in FIG. 1, the two contact parts of the first parallel switch 41a are respectively connected to the negative poles of the two energy units, and the two contact parts of the second parallel switch 42a are respectively connected to the positive poles of the two energy units. The two contact parts of the first series switch 30a are respectively connected to the electrodes with opposite polarity of the two energy units, and the other two electrodes with opposite polarity in the two energy units are respectively connected to the two voltage output terminals 101a and 102a mentioned above. When the first series switch 30a is turned on, the two energy units can be connected in series; when the parallel switches 41a and 42a are turned on, the two energy units can be connected in parallel.

In this embodiment, the parallel switches 41a, 42a are normally closed switches, and the first series switch 30a is a normally open switch, which means, in a initial state, the parallel switches 41a, 42a are conductive, and the first series switch 30a is disconnected. The two energy units in each energy module 10a and 20a are initially connected in parallel.

It should be noted that the normally closed switch means that in the initial state, its two contact parts are in contact so that the electrodes electrically connected to the two contact parts are connected, and the electrical connection state of the two contact parts can be changed by the action of foreign objects, which makes the two contact parts switch from the contact state to the disconnected state, for example, a normally closed terminal. Normally open switch means that in the initial state, its two contact parts are disconnected so that the electrodes electrically connected to the two contact parts are disconnected, and the electrical connection state of the two contact parts can be changed by the action of foreign objects, which makes the two contact parts switch from the disconnected state to the contact state, for example, a normally open terminal. Of course, the normally open switch is not only limited to the normally open terminal, and the normally closed switch is not only limited to the normally closed terminal. The embodiments that can achieve the same function are all protected by this disclosure.

When the socket of the electric energy storage device of the disclosure is connected with the plug of the docking electric tool, its four voltage output terminals 101a, 102a, 201a, 202a can provide different connection modes so that the two energy modules 10a, 20a can be in series or parallel connection state The connection states of the first series switch 30a and the parallel switches 41a, 42a of the in-module control units can be selectively switched, so that the energy units inside the energy modules 10a, 20a are changed from initial parallel connection to series connection. The following will be explained in conjunction with the figures.

Figure 2:
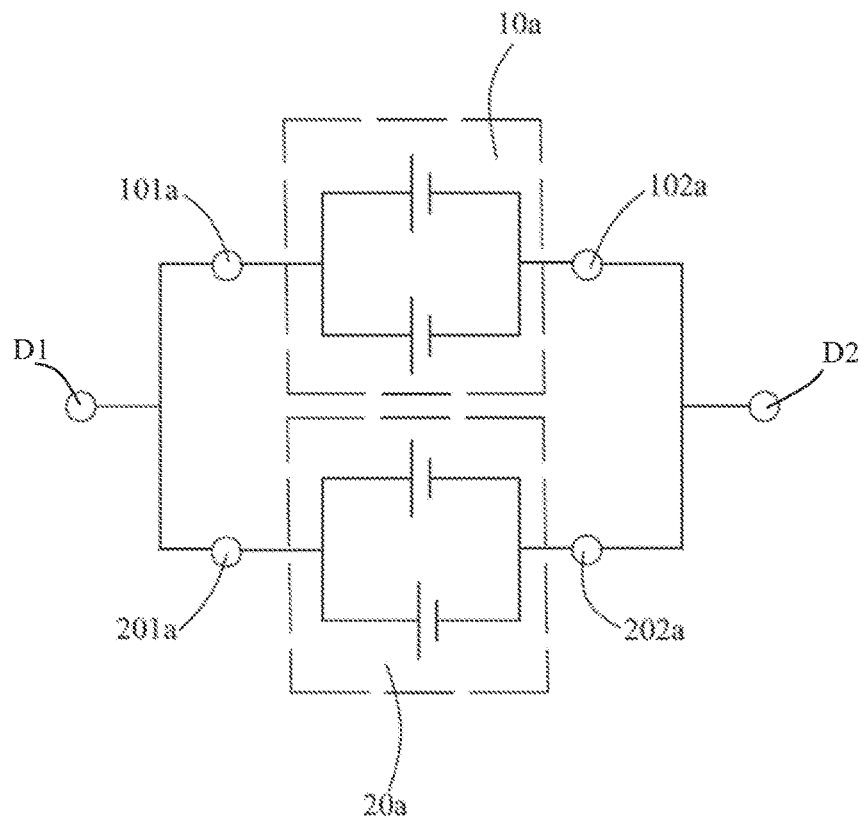
FIG. 2 is a schematic view of the circuit when the electric energy storage device is matched with a low-voltage plug, according to the first embodiment.

Please refer to FIG. 1 and FIG. 2, provided is a low-voltage electric tool (not shown). Its working voltage is nV and it provides a low-voltage plug (not shown). The low-voltage plug provides two connecting pieces D1, D2 which connect voltage output terminals with the same polarity among the 4 voltage output terminals in parallel, and simultaneously the two connecting pieces D1, D2 are as voltage input terminals of the low-voltage plug. For example, as shown in FIG. 2, when the low-voltage plug is matched with the socket, a first connecting piece D1 is connected to the first voltage output terminal 101a and the third voltage output terminal 201a of the positive electrode, and a second connecting piece D2 is connected to the second voltage output terminal 102a and the fourth voltage output terminal 202a of the negative electrode, so that the two energy modules 10a, 20a are connected in parallel and the two energy units in each energy module 10a, 20a are kept in parallel to output a low voltage of nV.

That means, when the low-voltage plug of the low-voltage electric tool is matched with the electric energy storage device, the K energy units in each energy module are connected in parallel through in-module control unit, and the M energy modules are connected in parallel through the connecting pieces of the low-voltage plug. Corresponding to the first full parallel state mentioned above, the output low voltage of the low-voltage electric tool is nV.

Figure 3:
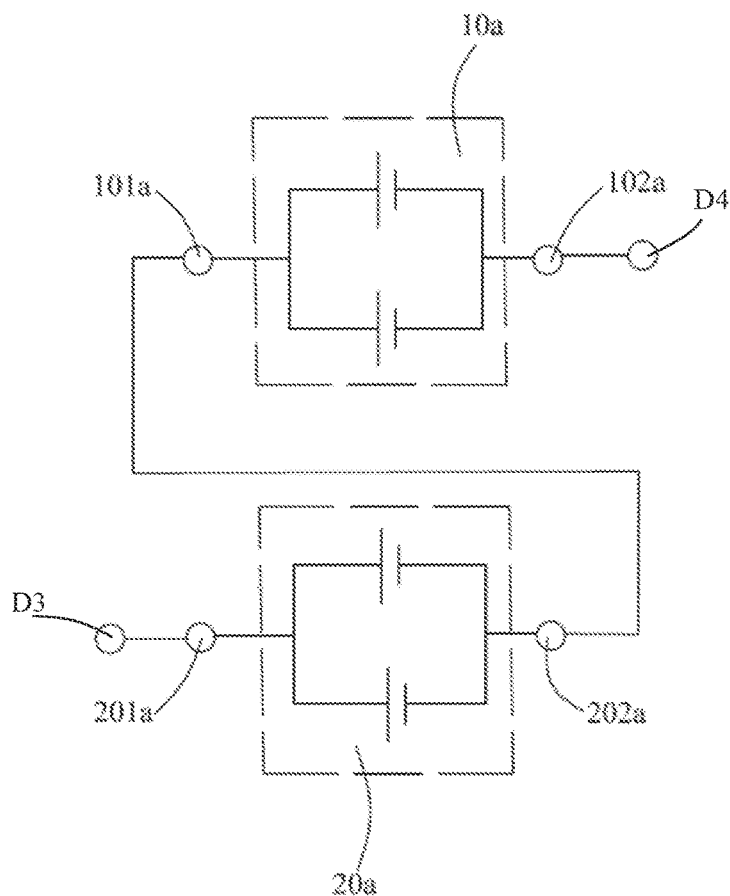
FIG. 3 is a schematic view of the circuit when the electric energy storage device is matched with a medium-voltage plug, according to the first embodiment.
Figure 4:
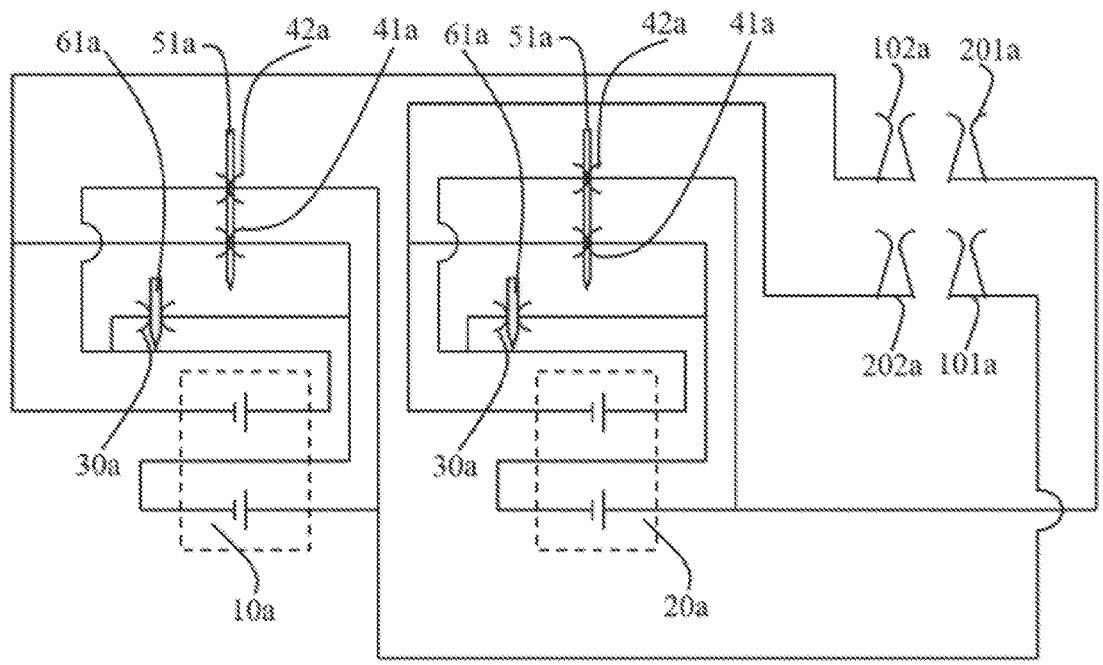
FIG. 4 is a schematic view of the circuit when the electric energy storage device is matched with a high-voltage plug, according to the first embodiment.
Figure 5:
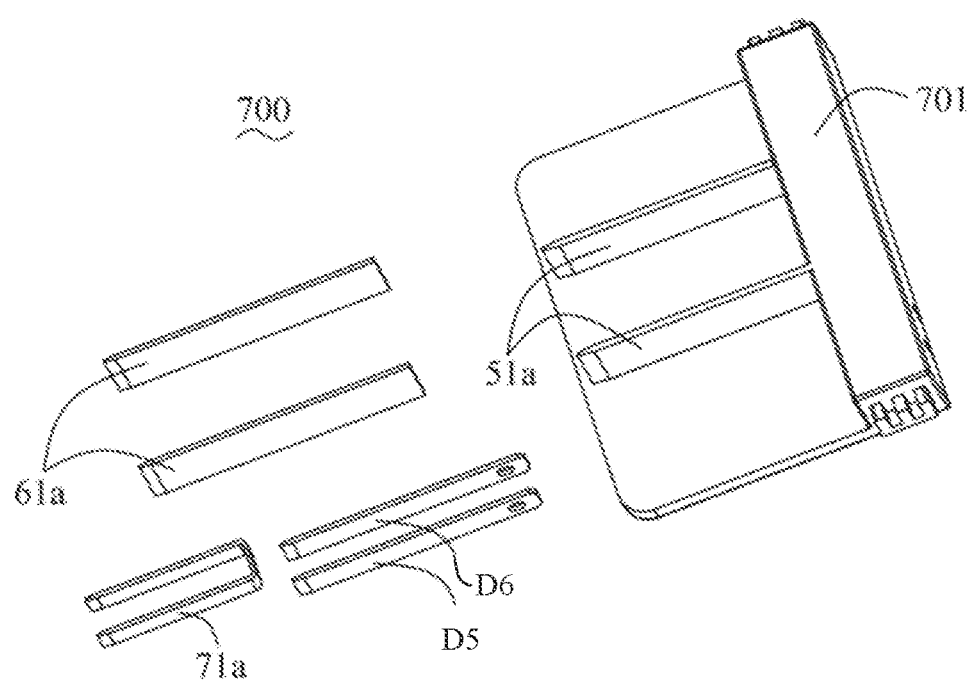
FIG. 5 is a three-dimensional exploded schematic view of the high-voltage plug, according to the first embodiment.
Figure 6:
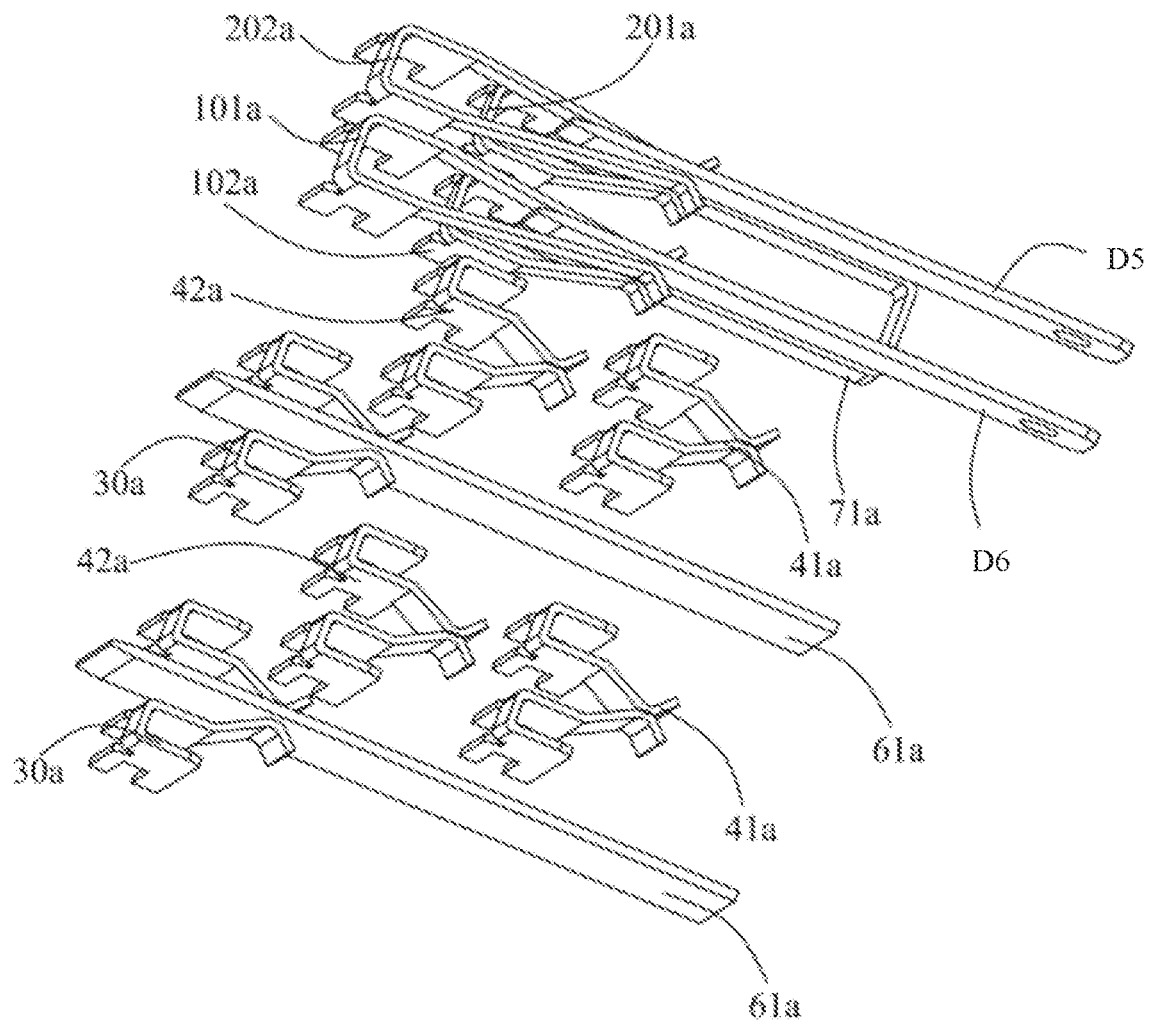
FIG. 6 is a schematic view of the structure of the electric energy storage device when matched with a high-voltage plug, according to the first embodiment.

Please refer to FIG. 1 and FIG. 3, there is a kind of medium-voltage electric tool (not shown). Its working voltage is 2 nV and it provides a medium-voltage plug (not shown). The medium-voltage plug provides a pair of connecting pieces D3, D4 which respectively connect to the second voltage output terminal 102a and the third voltage output terminal 201a, and simultaneously the two connecting pieces D3, D4 are as voltage input terminals of the medium-voltage plug. The medium voltage plug also provides connecting pieces (not shown) for connecting voltage output terminals with different polarities of the two energy modules 10a and 20a. For example, the first voltage output terminal 101a is connected to the fourth voltage output terminal 202a through the connecting pieces. When the medium voltage plug of the medium voltage electric tool is connected with the socket, the two energy modules 10a, 20a are connected in series, and the two energy units in each energy module 10a, 20a are kept in parallel to output a medium voltage of 2 nV.

That means, when the medium-voltage plug of the medium-voltage electric tool is matched with the electric energy storage device, the K energy units in one energy module are connected in parallel through in-module control unit, and the M energy modules are connected in series through the connecting pieces of the medium-voltage plug. Corresponding to the fourth internal-parallel and external-series state mentioned above, the output medium voltage of the medium-voltage electric tool is M*nV.

Please refer to FIG. 4 through FIG. 7, there is a kind of high-voltage electric tool (not shown). Its working voltage is 4 nV and it provides a high-voltage plug 700. The high-voltage plug 700 is provided with a seventh connecting piece 71a to connect the voltage output terminals with different polarities of the two energy modules 10a, 20a, so that the two energy modules 10a, 20a are connected in series. The high-voltage plug provides another pair of connecting pieces D5, D6, which are used to connect to the other two voltage output terminals with different polarities of the two energy modules 10a, 20a, and to be as the voltage input terminals of the high-voltage plug.

Figure 7:
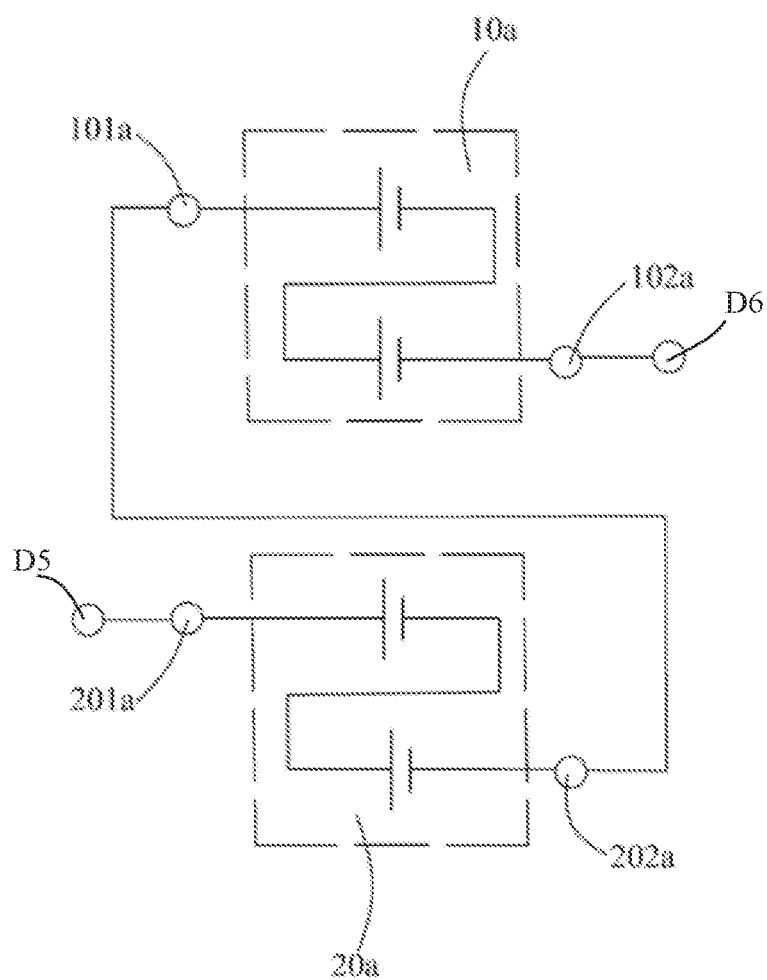
FIG. 7 is a schematic view of the circuit when the electric energy storage device is matched with the high-voltage plug, according to the first embodiment.
Figure 8:
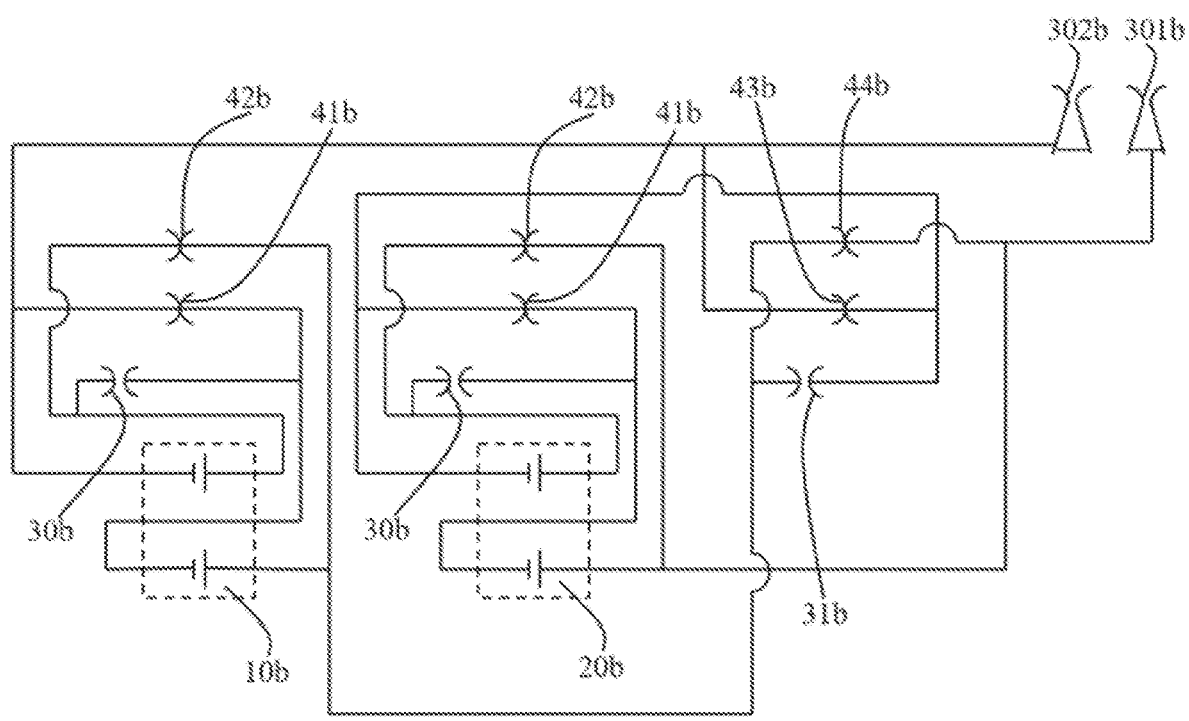
FIG. 8 is a schematic view of the connection of four internal energy units of the electric energy storage device, according to the second embodiment.

The high-voltage plug 700 is also provided with a base 701 and an internal switching part that cooperates with the in-module control unit. The internal switching part and the in-module control unit of the module are set correspondingly. In this embodiment, there are two in-module control units, so there are also two internal switching parts. The internal switching part includes an insulating part 51a corresponding to the parallel switches 41a, 42a and a conductive part 61a corresponding to the first series switch 30a. When the high-voltage plug is connected with the socket, the insulating part 51a contacts the parallel switches 41a, 42a, so that the parallel switches 41a, 42a are disconnected, and the conductive part 61a contacts the both two contact parts of the first series switch 30a, so that the first series switch 30a is conductive, and the two energy units in the energy modules 10a, 20a are switched from parallel connection to series connection. The output voltage of each energy module 10a, 20a is 2 nV. As mentioned above, the two energy modules 10a, 20a are connected in series through the seventh connecting piece 71a, so the high output voltage of the high voltage electric tool is 4 nV. FIG. 7 is the corresponding circuit diagram.

That means, when the high-voltage plug of the high-voltage electric tool is matched with the electric energy storage device, the K energy units in each energy module are switched from parallel connection to series connection through the cooperation between the internal switching part and the in-module control unit, and the M energy modules are connected in series through the connecting pieces of the high-voltage plug. Corresponding to the second full series state mentioned above, the output high voltage of the high-voltage electric tool is N*nV.

Corresponding to the first embodiment, the disclosure also provides an electric tool system which includes the low-voltage electric tool, the medium-voltage electric tool, the high-voltage electric tool, and the electric energy storage device mentioned above. The electric tool system may also include a regular low-voltage battery pack with a rated voltage of nV, a regular medium-voltage battery pack with a rated voltage of 2 nV and a regular high-voltage battery pack with a rated voltage of 4 nV. As mentioned above, the electric energy storage device of the disclosure can cooperate with the low-voltage electric tools, the medium-voltage electric tools and the high-voltage electric tools, and provide different output voltages accordingly, so that the low-voltage electric tools, the medium-voltage electric tools and the high-voltage electric tools can work. Simultaneously, the low-voltage electric tools can also be matched with the regular low-voltage battery packs. The regular low-voltage battery packs correspondingly provide output terminals to connect the connecting pieces D1 and D2 of the low-voltage electric tools. The medium-voltage electric tools can also be matched with the regular medium-voltage battery packs. The regular medium-voltage battery packs correspondingly provide output terminals to connect the connecting pieces D3 and D4 of the medium-voltage electric tools. The high-voltage electric tools can also be matched with the regular high-voltage battery packs. The regular high-voltage battery packs correspondingly provide output terminals to connect the connecting pieces D5 and D6 of the high-voltage electric tools.

Second Embodiment

Please refer to FIG. 8 through FIG. 13, the electric energy storage device also provides the second embodiment. The electric energy storage device in the second embodiment also includes 4 energy units with equal voltages, and the voltage of each energy unit is nV; the 4 energy units are equally divided into two energy modules 10b, 20b, each energy module 10b, 20b includes two energy units, which means that corresponding to the situation of N=4, M=2, K=2 mentioned above, the electric energy storage device can provide 3 kinds of output voltages Which is the same as the first embodiment is that the socket of the electric energy storage device includes two in-module control units equal to the value of M. These two in-module control units are used for the connection of the two energy units in the energy modules 10b and 20b. Which is different from the first embodiment is that: 1. the socket of the electric energy storage device is only provided with two voltage output terminals 301b and 302b. The two voltage output terminals 301b and 302b are correspondingly connected to the total positive and negative electrodes after the two energy modules are connected. 2. The socket of the electrical energy storage device is provided with an inter-module control unit to control the connection of the energy modules 10b and 20b. It is understandable that the number of inter-module control units is M−1, and in this embodiment, M is 2, therefore, there is 1 inter-module control unit.

The in-module control unit includes a second series switch 30b and two parallel switches 41b and 42b. The two parallel switches 41b and 42b are normally closed switches, and the second series switch 30b is a normally open switch. Therefore, in the initial state, the energy units in the energy modules 10b and 20b are connected in parallel. The structure of the in-module control unit and the connection relationship among the energy unit are the same as those in the first embodiment, which can be referred to the previous introduction, which will not be repeated here.

The working principle of the inter-module control unit is similar to that of the in-module control unit. The energy module can be regarded as an energy unit. The inter-module control unit will be described in detail below: referring to FIG. 8, each energy module 10b, 20b as a whole is provided with a positive electrode and a negative electrode. In this embodiment, the inter-module control unit includes a second series switch 31b and two parallel switches 43b, 44b. The two contact parts of the parallel switches 43b, 44b are respectively connected to the electrodes with the same polarities of the two energy modules 10b, 20b. For example: the two contact parts of the first parallel switch 43b are respectively connected to the two negative poles of the two energy modules 10b and 20b, the two contact parts of the second parallel switch 44b are respectively connected to the two positive poles of the two energy modules 10b and 20b, and the two energy modules 10b and 20b can be connected in parallel after the two parallel switches 43b and 44b are turned on. The two contact parts of the second series switch 31b are respectively connected to the two electrodes with opposite polarities of the energy modules 10b, 20b. The other two electrodes with opposite polarities in the two energy modules 10b, 20b are respectively connected to the voltage output terminals 301b, 302b mentioned above and the two energy modules 10b, 20b can be connected in series after the second series switch 31b is turned on.

Figure 9:
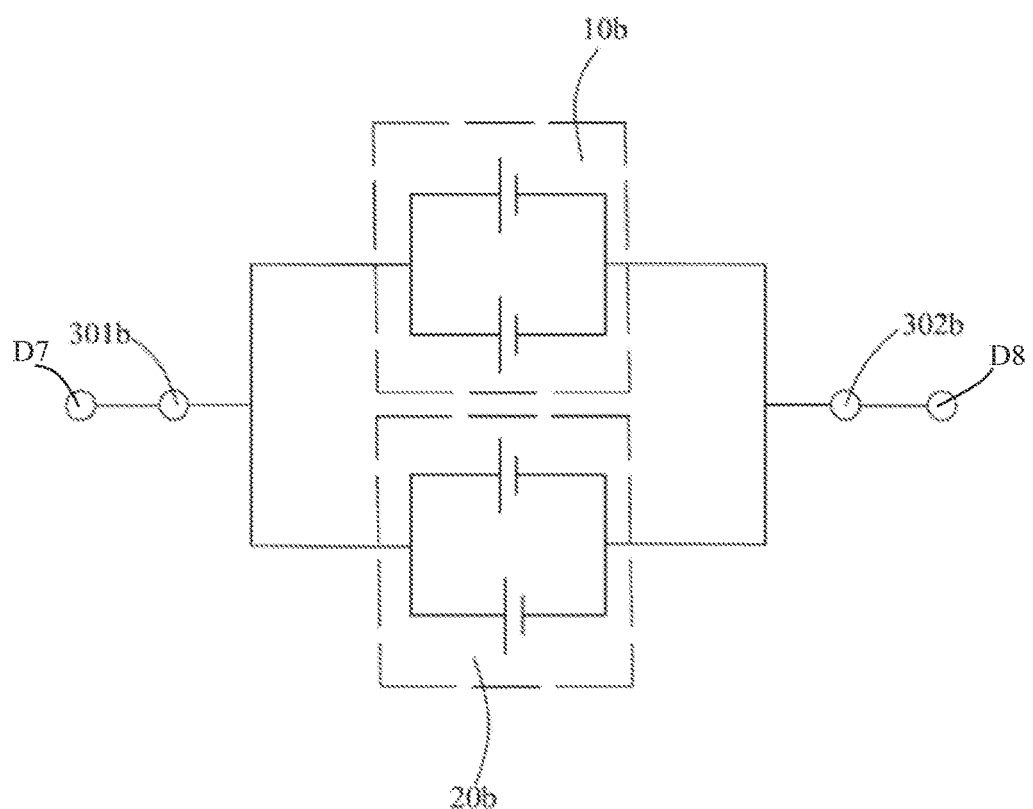
FIG. 9 is a schematic view of the circuit when the electric energy storage device is matched with a low-voltage plug, according to the second embodiment.

The second series switch 31b of the inter-module control unit is a normally open switch, which means that, in the initial state, they are in a disconnected state; and the parallel switches 43b and 44b are normally closed switches, which means that, in the initial state, they are in a connected state. Therefore, in the initial state, the energy modules 10b, 20b are connected in parallel. In combination with the mentioned content, in the initial state, the in-module control unit also keeps the energy units in the energy modules 10b and 20b to in parallel connection. Therefore, the energy units of the electric energy storage device are initially in a fully parallel state, and the output voltage is nV. FIG. 9 is the corresponding circuit diagram.

When the socket of the electric energy storage device is docked with the plug of the docking electric tool, the state of the in-module control unit and the inter-module control unit can be selectively switched, so that the energy units in the energy modules 10b and 20b are changed from parallel connection state to series connection state, and the two energy modules 10b, 20b are also changed from parallel connection state to series connection state, which will be described below in combination with the figures.

Please refer to FIG. 9, a low-voltage electric tool (not shown) is provided with a low-voltage plug and its working voltage is a kind of low-voltage of nV. The low-voltage plug is provided with two connecting pieces D7 and D8 for connecting with two voltage output terminals 301b, 302b. As mentioned above, in the initial state, the four energy units of the electric energy storage device are connected in parallel, and output voltages thereof are nV. Therefore, when the low-voltage electric tool is mated with the electric energy storage device, the two connecting pieces on the low-voltage plug are respectively connected to the two voltage output terminals 301b and 302b to realize the output of low-voltage nV to the low-voltage electric tool.

Figure 10:
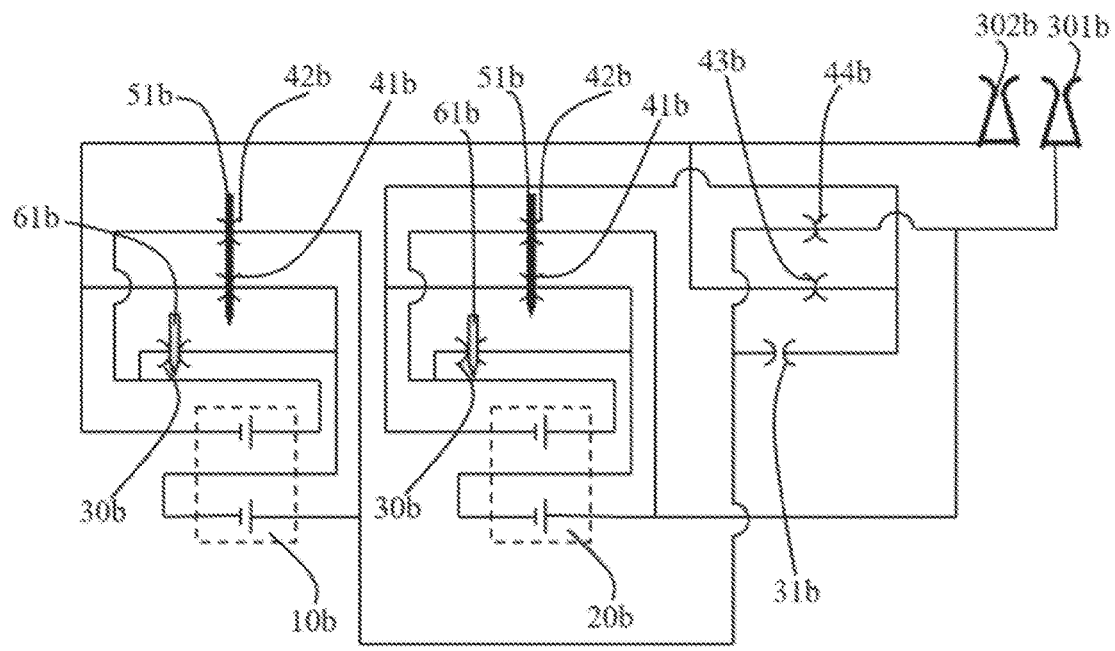
FIG. 10 is a schematic view of the connection between the electric energy storage device and a medium-voltage plug, according to the second embodiment.
Figure 11:
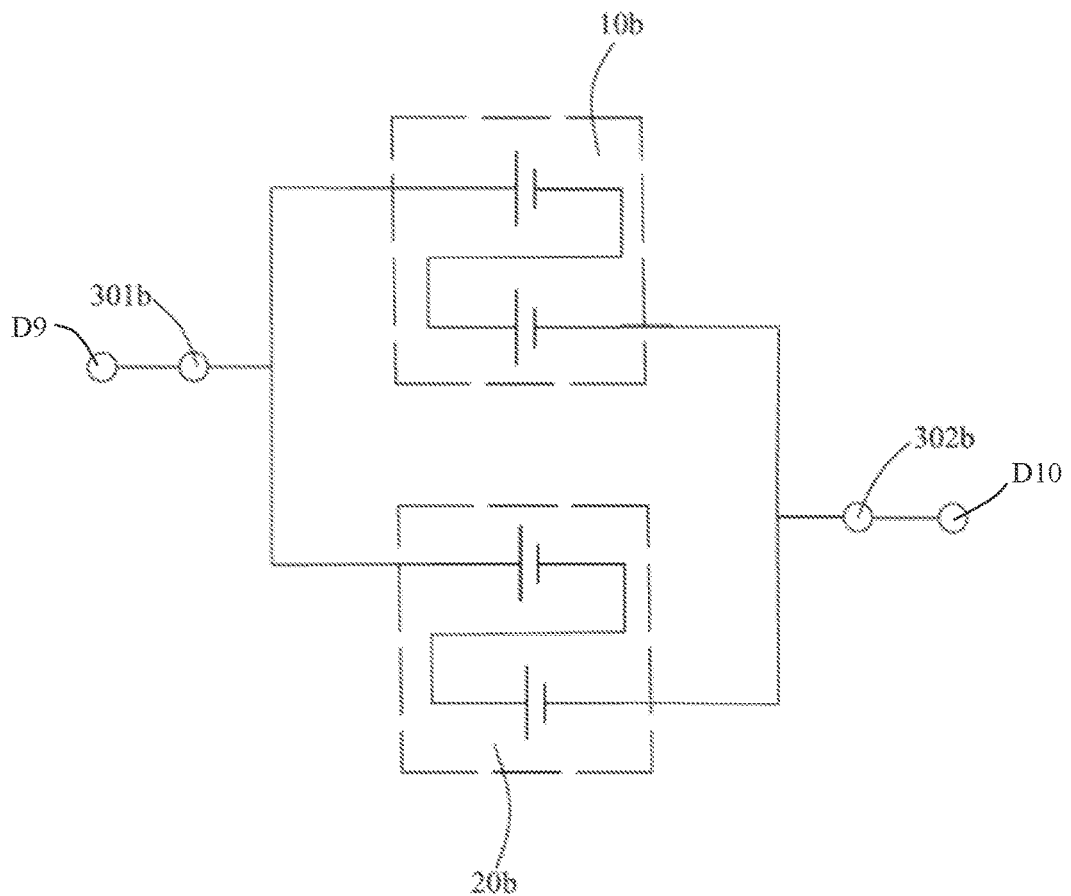
FIG. 11 is a schematic view of the circuit when the electric energy storage device is matched with the medium-voltage plug, according to the second embodiment.
Figure 12:
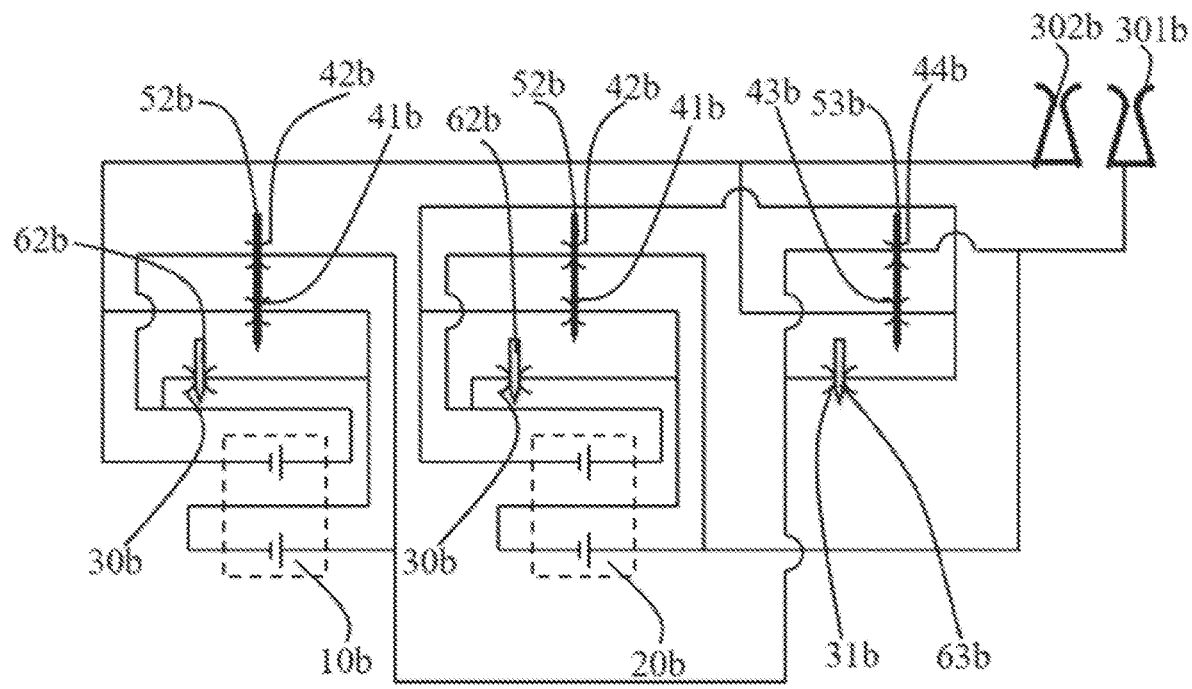
FIG. 12 is a schematic view of the connection between the electric energy storage device and a high-voltage plug, according to the second embodiment.
Figure 13:
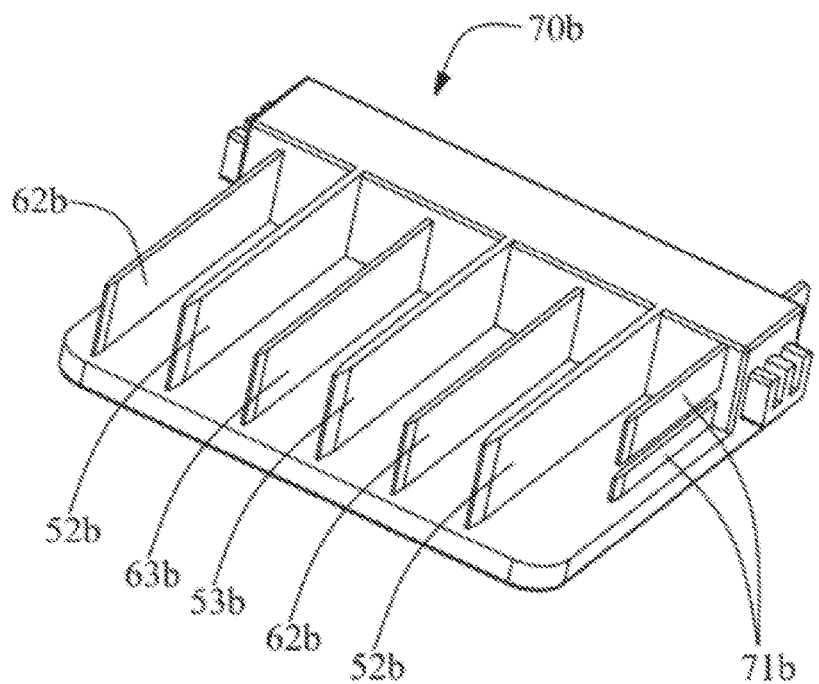
FIG. 13 is a schematic view of the structure of the high-voltage plug in FIG. 12.
Figure 14:
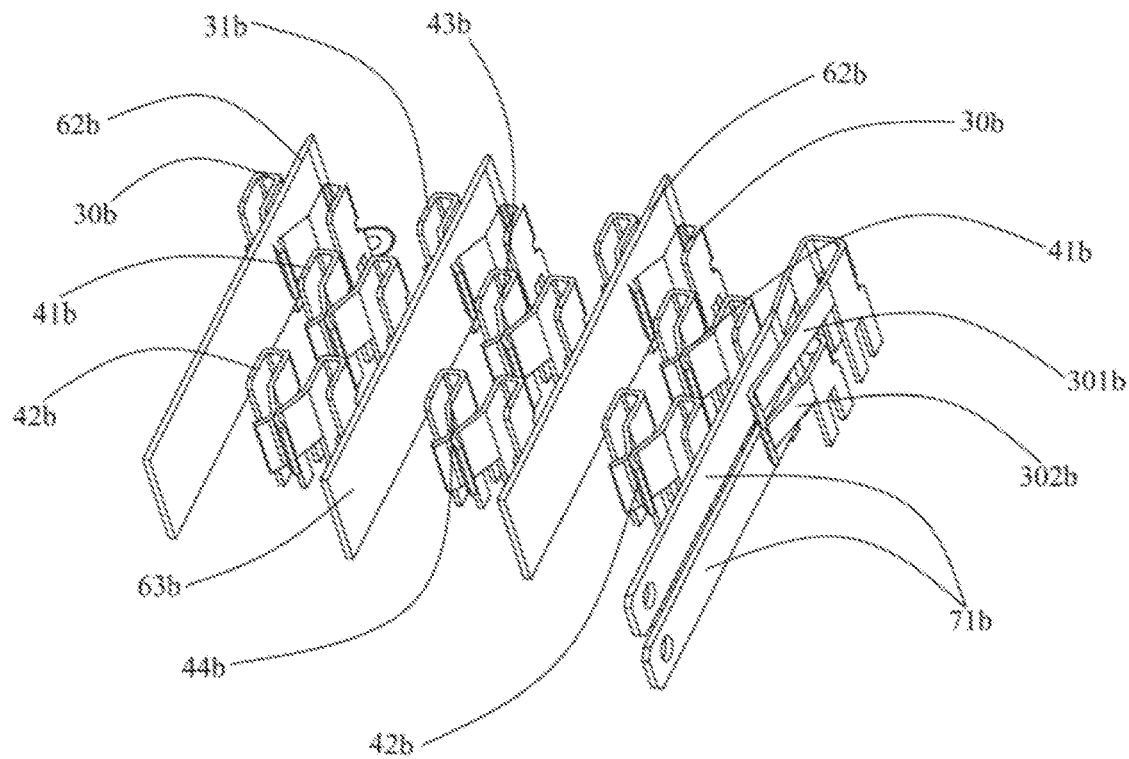
FIG. 14 is a schematic view of the structure of the electric energy storage device when matched with a high-voltage plug, according to the second embodiment.

Please refer to FIG. 10 through FIG. 11, a medium-voltage electric tool (not shown) is provided with a medium-voltage plug and its working voltage is a kind of medium voltage of 2 nV. The medium voltage plug is provided with two connecting pieces D9 and D10 which are respectively connected to the two voltage output terminals 301b, 302b. The medium-voltage plug is also provided with an internal switching part corresponding to the in-module control unit. In this embodiment, there are two in-module control units, so there are also two internal switching parts.

The internal switching part includes an insulating part 51b and a conductive part 61b. When the medium-voltage plug is mated with the socket, the insulating part 51b is in contact with the two contact parts of the parallel switches 41b and 42b in the in-module control unit, so that the parallel switches 41b and 42b are disconnected, and the conductive part 61b is connected to the two contact parts of the series switch 30b in the corresponding in-module control unit, so that the series switch 30b can be in a conducting state, the energy units in the energy modules 10b and 20b are changed from parallel state to series state, and the output voltage of each energy module 10b, 20b is 2 nV. At the same time, the inter-module control unit remains unchanged, which means that the energy modules 10b and 20b are still connected in parallel, and the electric energy storage device outputs a medium voltage of 2 nV to the medium-voltage electric tool.

Please refer to FIG. 12 through FIG. 15, a high-voltage electric tool (not shown) is provided with a high-voltage plug 70b and its working voltage is 4 nV. The high-voltage plug 70b is provided with two connecting pieces D11, D12 which are connected to two voltage output terminals 301b, 302b. The high-voltage plug 70b is also provided with an internal switching part corresponding to the in-module control unit, and an external switching part corresponding to the inter-module control unit. In this embodiment, if there are two in-module control units, there are also two internal switching parts. If there is one inter-module control unit, there is also one external switching part. Each internal switching part includes a first insulating part 52b and a first conductive part 62b, and the external switching part includes a second insulating part 53b and a second conductive part 63b.

When the high-voltage plug is mated with the socket, the first insulating part 52b is in contact with the two contact parts of the parallel switches 41b, 42b in the in-module control unit, so that the parallel switches 41b, 42b are disconnected. The first conductive part 62b is in contact with the two contact parts of the series switch 30b in the in-module control unit, so that the series switch 30b is conductive and the two energy units in each energy module 10b, 20b are changed from parallel state to series state. The output voltage of each of the energy modules 10b, 20b is 2 nV.

Figure 15:
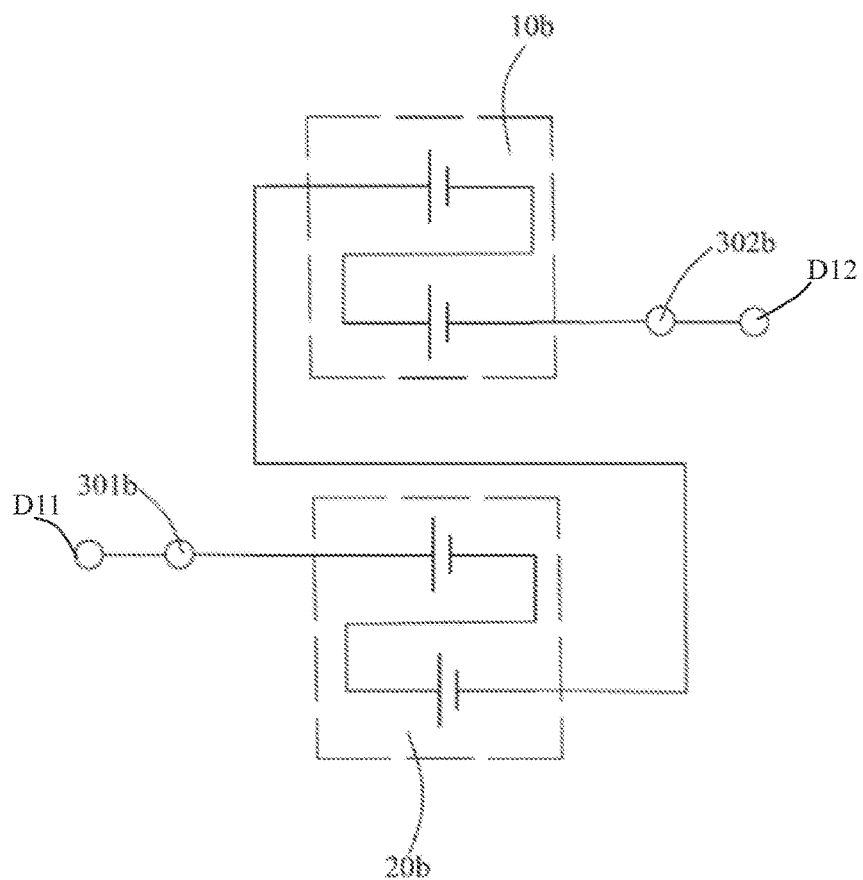
FIG. 15 is a schematic view of the circuit when the electric energy storage device is matched with the high-voltage plug, according to the second embodiment.
Figure 16:
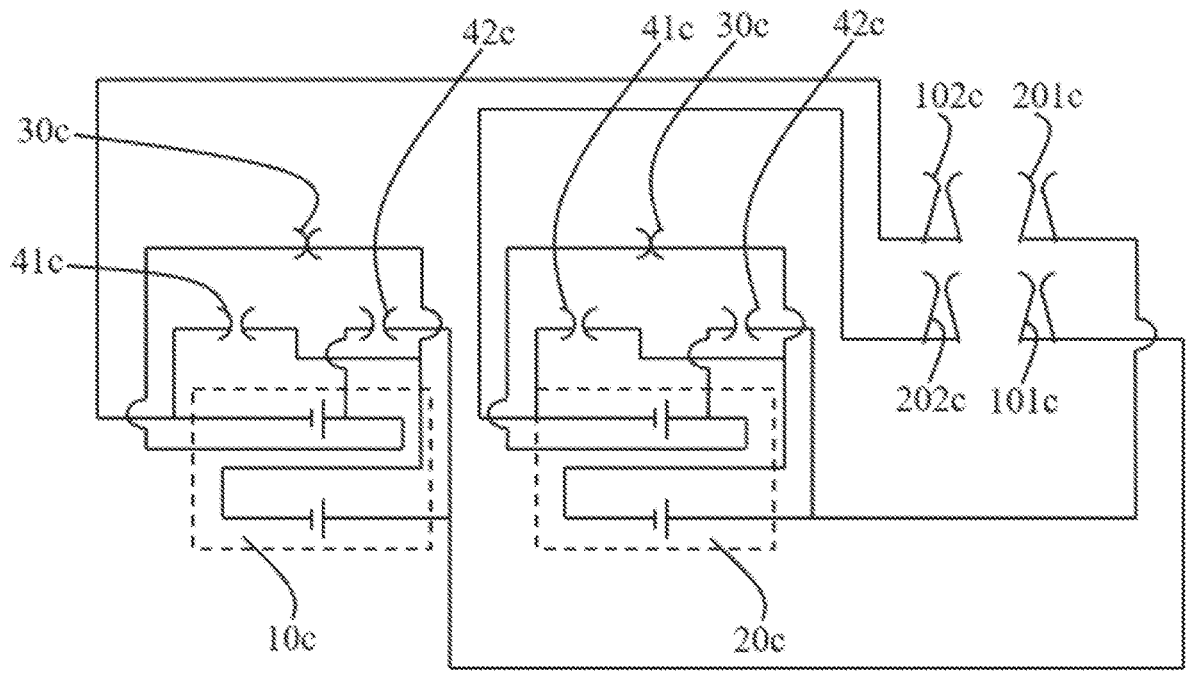
FIG. 16 is a schematic view of the connection of four internal energy units of the electric energy storage device, according to the third embodiment.

The second insulating part 53b is in contact with the two contact parts of the parallel switches 43b and 44b in the inter-module control unit, so that the parallel switches 43b and 44b are disconnected. The second conductive part 63b is in contact with the two contact parts of the serial switch 31b in the inter-module control unit, so that the series switch 31b is conductive, and the energy modules 10b and 20b are changed from parallel state to series state. The output high voltage is 4 nV. FIG. 15 is the corresponding circuit diagram.

Corresponding to the second embodiment, the disclosure also provides an electric tool system, including the low-voltage electric tool, the medium-voltage electric tool, the high-voltage electric tool, and the electric energy storage device mentioned above. The electric tool system may also include a regular low-voltage battery pack with a rated voltage of nV, a regular medium-voltage battery pack with a rated voltage of 2 nV and a regular high-voltage battery pack with a rated voltage of 4 nV. As mentioned above, the electric energy storage device of the disclosure can cooperate with the low-voltage electric tools, the medium-voltage electric tools, and the high-voltage electric tools, and correspondingly provide different output voltages, so that low-voltage electric tools, the medium-voltage electric tools and the high-voltage electric tools can work normally. Simultaneously, the low-voltage electric tool can also be matched with the regular low-voltage battery pack, and the regular low-voltage battery pack are correspondingly provided with output terminals which are connected to the connecting pieces D7 and D8 of the low-voltage electric tool. The medium-voltage electric tool can also be matched with the regular medium-voltage battery pack, and the regular medium-voltage battery pack are correspondingly provided with output terminals which are connected to the connecting pieces D9 and D10 of the medium-voltage electric tool. The high-voltage electric tool can also be matched with the regular high-voltage battery pack, and the regular high-voltage battery pack are correspondingly provided with output terminals which are connected to the connecting pieces D11 and D12 of the high-voltage electric tool.

Third Embodiment

The in-module control unit of the electric energy storage device in the first embodiment and the second embodiment keeps the energy units in the energy modules in the parallel state in the initial state. According to requirements, the in-module control unit can also keep the energy unit in series state in the initial state.

Please refer to FIG. 16 to FIG. 22. The electric energy storage device of the disclosure also provides a third embodiment. The electric energy storage device in the third embodiment also includes 4 energy units with equal voltages, and the voltage of each energy unit is nV, which is equally divided into two energy modules 10c, 20c. The third embodiment is almost the same as the first embodiment. The socket of the electric energy storage device is provided with 4 voltage output terminals 101c, 102c, 201c, 202c and two in-module control units. Each in-module control unit includes one series switch 30c and two parallel switches 41c, 42c. The difference from the first embodiment is that in the initial state, the series switch 30c of the in-module control unit is a normally closed switch, which is initially conductive, and the parallel switches 41c and 42c are normally open switches, which are initially disconnected, so that the two energy units in each energy module 10c, 20c are connected in series, and the output voltage of each energy module 10c, 20c is 2 nV.

Figure 17:
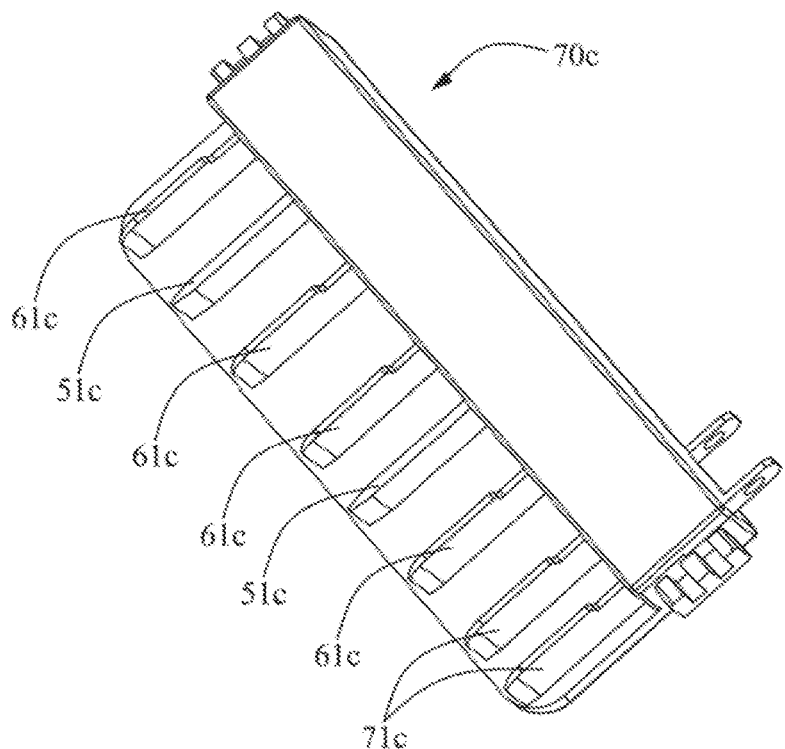
FIG. 17 is a schematic view of the structure of a low-voltage plug in the third embodiment.
Figure 18:
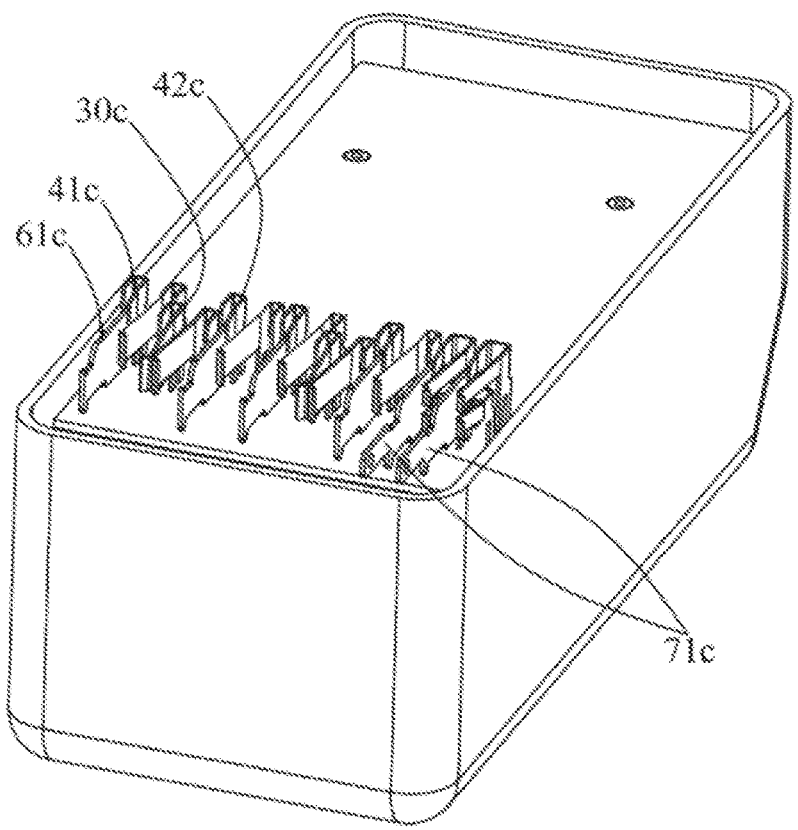
FIG. 18 is a schematic view of the structure of the electric energy storage device when it is matched with a low-voltage plug, according to the third embodiment.
Figure 19:
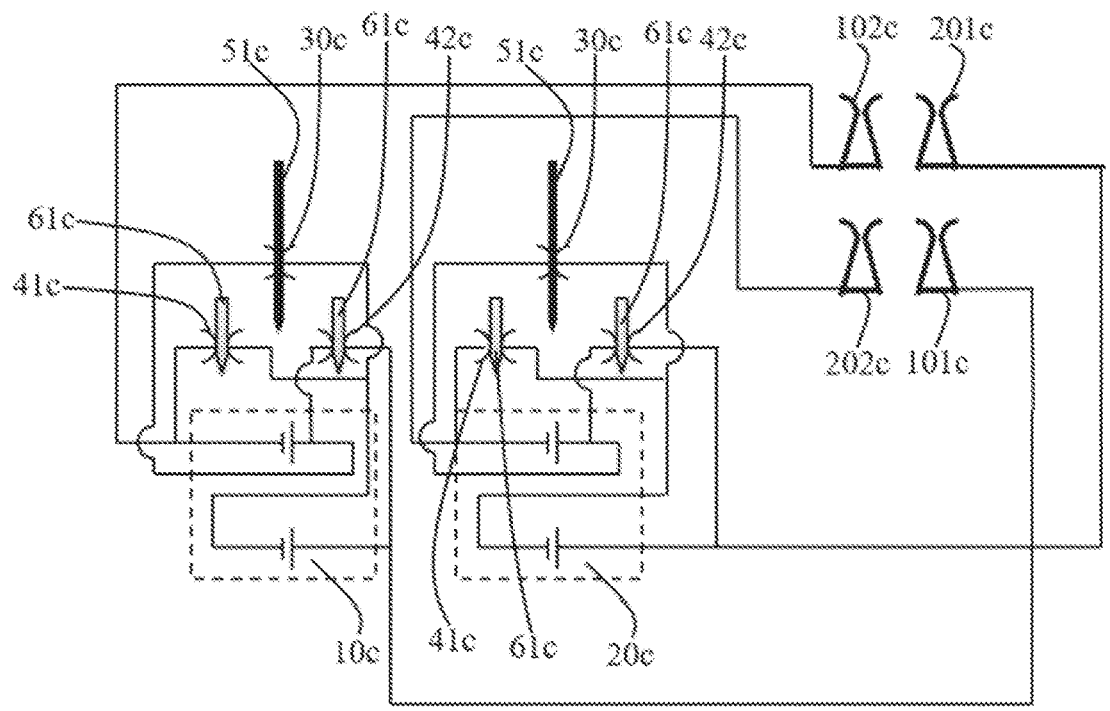
FIG. 19 is a schematic view of the connection between the electric energy storage device and the low-voltage plug, according to the third embodiment.
Figure 20:
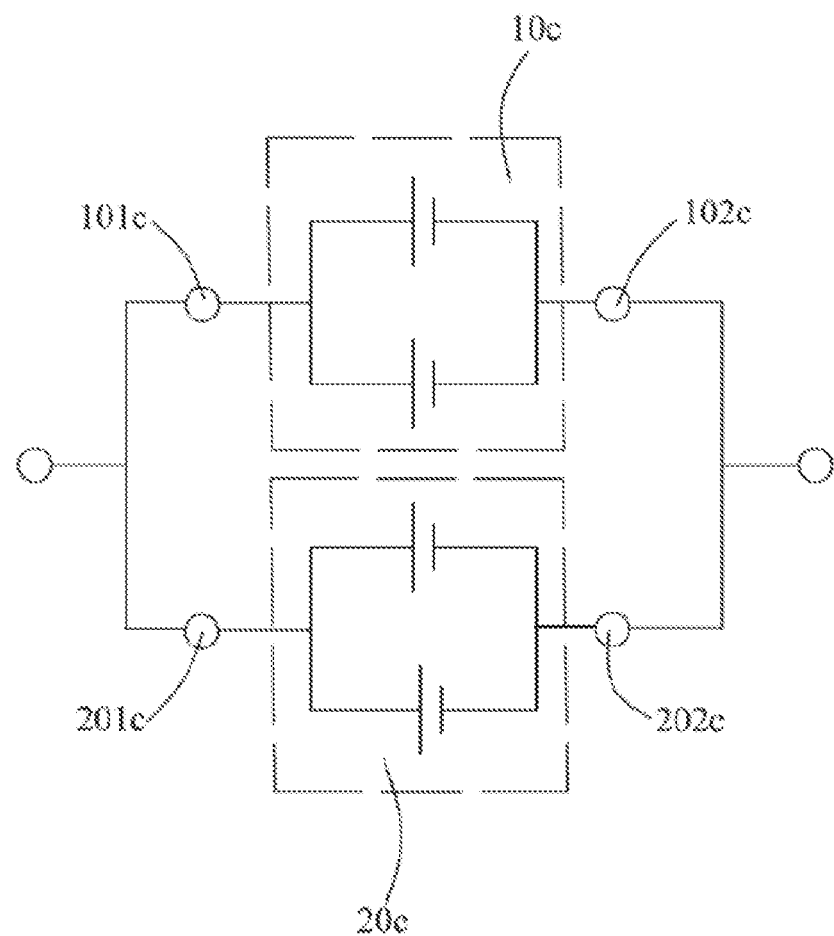
FIG. 20 is a schematic view of the circuit when the electric energy storage device is matched with the low-voltage plug, according to the third embodiment.

Please refer to FIG. 17 to FIG. 19, a low-voltage electric tool (not shown) is provided with a low-voltage plug 70c and its working voltage is nV. The low-voltage plug 70c is provided with two internal switching parts, and each internal switching part includes two conductive parts 61c and one insulating part 51c, the insulating part 51c is used to turn off the series switch 30c, and the conductive parts 61c are used to turn on the parallel switches 41c, 42c to change the two energy units in each energy module 10c, 20c from series connection state to parallel connection state. The low-voltage plug is also provided with two connecting pieces 71c to connect 4 voltage output terminals 101c, 102c, 201c, 202c in parallel, so that the energy modules 10c and 20c are connected in parallel, and the output low-voltage of the electric energy storage device is nV. FIG. 20 shows the corresponding circuit diagram.

Figure 21:
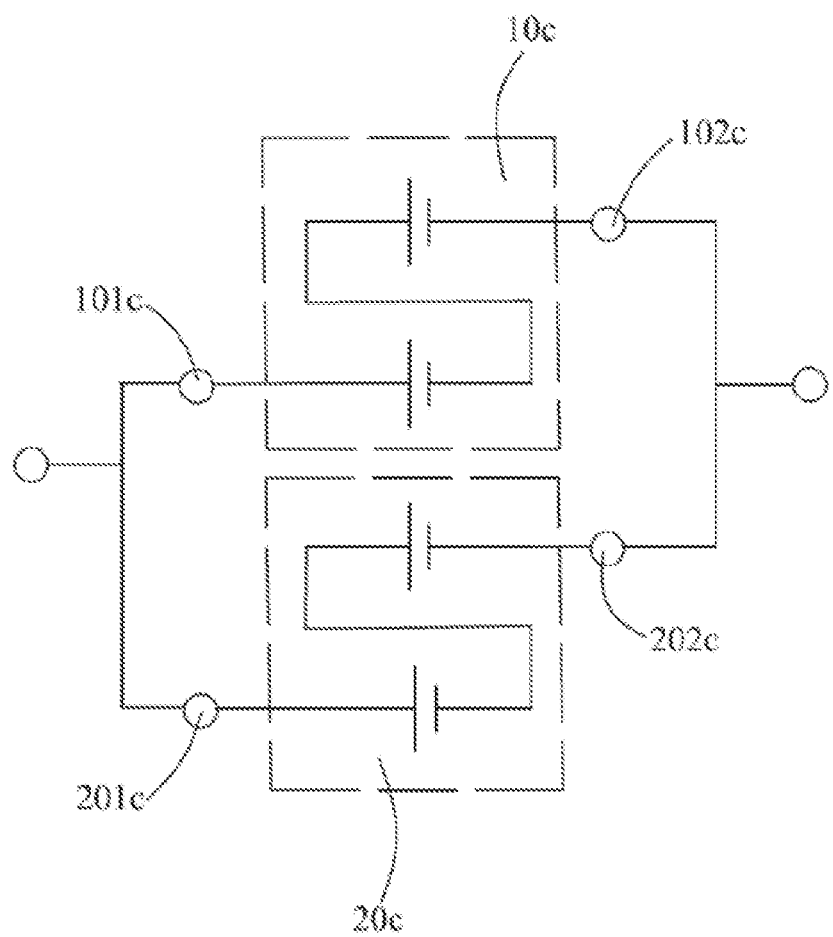
FIG. 21 is a schematic view of the circuit when the electric energy storage device is matched with the medium-voltage plug, according to the third embodiment.

Please refer to FIG. 21, a medium-voltage electric tool (not shown) is provided with a medium-voltage plug and its working voltage is 2 nV. The medium-voltage plug is provided with connecting pieces which keeps four voltage output terminals 101c, 102c, 201c, and 202c being connected in parallel, and the connecting pieces keep the energy modules 10c and 20c being connected in parallel. The two energy units in each energy module 10c and 20c are kept in series connection, so that the output low voltage of the electric energy storage device is 2 nV.

Figure 22:
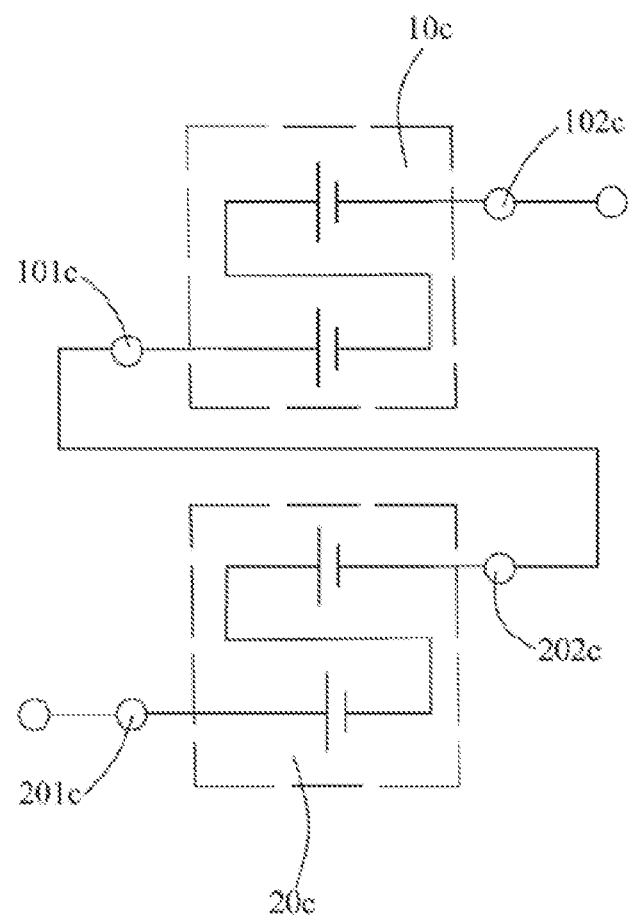
FIG. 22 is a schematic view of the circuit when the electric energy storage device is matched with the high-voltage plug, according to the third embodiment.

Please refer to FIG. 22, a high-voltage electric tool (not shown) is provided with a high-voltage plug and its working voltage is 4 nV. The high-voltage plug is provided with connecting pieces which keeps the four voltage output terminals 101c, 102c, 201c, and 202c being connected in series, and the connecting pieces keep the energy modules 10c and 20c being connected in series. The two energy units in each energy module 10c and 20c are kept in series connection, so that the output low voltage of the electric energy storage device is 4 nV.

Please refer to the first embodiment about the specific connection mode of the connecting pieces of the various docked plugs, which will not be repeated here.

The low-voltage electric tool, the medium-voltage electric tool, the high-voltage electric tool, and the energy storage device in this embodiment can form a kind of electric tool system. The electric tool system may also include regular low-voltage battery packs, medium-voltage battery packs, and high-voltage battery packs, which is similar to the content in the first embodiment, so it will not be repeated here.

Fourth Embodiment

Figure 23:
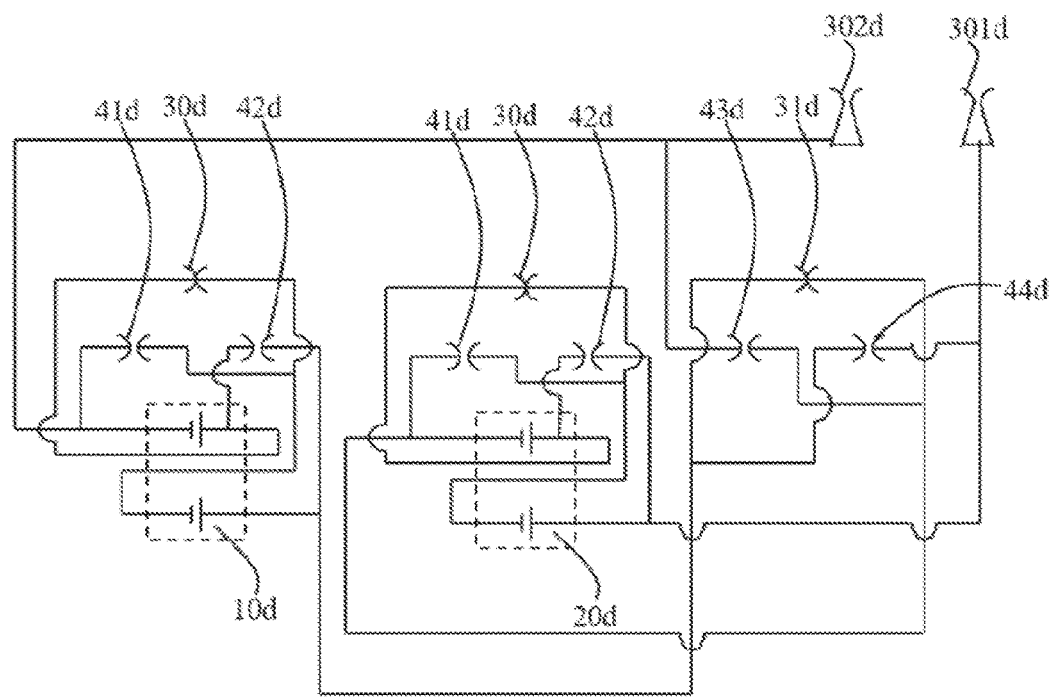
FIG. 23 is a schematic view of the connection of four internal energy units of the electric energy storage device, according to the fourth embodiment.
Figure 24:
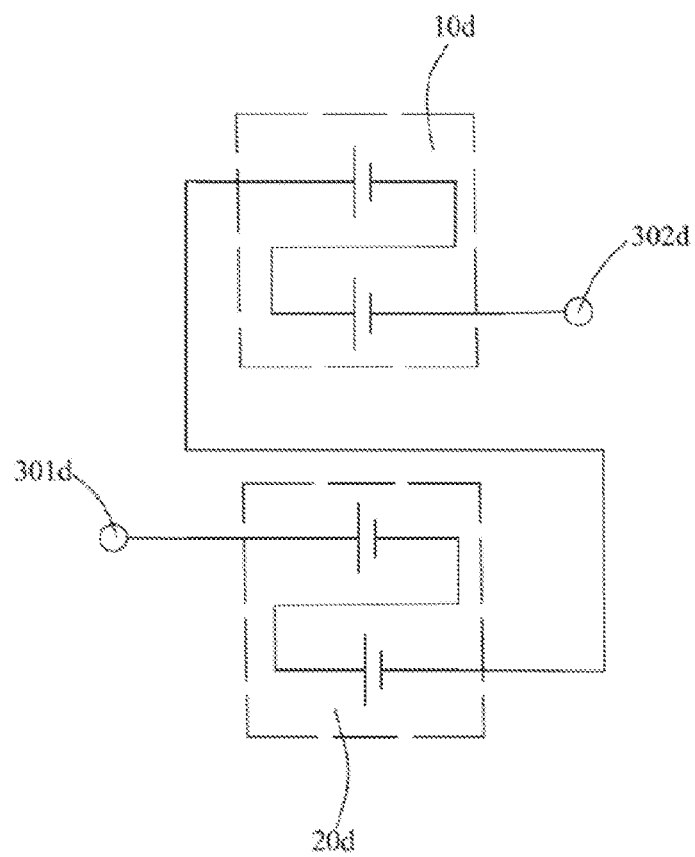
FIG. 24 is a schematic view of the circuit of the electric energy storage device in the fourth embodiment.

Please refer to FIG. 23 and FIG. 24, the electric energy storage device of the disclosure also provides a fourth embodiment. The electric energy storage device of the fourth embodiment also includes four energy units with equal voltages. The voltage of each energy unit is nV, which is equally divided into two energy modules 10d, 20d. The fourth embodiment is similar to the second one. The socket of the electric energy storage device is only provided with two voltage output terminals 301d and 302d. The socket includes two in-module control units and one inter-module control unit. Each in-module control unit includes one series switch 30d and two parallel switches 41d, 42d. The inter-module control unit includes one series switch 31d and two parallel switches 43d and 44d. Please refer to the second embodiment about the various connection modes of the voltage output terminals 301d and 302d, the in-module control units and the inter-module control unit, which will not be repeated here.

In the second embodiment, the two energy units in the energy modules 10b and 20b are initially connected in parallel by the in-module control units, and the energy modules 10b and 20b are initially connected in parallel by inter-module control unit. In the fourth embodiment, the two energy units in the energy modules 10d and 20d are initially connected in series by the in-module control unit, and the energy modules 10d and 20d are also initially connected in series by the inter-module control unit. Specifically, the series switch 30d of the in-module control units is a normally closed switch, which is initially conductive, and the parallel switches 41d and 42d of the in-module control units are normally open switches, which are initially disconnected, so that the two energy units of each energy module 10d, 20d are connected in series, and the output voltage of each energy module 10d, 20d is 2 nV. The series switch 31d of the inter-module control unit is a normally closed switch, which is initially conductive. The parallel switches 43d and 44d of the inter-module control unit are normally open switches, and are initially disconnected, so that the energy modules 10d and 20d are connected in series. Therefore, in the initial state, the output voltage of the electric energy storage device is 4 nV.

Figure 25:
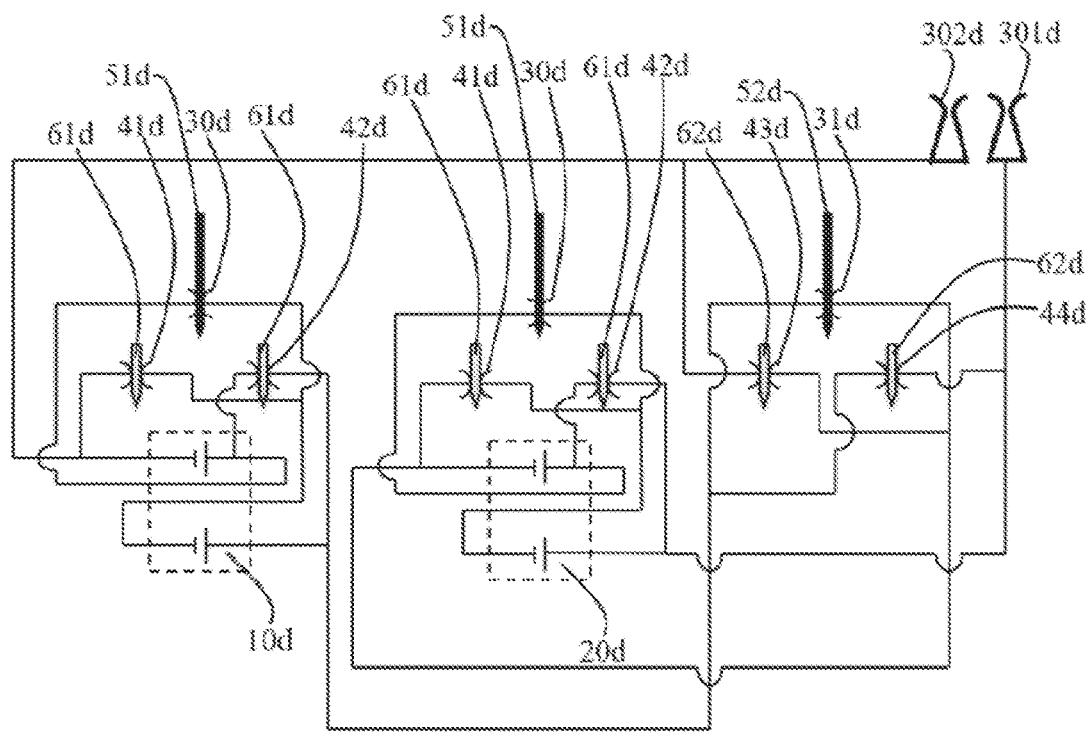
FIG. 25 is a schematic view of the connection between the electric energy storage device and a low-voltage plug when mated, according to the fourth embodiment.
Figure 26:
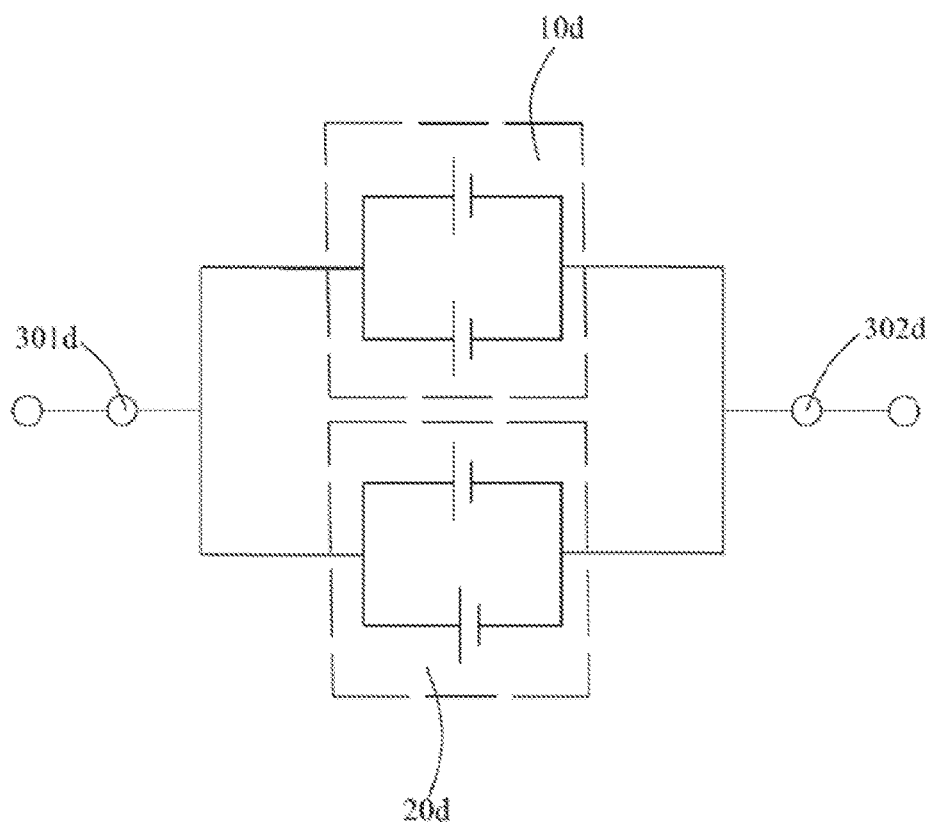
FIG. 26 is a schematic view of the circuit when the electric energy storage device is matched with a low-voltage plug, according to the fourth embodiment.

Please refer to FIG. 25 and FIG. 26, a low-voltage electric tool (not shown) is provided with a low-voltage plug and its working voltage of nV. The low-voltage plug is provided with connecting pieces which are respectively connected to two voltage output terminals 301d and 302d. The low-voltage plug is also provided with two internal switching parts, each of the internal switching parts includes one insulating part 51d and two conductive parts 61d. The insulating part 51d is used to disconnect the series switch 30d of the in-module control unit, and the conductive parts 61d are used to turn on the parallel switches 41d and 42d of the in-module control unit, which changes the two energy units in each energy module 10d, 20d from series connection state to parallel connection state. The low-voltage plug is also provided with an external switching part. The external switching part includes two conductive parts 62d and one insulating part 52d. The insulating part 52d is used to disconnect the series switch 31d of the inter-module control unit, and the conductive part 62d is used to turn on the parallel switches 43d and 44d of the inter-module control unit, which changes the energy modules 10d and 20d from series connection state to parallel connection state, so that the electric energy storage device outputs a low voltage of nV.

Figure 27:
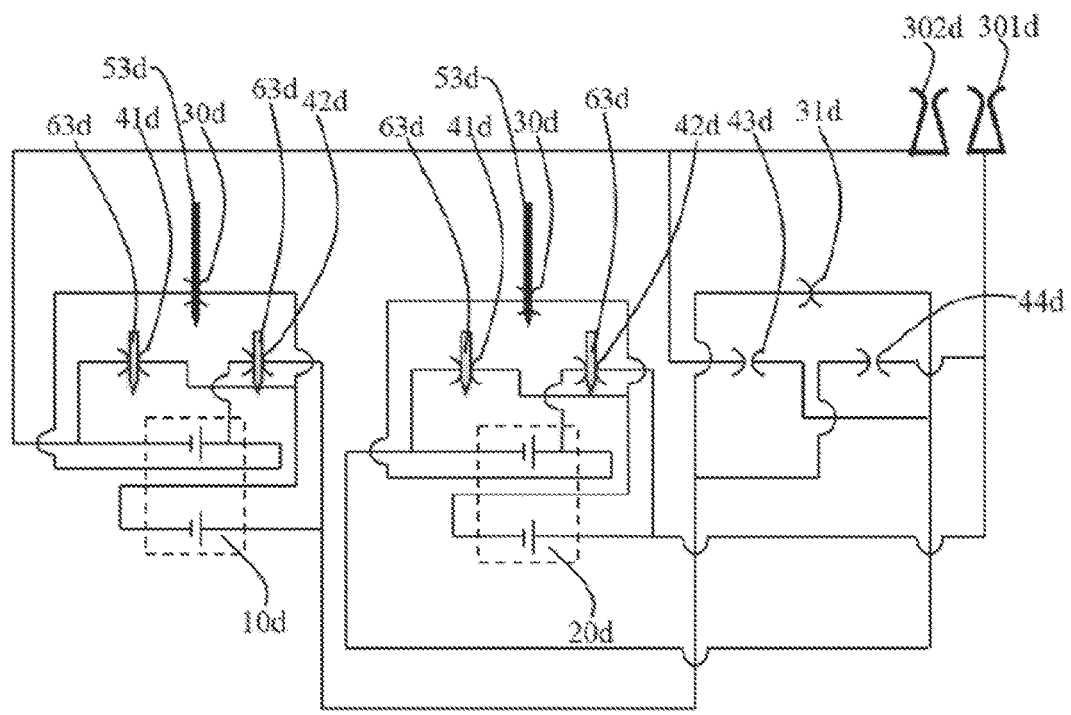
FIG. 27 is a schematic view of the connection between the electric energy storage device and a medium-voltage plug, according to the fourth embodiment.
Figure 28:
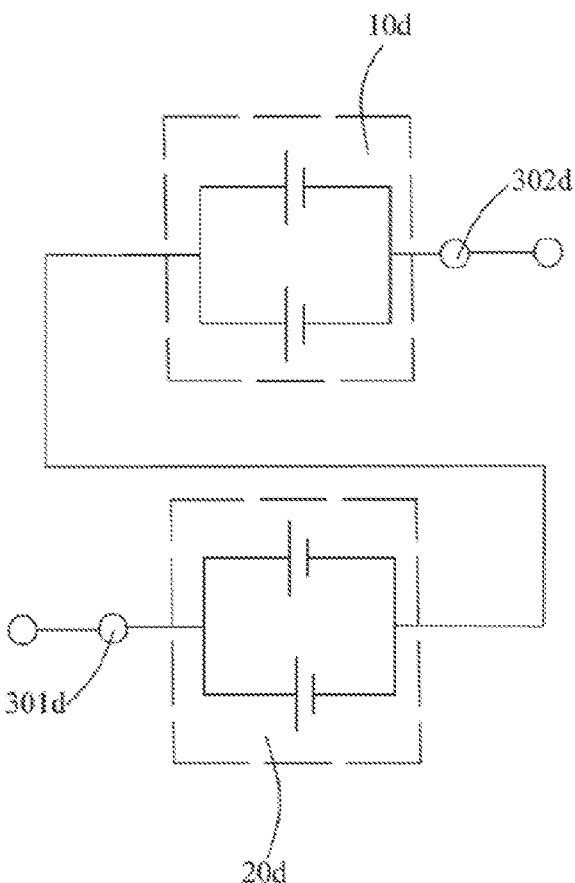
FIG. 28 is a schematic view of the circuit when the electric energy storage device is matched with the medium-voltage plug, according to the fourth embodiment.

Please refer to FIG. 27 and FIG. 28, a medium-voltage electric tool (not shown) with a working voltage of 2 nV is provided with a medium-voltage plug. The medium-voltage plug is provided with the connecting pieces respectively connected to the two voltage output terminals 301d and 302d. The medium voltage plug is also provided with two internal switching parts. Each internal switching part includes one insulating part 53d and two conductive parts 63d. The insulating part 53d is used to disconnect the series switch 30d of the in-module control unit, and the conductive part 63d is used to turn on the parallel switches 41d and 42d of the in-module control unit, which changes the two energy units in each energy module 10d, 20d from series connection state to parallel connection state. The energy modules 10c and 20c are connected in series and the output low-voltage of the electric energy storage device is 2 nV.

Figure 29:
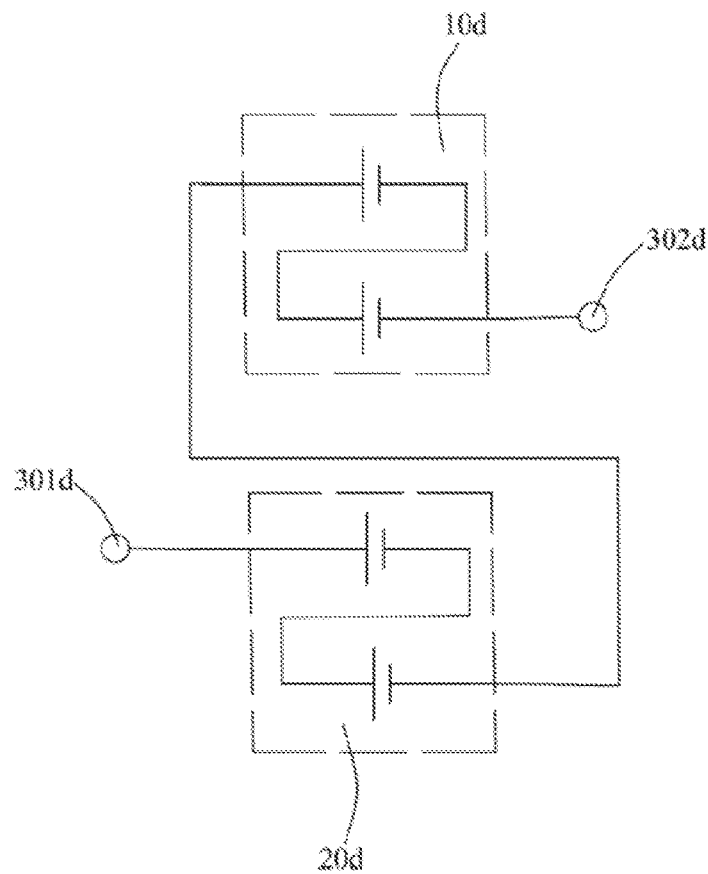
FIG. 29 is a schematic view of the circuit when the electric energy storage device is matched with the high-voltage plug, according to the fourth embodiment.

Please refer to FIG. 29, a high-voltage electric tool (not shown) is provided with a high-voltage plug and its working voltage is 4 nV. The high-voltage plug is provided with connecting pieces respectively connected to the two voltage output terminals 301d and 302d. The energy modules 10c, 20c are connected in series, and the energy units in the energy modules 10c, 20c are connected in series, so that the output low voltage of the electric energy storage device is 4 nV.

The low-voltage electric tool, the medium-voltage electric tool, the high-voltage electric tool, and the energy storage device in this embodiment can form an electric tool system. The electric tool system may also include regular low-voltage battery packs, regular medium-voltage battery packs, and regular high-voltage battery packs, which is similar to the first embodiment. It will not be repeated here.

Fifth Embodiment

Figure 30:
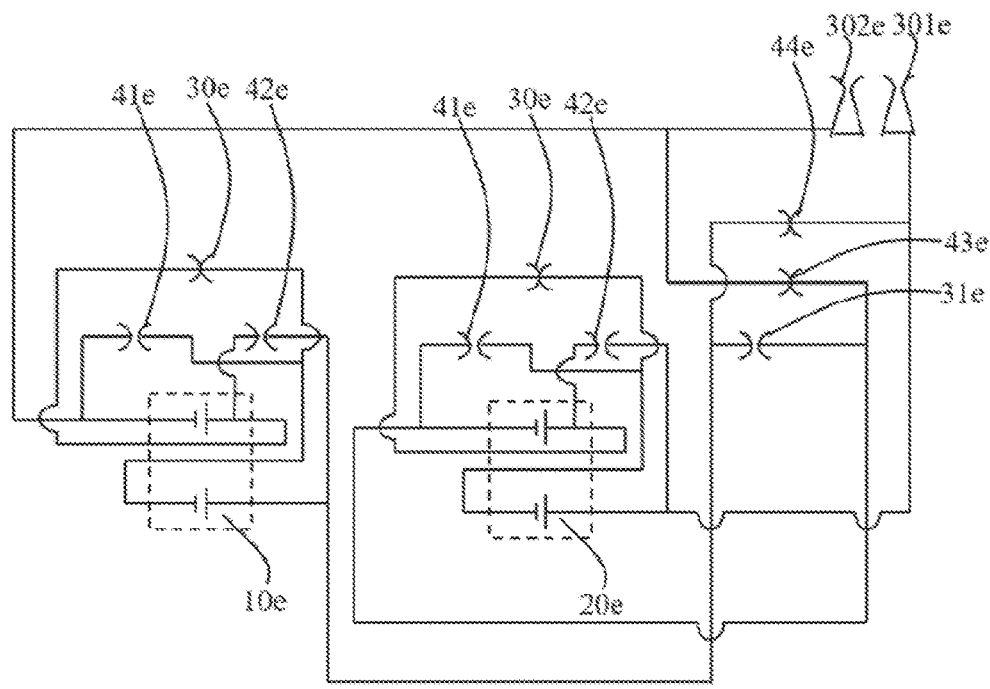
FIG. 30 is a schematic view of the connection of four internal energy units of the electric energy storage device, according to the fifth embodiment.
Figure 31:
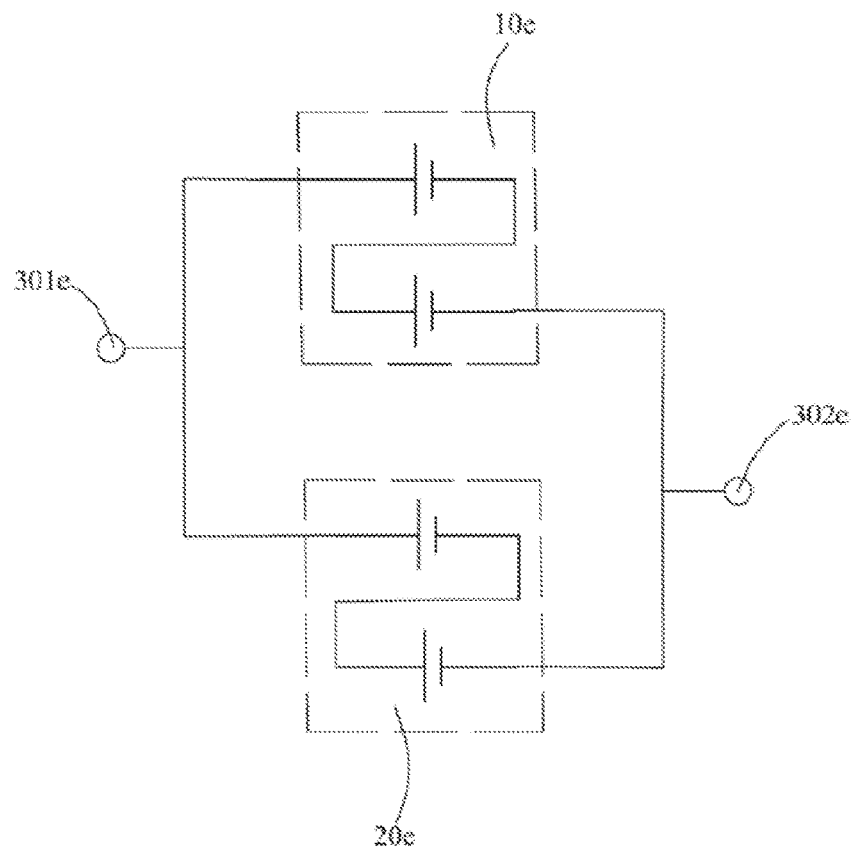
FIG. 31 is a schematic view of the circuit of the electric energy storage device in the fifth embodiment.

Please refer to FIG. 30 through FIG. 31. In the fifth embodiment, the electric energy storage device includes four energy units with the equal voltage, and the voltage is nV. The four energy units are equally divided into two energy modules 10e and 20e; which is similar to the fourth embodiment is that the socket of the electric energy storage device includes an in-module control unit, an inter-module control unit, and two voltage output terminals 301e and 302e. The in-module control unit includes one series switch 30e and two parallel switches 41e, 42e, and the inter-module control part includes one series switch 31e and two parallel switches 43e, 44e. Please refer to the second embodiment about the various connection modes of the voltage output terminals 301e and 302e, the in-module control unit, and the inter-module control unit, which will not be repeated here.

In the second embodiment, the two energy units in the energy modules 10b and 20b are initially connected in parallel by the in-module control unit, and the energy modules 10b and 20b are initially connected in parallel by the inter-module control unit. In the fifth embodiment, the energy modules 10d and 20d are also initially connected in parallel by the inter-module control unit, but the two energy units in the energy modules 10d and 20d are initially connected in series by the in-module control unit.

Specifically, the series switch 31e of the inter-module control unit is a normally open switch, which is initially turned on, and the parallel switches 43e and 44e of the inter-module control unit are normally closed switches, which are initially disconnected, so that the energy module 10e, 20e are connected in parallel. The series switch 30e of the in-module control unit is a normally closed switch and is initially conductive. The parallel switches 41e and 42e of the in-module control unit are normally open switches and are initially disconnected, so that the two energy units of each energy module 10e, 20e are connected in series, and the output voltage of each energy module 10e, 20e is 2 nV.

Figure 32:
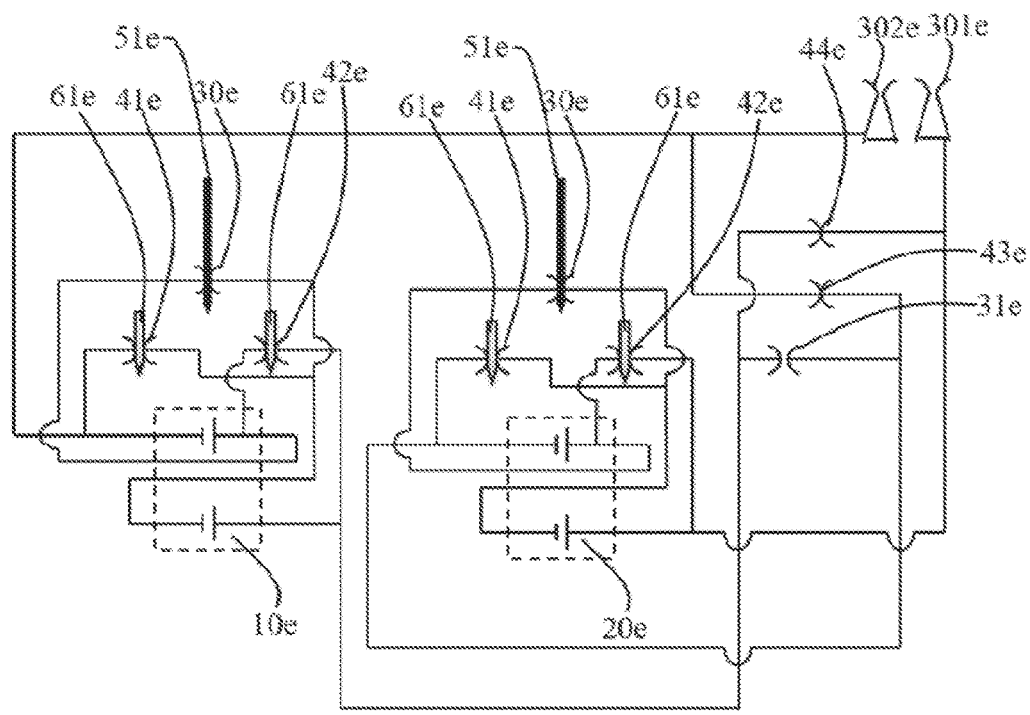
FIG. 32 is a schematic view of the connection between the electric energy storage device and a low-voltage plug, according to the fifth embodiment.
Figure 33:
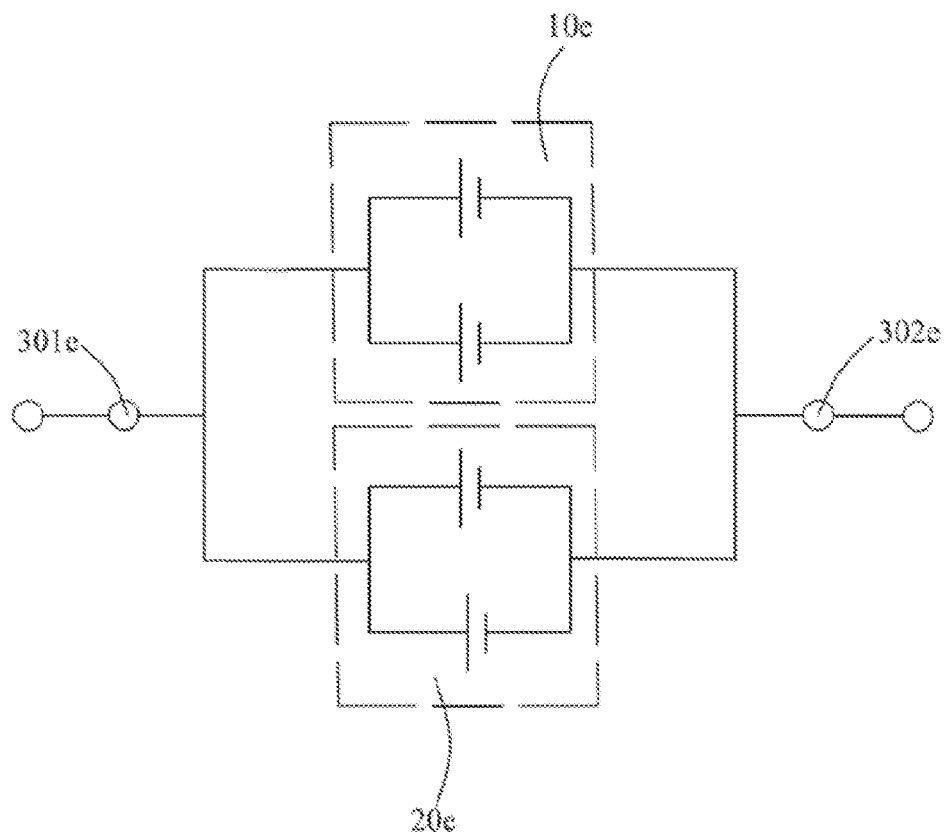
FIG. 33 is a schematic view of the circuit when the electric energy storage device is matched with a low-voltage plug, according to the fifth embodiment.

Please refer to FIG. 32 and FIG. 33, a low-voltage electric tool (not shown) is provided with a low-voltage plug and its working voltage is nV. The low-voltage plug is provided with connecting pieces which are respectively connected to the two voltage output terminals 301e and 302e. The low-voltage plug is also provided with two internal switching parts, and each of the internal switching parts includes one insulating part 51e and two conductive parts 61e. The insulating part 51e is used to disconnect the series switch 30e, and the conductive part 61e is used to turn on the parallel switch, 41e, 42e, so that the two energy units in each energy module 10e, 20e are changed from series connection state to parallel connection state. The energy modules 10e, 20e are connected in parallel, and the output low voltage of the electric energy storage device is nV.

Figure 34:
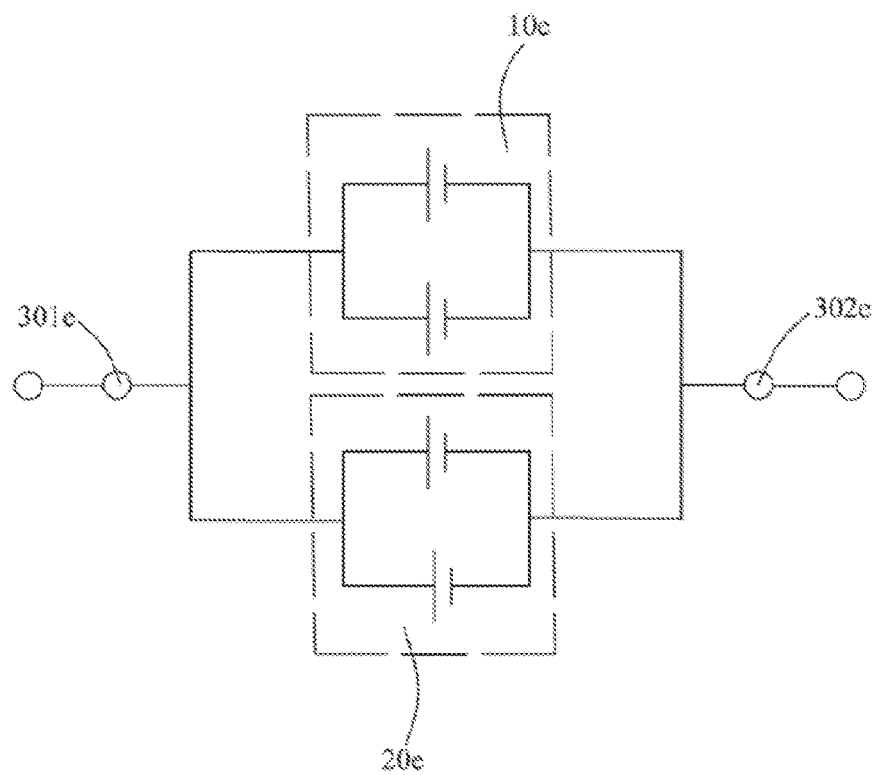
FIG. 34 is a schematic view of the circuit when the electric energy storage device is matched with a medium-voltage plug, according to the fifth embodiment.

Please refer to FIG. 34, a medium-voltage electric tool (not shown) is provided with a medium-voltage plug and its working voltage is 2 nV. The medium-voltage plug is provided with connecting pieces which are respectively connected to two voltage output terminals 301e and 302e. The output medium-voltage of the electric energy storage device is 2 nV.

Figure 35:
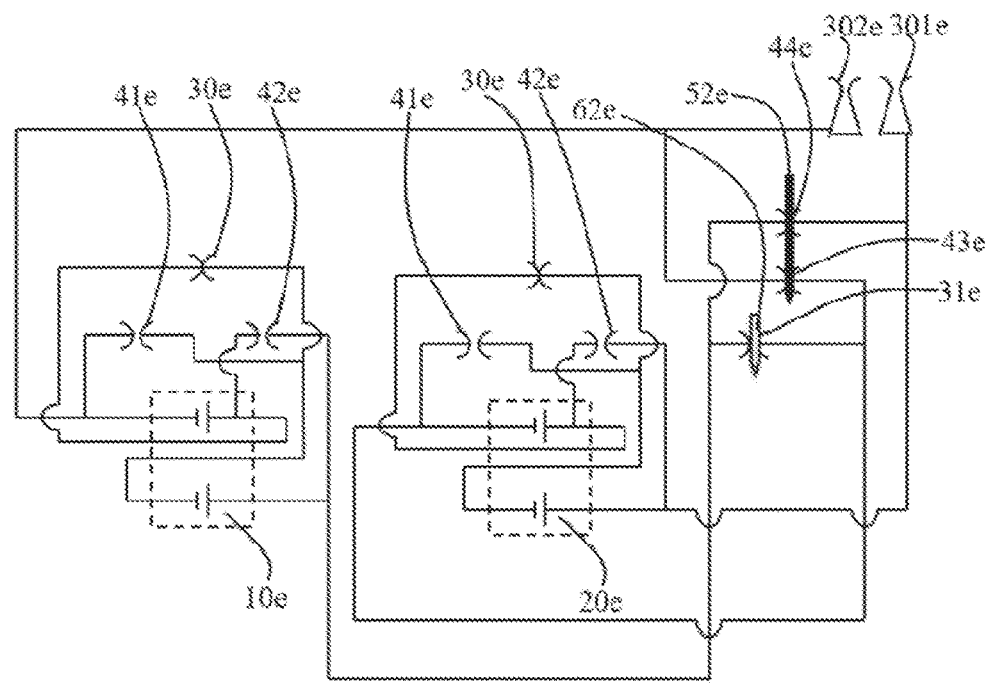
FIG. 35 is a schematic view of the connection between the electric energy storage device and a high-voltage plug, according to the fifth embodiment.
Figure 36:
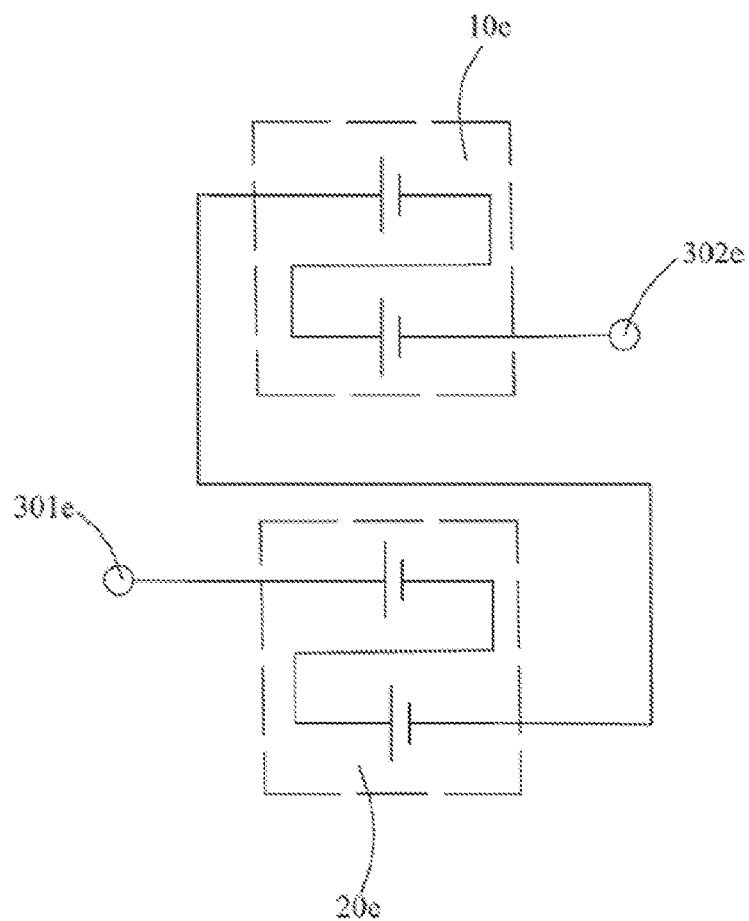
FIG. 36 is a schematic view of the circuit when the electric energy storage device is matched with the high-voltage plug, according to the fifth embodiment.

Please refer to FIG. 35 and FIG. 36, a high-voltage electric tool (not shown) is provided with a high-voltage plug and its working voltage is 4 nV. The high-voltage plug is provided with connecting pieces which are respectively connected to two voltage output terminals 301e and 302e. The high-voltage plug is also provided with an external switching part corresponding to the inter-module control unit. The external switching part includes an insulating part 52e and a conductive part 62e. The insulating part 52e is used to disconnect the series switch 31e, and the conductive part 62e is used to turn on the parallel switches 43e, 44e, so that the energy modules 10e and 20e can be changed from parallel connection state to series connection state. The two energy units in the energy modules 10e and 20e are connected in series, and the output low voltage of the electric energy storage device is 4 nV.

In addition, it can be understood that when the electric energy storage device is provided with an inter-module control unit and an in-module control unit, the initial state can also be set to that the in-module control unit controls the battery units in each energy module in a parallel state, and the inter-module control unit controls the energy modules in a series state. The specific control method can be combined with reference to the second embodiment and the fourth embodiment.

Sixth Embodiment

In the previous five embodiments, the electric energy storage device includes 4 energy units with the equal voltage, which are divided into 2 groups, and there are 2 energy units in each group. That is, N=4, M=2, K=2. Since M is equal to K, the values of medium voltage corresponding to the third and fourth connection states are equal to each other. Besides that, with the low voltage corresponding to the first connection state and the high voltage corresponding to the second connection state, there are 3 kinds of output voltages in total. The disclosure also provides the sixth embodiment with different values of M and K, which can correspond to multiple values of medium voltage.

Figure 37:
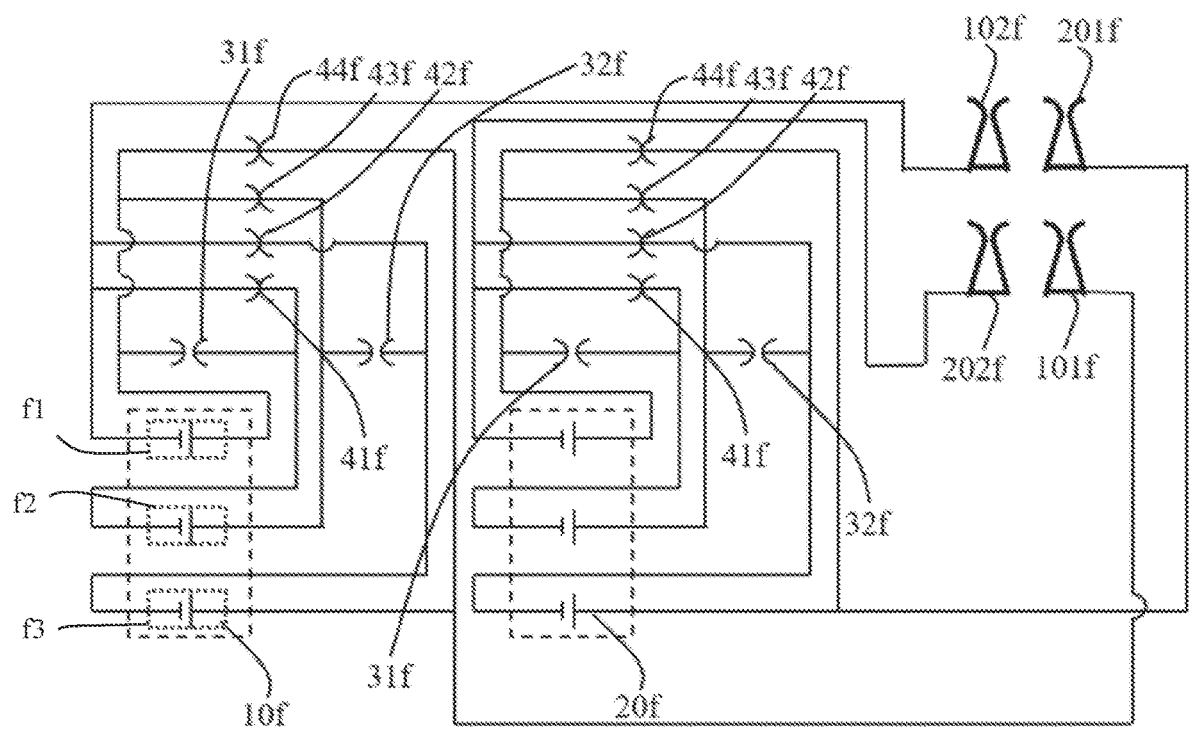
FIG. 37 is a schematic view of the connection of six energy units in the electric energy storage device, according to the sixth embodiment.

Please refer to FIG. 37, in the sixth embodiment, the electric energy storage device includes 6 energy units with the equal voltage, and the voltage is nV. The 6 energy units are equally divided into two energy modules 10f, 20f, and each energy module 10f, 20f includes 3 energy units 10f1, 10f2, and 10f3, which means that in the sixth embodiment, N=6, M=2, K=3.

The socket of the electric energy storage device is provided with 4 voltage output terminals, including the voltage output terminals 101f and 102f corresponding to the positive and negative electrodes of the energy module 10f, and the voltage output terminals 201f, 202f corresponding to the positive and negative electrodes of the energy module 20f. The setting rules and methods of the voltage output terminals are the same as the one in the first embodiment, please refer to its content.

The socket of the electric energy storage device is also provided with an in-module control unit corresponding to each energy module 10f, 20f. In general, the sixth embodiment is similar to the first embodiment. But the difference is that the number of energy units in each energy module 10f and 20f is different, and the number of series switches and parallel switches of the corresponding in-module control unit will be different.

According to the mentioned setting rule, the number of parallel switches corresponding to the number of energy units K is set to 2*(K−1), and the number of series switches corresponding to the number of energy units K is set to (K−1). In the sixth embodiment, when K is equal to 3, there are 2 series switches and 4 parallel switches. Specifically, the in—module control unit includes two series switches 31f, 32*f* and four parallel switches 41*f*, 42*f*, 43*f*, 44*f*. In this embodiment, each of the series switches 31*f*, 32*f*, and the parallel switches 41*f*, 42*f*, 43*f*, 44*f* include two contact parts (not labeled) connected to the electrodes of the energy unit, and the two contact parts of all of the parallel switches 41*f*, 42*f*, 43*f*, 44*f* are respectively connected to the electrode with the same polarity of the energy unit, and the two contact parts of the series switch 31*f* and 32*f* are connected to the electrode with the opposite polarity of the energy unit.

Taking the first energy module 10*f* as an example, the two contacts of the first parallel switch 41*f* are connected to the negative poles of the first energy unit 10/1 and the second energy unit 10/2, the second parallel switch 42*f* is connected to the negative poles of the first energy unit 10/1 and the third energy unit 10/3, the two contacts of the third parallel switch 43*f* are connected to the positive poles of the first energy unit 10/1 and the second energy unit 10/2, and the two contacts of the fourth parallel switch 44*f* are connected to the positive poles of the first energy unit 10/1 and the third energy unit 10/3, which means that the parallel switches 41*f* and 42*f* respectively connect the negative poles of the three energy units 10/1, 10/2, and 10/3 in parallel by two—by—two connection, and the parallel switches 43*f* and 44*f* respectively also connect the positive poles of the three energy units 10/1, 10/2 and 10/3 in parallel by two—by—two connections.

The series switch 31*f* connects the positive pole of the first energy unit 10/1 and the negative pole of the second energy unit 10/2, and the series switch 32*f* connects the positive pole of the second energy unit 10/2 and the negative pole of the third energy unit 10/3, which means that the series switches 31*f* and 32*f* are connected in series among the three energy units 10/1, 10/2, and 10/3.

Figure 38:
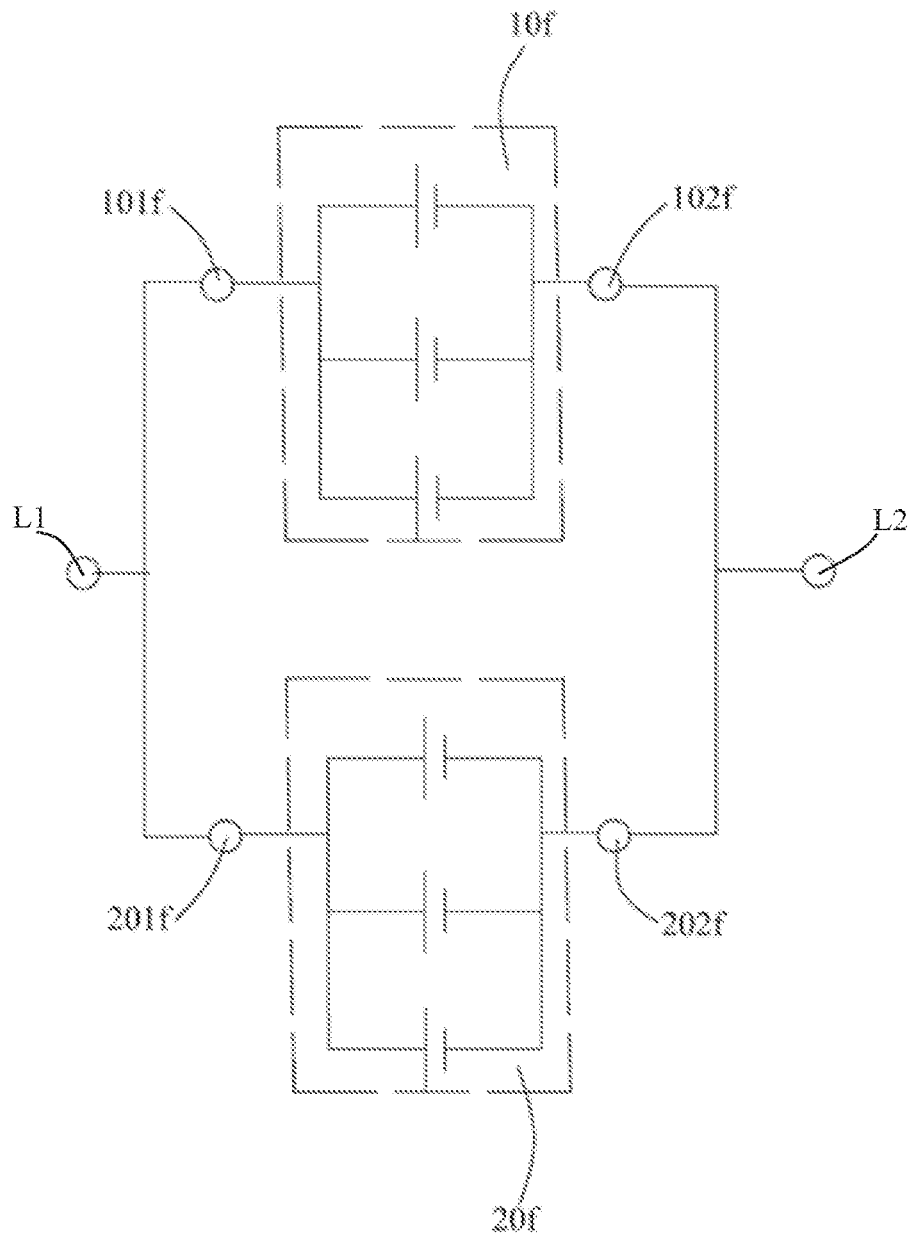
FIG. 38 is a schematic view of the circuit when the electric energy storage device is matched with a low-voltage plug, according to the sixth embodiment.

Therein, the parallel switches 41*f*, 42*f*, 43*f*, 44*f* can be normally closed switches, which are initially conductive, and the series switches 31*f*, 32*f* can be normally open switches, which are initially disconnected. Therefore, initially, the three energy units 10/1, 10/2, and 10/3 in each energy module 10*f*, 20*f* are connected in parallel, and the external output voltage is nV Please refer to FIG. 38, a low—voltage electric tool (not shown) is provided with a low—voltage plug and its working voltage is nV. The low—voltage plug is provided with two connecting pieces L1, L2 which connect the electrodes with the same polarity of the two energy modules. When the low—voltage plug is mated with the socket, one connecting piece connects the voltage output terminals 101*f* and 201*f* corresponding to the positive poles of the two energy modules 10*f* and 20*f*, and the other connecting piece connects the voltage output terminal 102*f* and 202*f* corresponding to the negative poles of the two energy modules 10*f* and 20*f*, so that the two energy modules 10*f*, 20*f* are connected in parallel, and electric energy storage device outputs a low voltage of the nV to the low—voltage electric tool.

Figure 39:
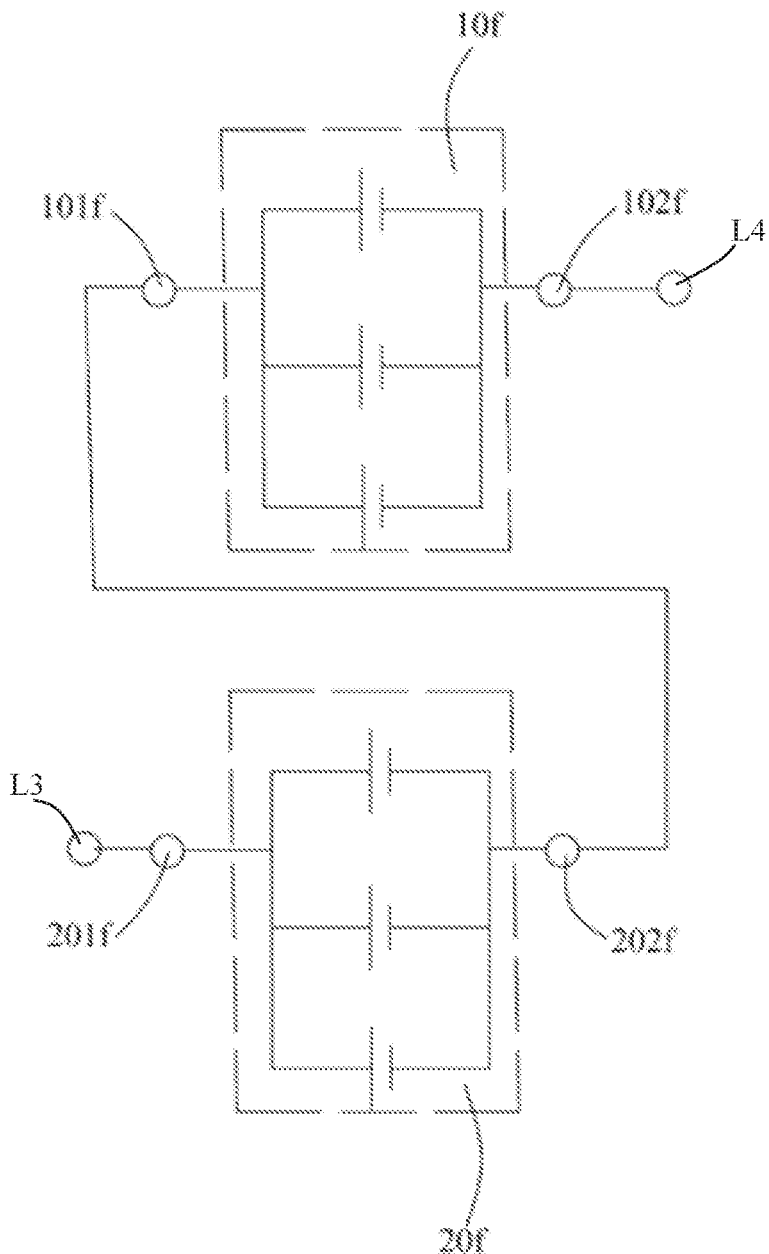
FIG. 39 is a schematic view of the circuit when the electric energy storage device is matched with a first medium-voltage plug, according to the sixth embodiment.

Please refer to FIG. 39, a medium—voltage electric tool (not shown) is provided with a first medium voltage plug and its working voltage is 2 nV. The first medium voltage plug is provided with connecting pieces (Not shown) which connect the two energy modules 10*f*, 20*f* in series. When the electric energy storage device of the medium—voltage electric tool works, the first medium voltage plug is mated with the socket, and the connecting pieces connect the two voltage output terminals with different polarities of the different energy modules 10*f* and 20*f* among the four voltage output terminals. For example, the positive voltage output terminal 101*f* of the first energy module 10*f* is connected with the negative voltage output terminal 202*f* of the second energy module 20*f*, so that the two energy modules 10*f*, 20*f* are connected in series. The first medium—voltage plug is also provided with two connecting pieces L3, L4 which are respectively connected to the other two voltage output terminals 201*f*, 102*f* with different polarities of the two energy modules 10*f* and 20*f*. Simultaneously, the three energy units 10/1, 10/2, and 10/3 in each energy module 10*f*, 20*f* are connected in parallel through the in—module control unit, so that the electric energy storage device outputs the first medium voltage of 2 nV to the medium—voltage electric tool.

Figure 40:
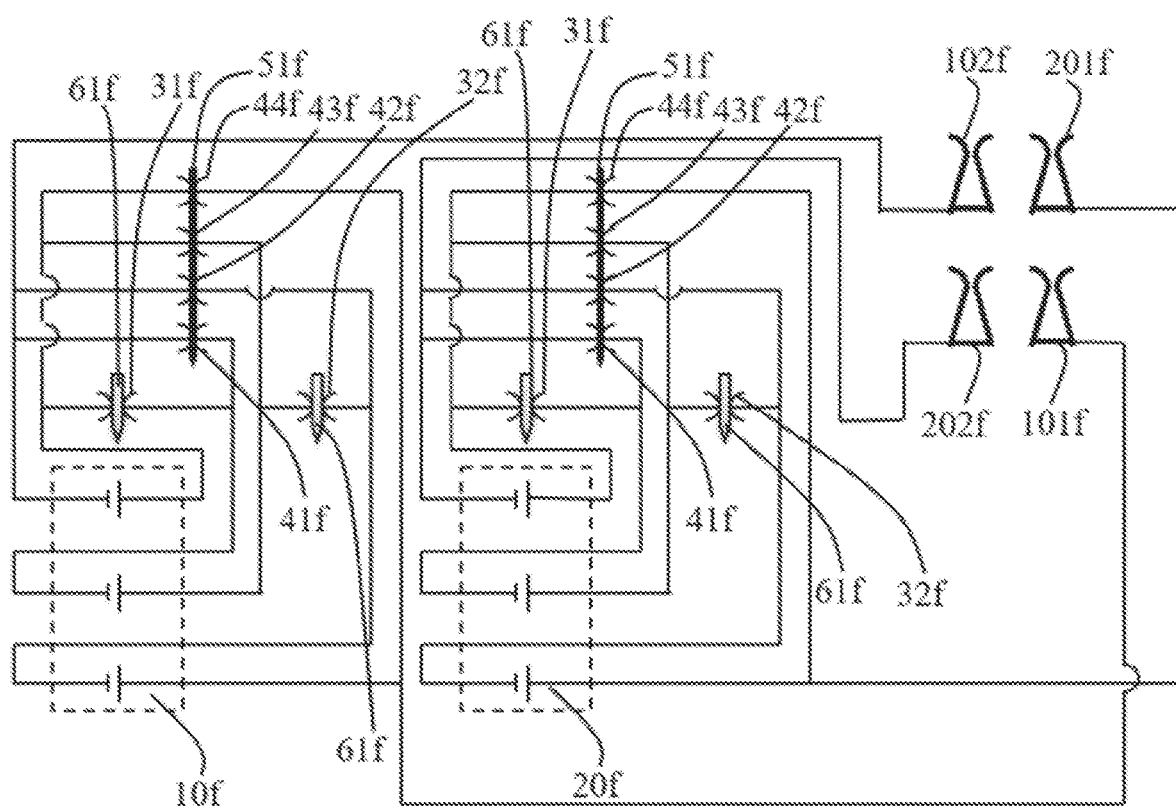
FIG. 40 is a schematic view of the connection between the electric energy storage device and a second medium-voltage plug, according to the sixth embodiment.
Figure 41:
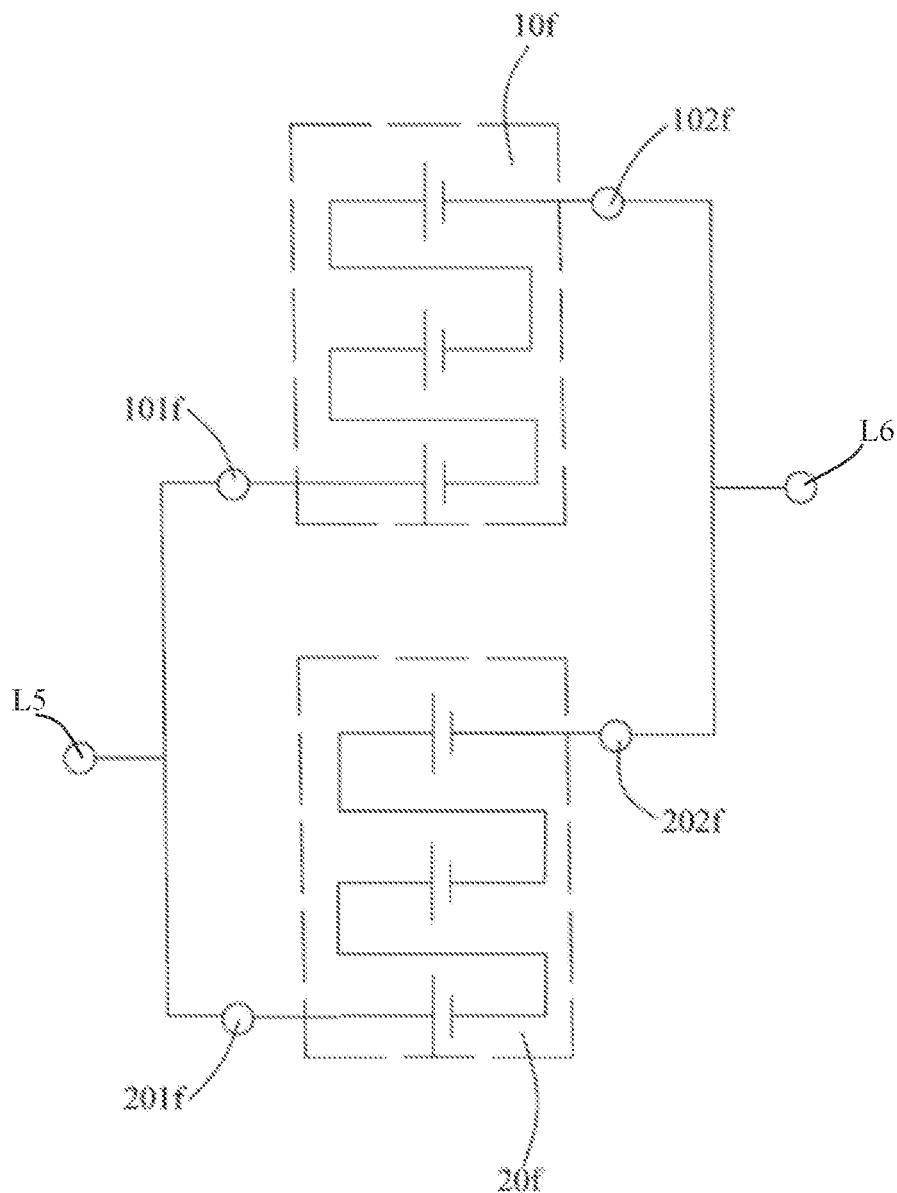
FIG. 41 is a schematic view of the circuit when the electric energy storage device is matched with the second medium-voltage plug, according to the sixth embodiment.

Please refer to FIG. 40 through FIG. 41, another medium—voltage electric tool (not shown) is provided with a second medium—voltage plug and its working voltage is 3 nV. The second medium—voltage plug is provided with two connecting pieces L5 and L6 which connect the two energy modules in parallel. One of the connecting pieces is connected with the voltage output terminals 101*f* and 201*f* corresponding to the positive poles of the two energy modules 10*f* and 20*f*, and the other one is connected to the voltage output terminals 102*f* and 202*f* corresponding to the negative poles of the two energy modules 10*f* and 20*f*, so that the two energy modules 10*f* and 20*f* are connected in parallel.

The second medium—voltage plug is also provided with an internal switching part. The internal switching part corresponds to the in—module control unit and includes an insulating part 51*f* and a conductive part 61*f*. When the second medium—voltage plug is mated with the socket, the insulating portion 51*f* is in contact with the two contact parts of the parallel switches 41*f*, 42*f*, 43*f*, and 44*f*, so that the parallel switches 41*f*, 42*f*, 43*f*, and 44*f* are disconnected. The conductive part 61*f* is in contact with the two contact parts of the series switches 31*f* and 32*f*, so that the series switches 31*f* and 32*f* are conductive, and the three energy units 10/1, 10/2, 10/3 in each energy module 10*f*, 20*f* are changed from parallel connection state to series connection state. The output voltage of each energy module 10*f* and 20*f* is 3 nV. The two energy modules 10*f* and 20*f* are connected in parallel through the connecting pieces L5 and L6. Therefore, the electric energy storage device outputs the second medium voltage of 3 nV to the second medium—voltage electric tool.

Figure 42:
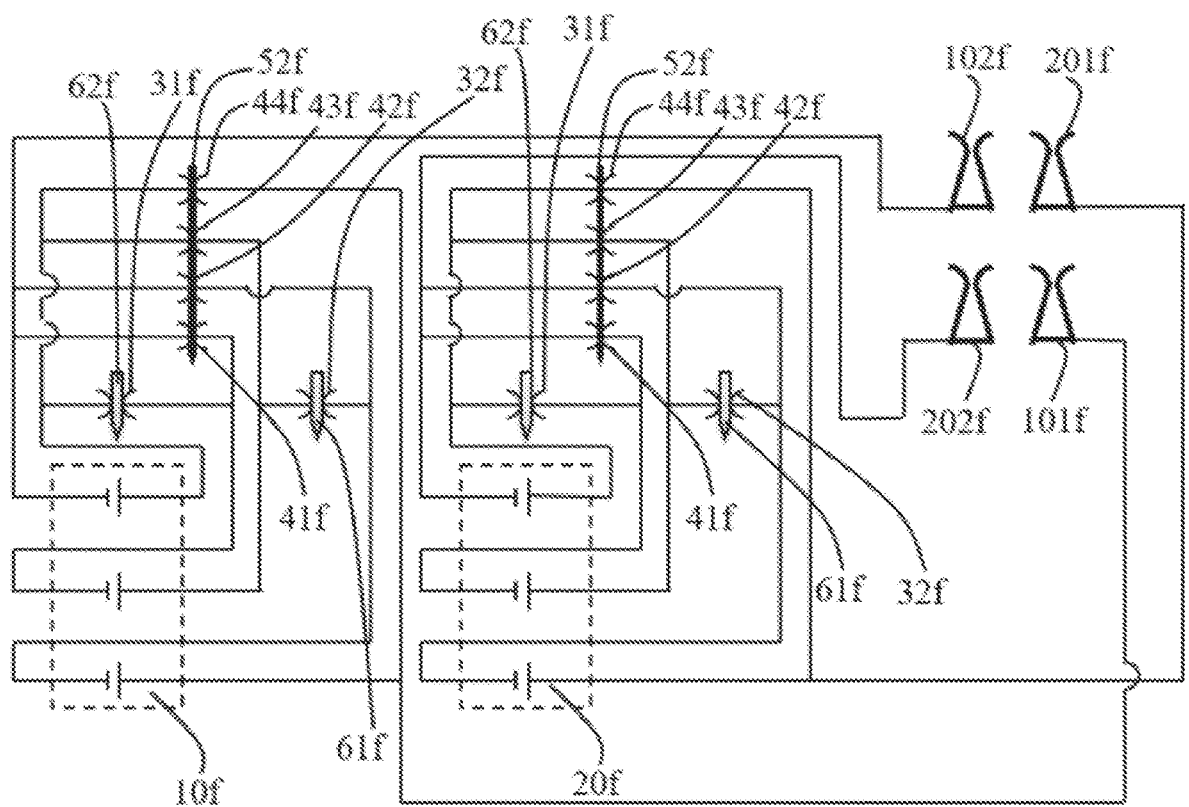
FIG. 42 is a schematic view of the connection between the electric energy storage device and a high-voltage plug, according to the sixth embodiment.
Figure 43:
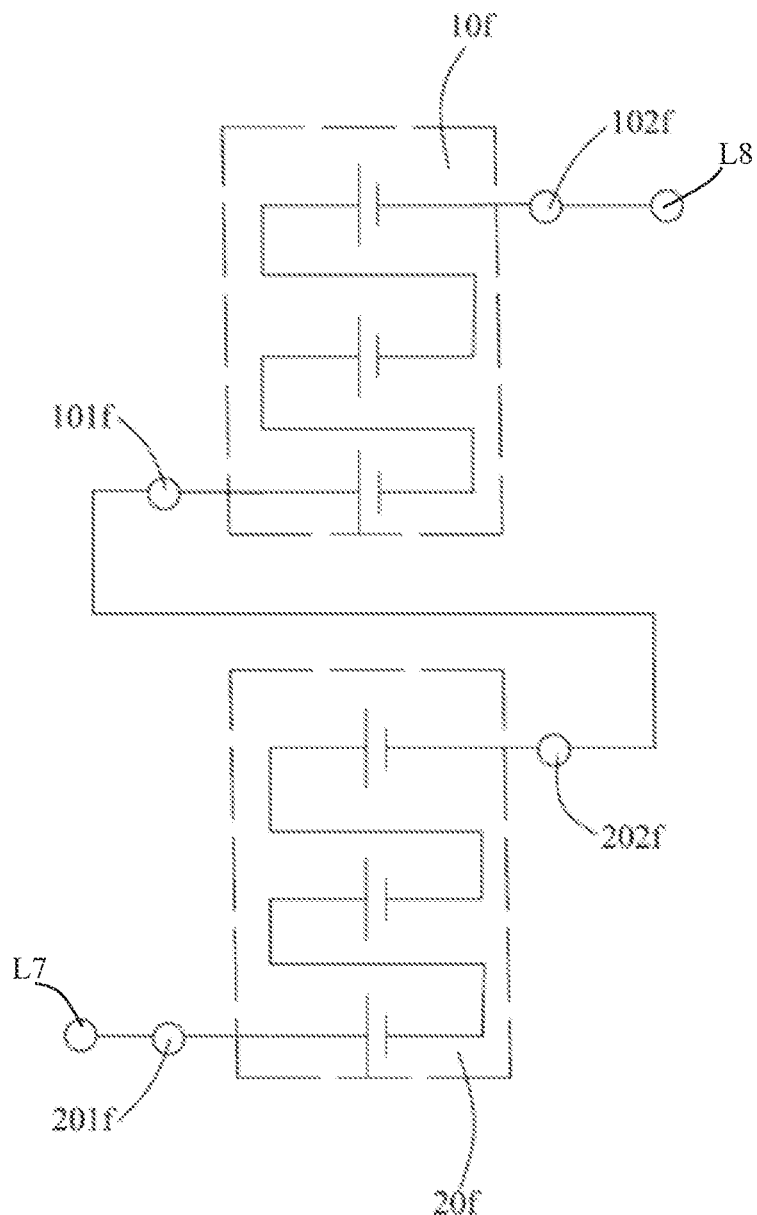
FIG. 43 is a schematic view of the circuit when the electric energy storage device is matched with the high-voltage plug, according to the sixth embodiment.

Please refer to FIG. 42 and FIG. 43, a high—voltage electric tool (not shown) is provided with a high—voltage plug and its working voltage is 6 nV. The high—voltage plug is provided with connecting pieces (not shown) that connects the two energy modules in series. The connecting pieces connect the voltage output terminals with different polarities of the different energy modules 10*f* and 20*f* among the four voltage output terminals. For example, the positive electrode 101*f* of the energy module 10*f* is connected to the negative electrode 202*f* of the energy module 20*f*, so that the two energy modules 10*f*, 20*f* are connected in series. The high—voltage plug is also provided with two connecting pieces L7, L8, which are respectively connected to the other two voltage output terminals 201*f*, 102*f* with different polarities of the two energy modules 10*f* and 20*f*.

The high—voltage plug is also provided with an internal switching part that cooperates with the in—module control unit. The internal switching part includes an insulating part 52*f* and a conductive part 62*f*. When the high—voltage plug is mated with the socket, the insulating part 52*f* is inserted between the two contact parts of the parallel switches 41*f*, 42*f*, 43*f*, 44*f*, so that the parallel switches 41*f*, 42*f*, 43*f*, 44*f* are disconnected. The conductive part 62*f* is in contact with the two contact parts of the series switches 31*f* and 32*f*, so that the series switches 31f and 32f are conductive. That is, the three energy units 10/1, 10/2, 10/3 in each energy module 10f, 20f are connected in series, and the energy modules 10f, 20f are connected in series through the connecting pieces. Therefore, the electric energy storage device outputs a high voltage of 6 nV to the high—voltage electric tool.

Corresponding to the sixth embodiment, the disclosure also provides an electric tool system, including the low—voltage electric tool, the first medium—voltage electric tool, the second medium—voltage electric tool, the high—voltage electric tool, and the electric energy storage device mentioned above. The electric tool system may also include a regular low—voltage battery pack with a rated voltage of nV, a regular first medium—voltage battery pack with a rated voltage of 2 nV, a regular second medium—voltage battery pack with a rated voltage of 3 nV, and a regular high—voltage battery pack with a rated voltage of 6 nV. The electric energy storage device of the disclosure can be matched with the low—voltage electric tool, the first medium—voltage electric tool, the second medium—voltage electric tool and the high—voltage electric tool, and provides different output voltages, so that the low—voltage electric tool, the first medium—voltage electric tool, the second medium—voltage electric tool and the high—voltage electric tool can work normally. Simultaneously, the low—voltage electric tools can also be matched with the regular low—voltage battery packs. The regular low—voltage battery packs are correspondingly provided with output terminals which are connected to the connecting pieces L1 and L2 of the low—voltage electric tools. The first medium—voltage electric tool can also be matched with a regular first medium—voltage battery pack. The regular first medium—voltage battery pack is correspondingly provided with output terminals which are connected to the connecting pieces L3 and L4 of the first medium—voltage electric tool. The second medium—voltage electric tool can also be matched with a regular second medium—voltage battery pack. The regular second medium—voltage battery pack is correspondingly provided with output terminals which are connected to the connecting pieces L5 and L6 of the second medium—voltage electric tool. The high—voltage electric tools can also be matched with regular high—voltage battery packs. The regular high—voltage battery packs are correspondingly provided with output terminals which are connected to the connecting pieces L7 and L8 of the high—voltage electric tools.

Seventh Embodiment

Figure 44:
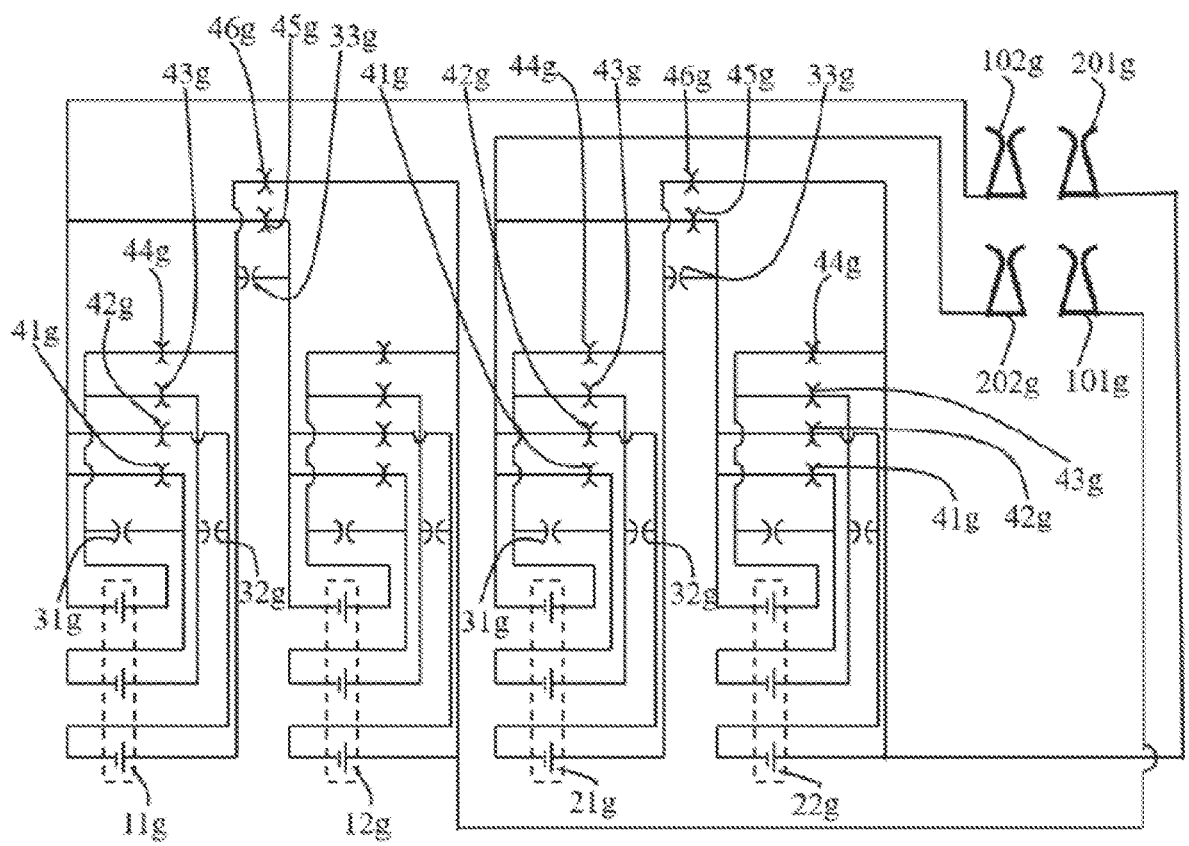
FIG. 44 is a schematic view of the connection of twelve energy units in the electric energy storage device, according to the seventh embodiment.

Please refer to FIG. 44, in the seventh embodiment, the electric energy storage device includes 12 energy units with the equal voltage, and the voltage is nV. The 12 energy units are equally divided into 2 modules of 10g and 20g, which means that N=12, M=2, K=6.

For ease of understanding, each module 10g and 20g can be regarded as a sub—electric energy storage device, and its connection method is the same as the one in the sixth embodiment. Each module 10g, 20g includes 2 energy modules 11g, 12g, 21g, 22g, and each energy module 11g, 12g, 21g, 22g includes 3 energy units. The socket of the electric energy storage device is provided with two voltage output terminals 101g and 102g which are respectively connected to the total positive electrode of the two modules 10g and 20g, and two voltage output terminals 201g and 202g which are respectively connected to the total negative electrode of the two modules 10g and 20g.

The structures of the two modules 10g and 20g are the same. The following is described with the module 10g. The socket of the electric energy storage device is provided with two in—module control units and one inter—module control unit corresponding to each energy module 11g, 12g in the modules 10g, 20g. The in—module control unit includes two series switches 31g, 32g and four parallel switches 41g, 42g, 43g, 44g, which control the connection state of the three energy units in each energy module 11g, 12g. The specific connection method can be referred to the sixth embodiment.

The inter—module control unit includes one series switch 33g and two parallel switches 45g and 46g, which control the connection state between the energy modules 11g and 12g. The connection method is the same as the one of the embodiment mentioned above. The series switch 33g is used to connect the two electrodes with different polarities in the energy modules 11g and 12g to form a series connection, and the parallel switches 45g and 46g are used to connect the two electrodes with the same polarity in the two energy modules 11g and 12g to form a parallel connection, which means that initially, the energy modules 11g and 12g are connected in parallel.

Figure 45:
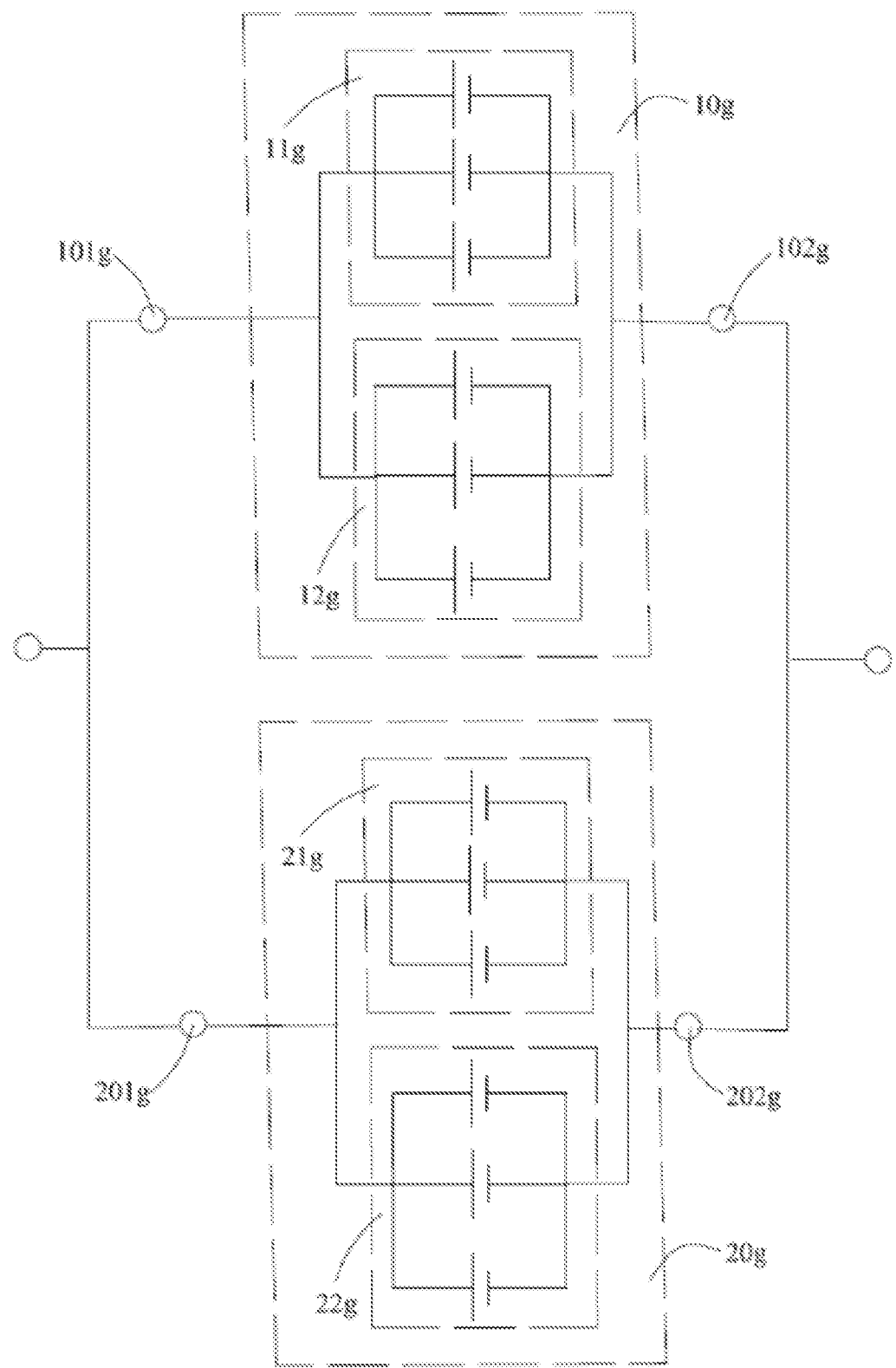
FIG. 45 is a schematic view of the circuit when the electric energy storage device is matched with a low-voltage plug, according to the seventh embodiment.

In this embodiment, the parallel switches 41g, 42g, 43g, 44g, 45g, and 46g of the in—module control unit are normally closed switches and are initially conductive. The series switches 31g, 32g, and 33g are normally open switches and are initially disconnected, which means that initially, the three energy units in the energy modules 11g and 12g are connected in parallel. Therefore, initially, the six energy units in each module 10g and 20g are all connected in parallel Please refer to FIG. 45, a low—voltage electric tool (not shown) is provided with a low—voltage plug and its working voltage is nV. The low—voltage plug is provided with two connecting pieces which are connected to the voltage output terminals 101g, 102g, 201g, and 202g in parallel, so that the modules 10g and 20g are connected in parallel. Therefore, the six energy units in each module 10g and 20g are kept being connected in parallel to output low—voltage of nV to the low—voltage electric tools.

Figure 46:
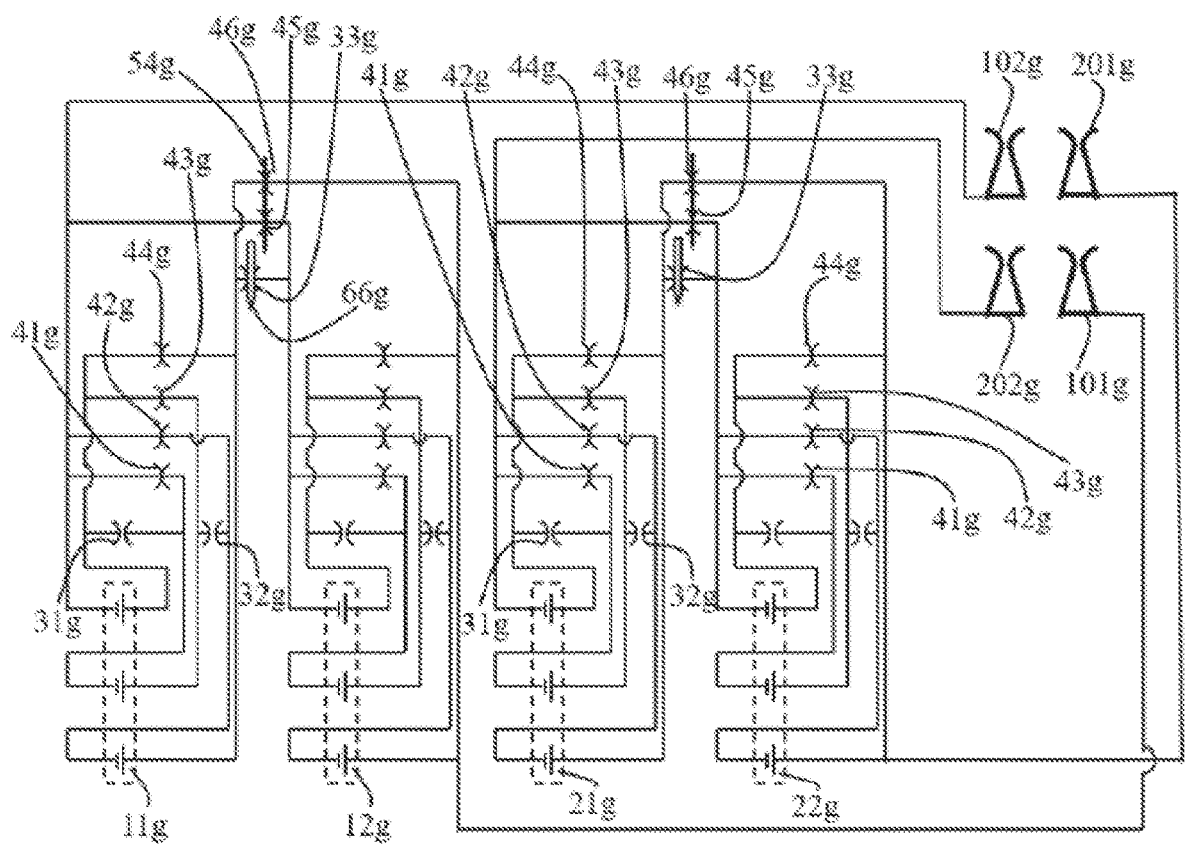
FIG. 46 is a schematic view of the connection between the electric energy storage device and a first medium-voltage plug, according to the seventh embodiment.
Figure 47:
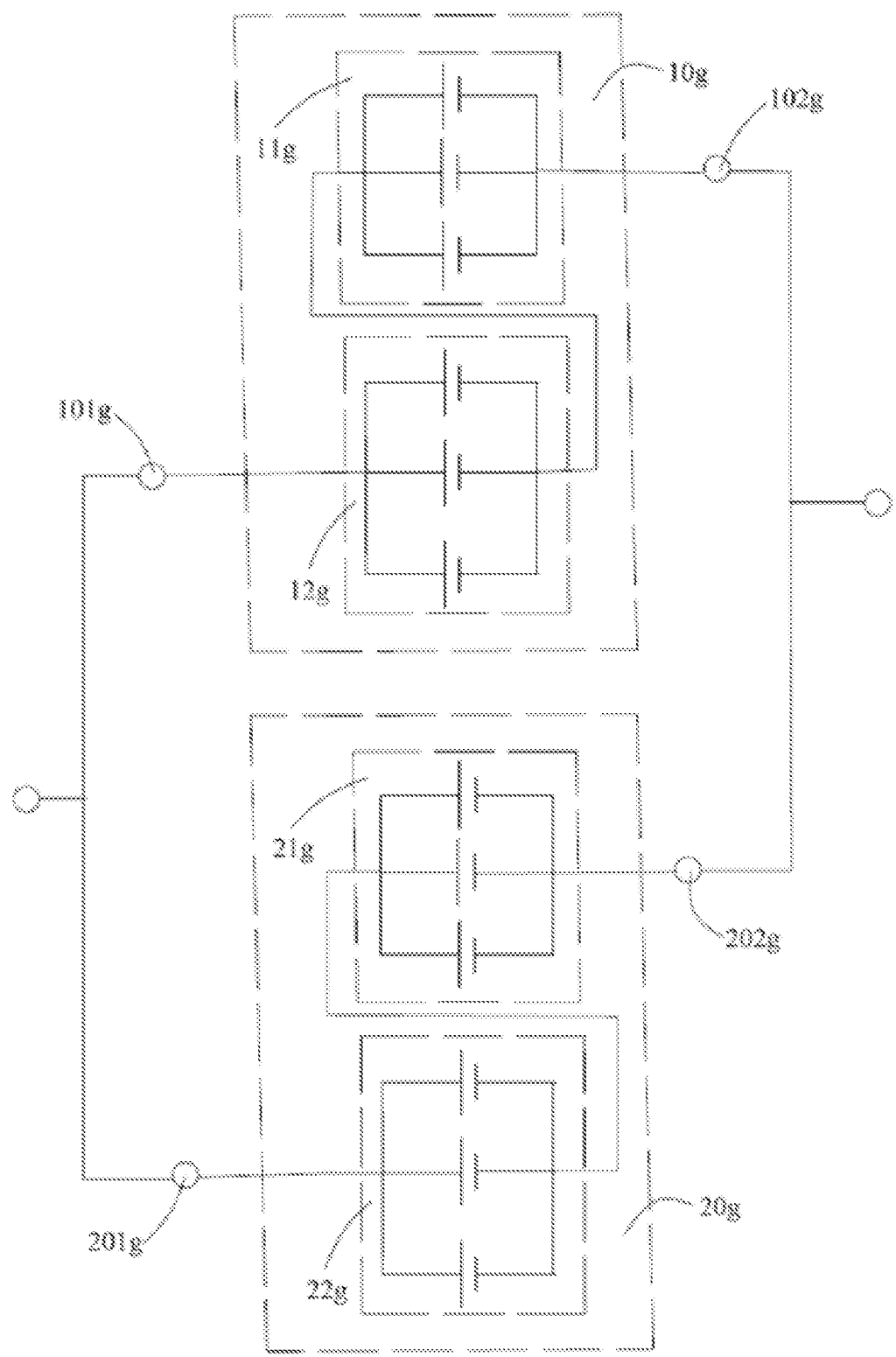
FIG. 47 is a schematic view of the circuit when the electric energy storage device is matched with the first medium-voltage plug, according to the seventh embodiment.

Please refer to FIG. 46 and FIG. 47, a first medium—voltage electric tool (not shown) is provided with a first medium—voltage plug and its working voltage is 2 nV. The first medium—voltage plug is provided with an external switching part corresponding to the inter—module control unit of each module 10g, 20g. The external switching part includes an insulating part 54g for disconnecting the parallel switches 45g and 46g of the inter—module control unit, and a conductive part 66g for turning on the series switch 33g of the inter—module control unit, so that the two energy modules 11g, 12g, 21g, 22g in each module 10g, 20g are changed from parallel connection state to series connection state, and the three energy units in each energy module 11g, 12g, 21g, 22g are kept being connected in parallel. The output voltage of each module 10g, 20g is 2 nv. The first medium—voltage plug is also provided with connecting pieces for connecting the voltage output terminals 101g, 102g, 201g, 202g in parallel, so that the modules 10g and 20g are connected in parallel to output the first medium voltage of 2 nV to the first medium—voltage electric tool.

Figure 48:
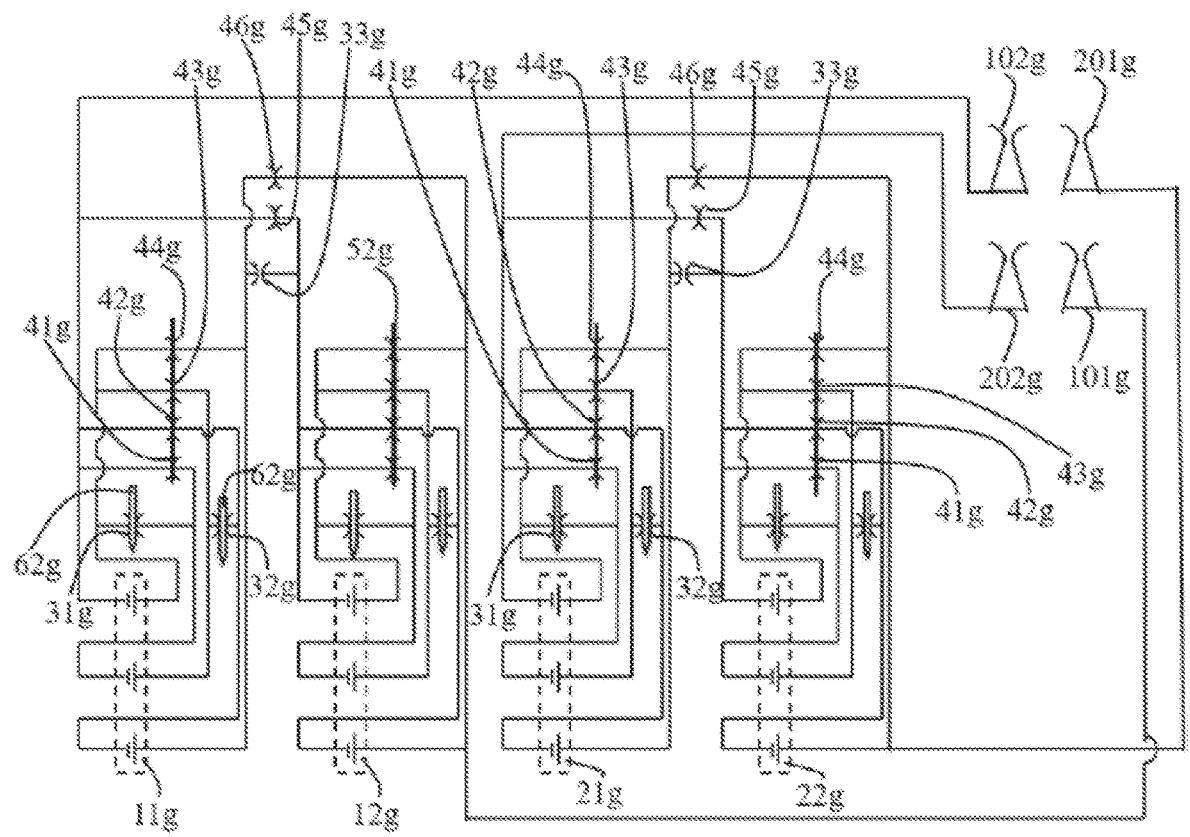
FIG. 48 is a schematic view of the connection between the electric energy storage device and a second medium-voltage plug, according to the seventh embodiment.
Figure 49:
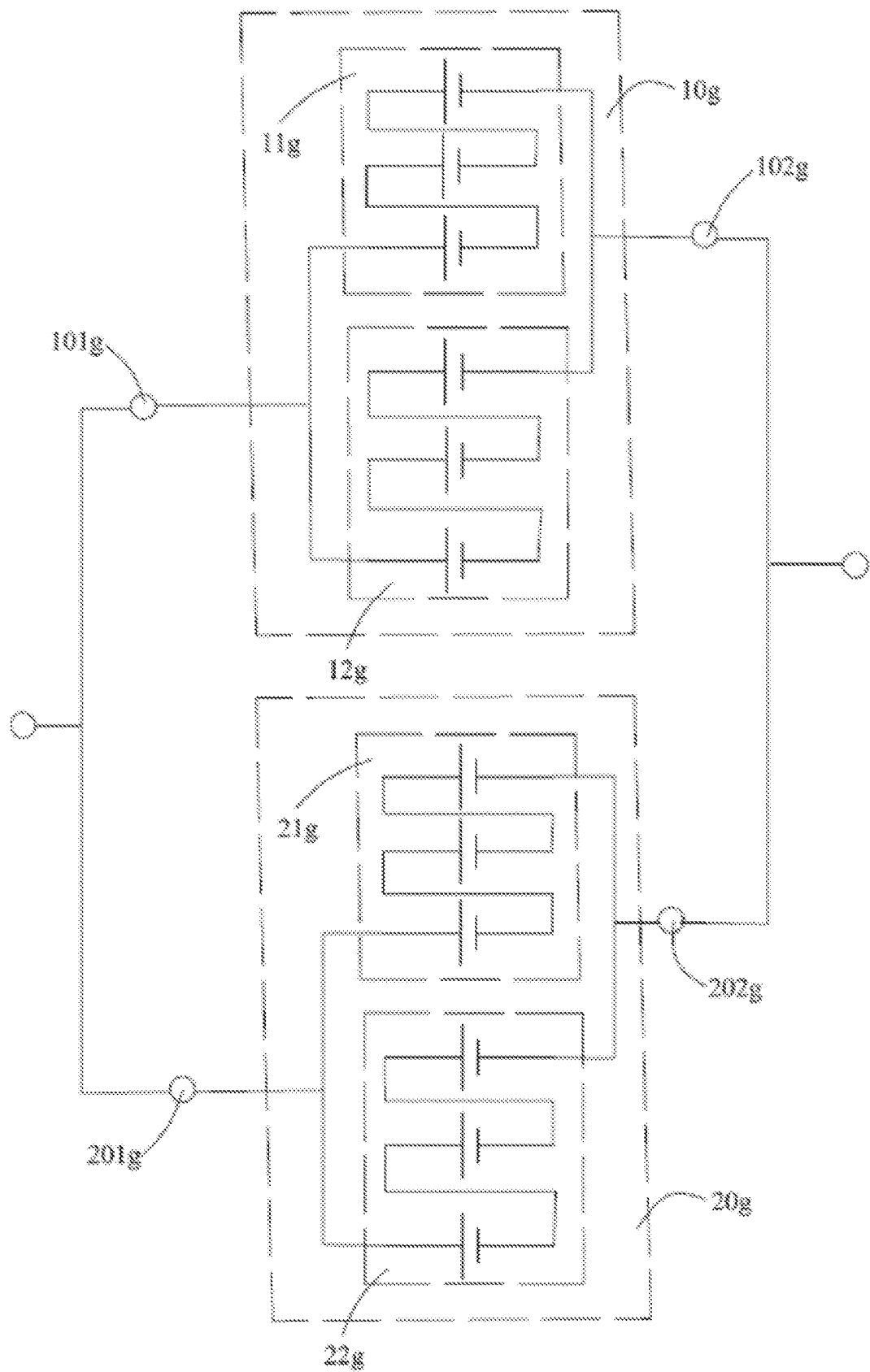
FIG. 49 is a schematic view of the circuit when the electric energy storage device is mated with the second medium-voltage plug, according to the seventh embodiment.

Please refer to FIG. 48 and FIG. 49, a second medium—voltage electric tool (not shown) is provided with a second medium voltage plug and its working voltage is 3 nV. The second medium—voltage plug is also provided with an internal switching part corresponding to the in—module control unit of each module 10g, 20g. The internal switching part includes an insulating part 52g for disconnecting the parallel switches 41g, 42g, 43g, 44g of the in—module control unit and a conductive part 62g for turning on the series switch 31g and 32g of the in—module control part, so that the three energy units in each energy module 11g, 12g, 21g, 22g are changed from parallel connection state to series connection state, and the two energy modules 11g, 12g, 21g, 22g in each module 10g, 20g are kept being connected in parallel. The output voltage of each module 10g, 20g is 3 nv. The inter—module control unit remains unchanged. The second medium—voltage plug is also provided with connecting pieces for connecting the voltage output terminals 101g, 102g, 201g, 202g in parallel, so that the modules 10g and 20g are connected in parallel to output the second medium—voltage of 3 nV to the second medium—voltage electric tools.

Figure 50:
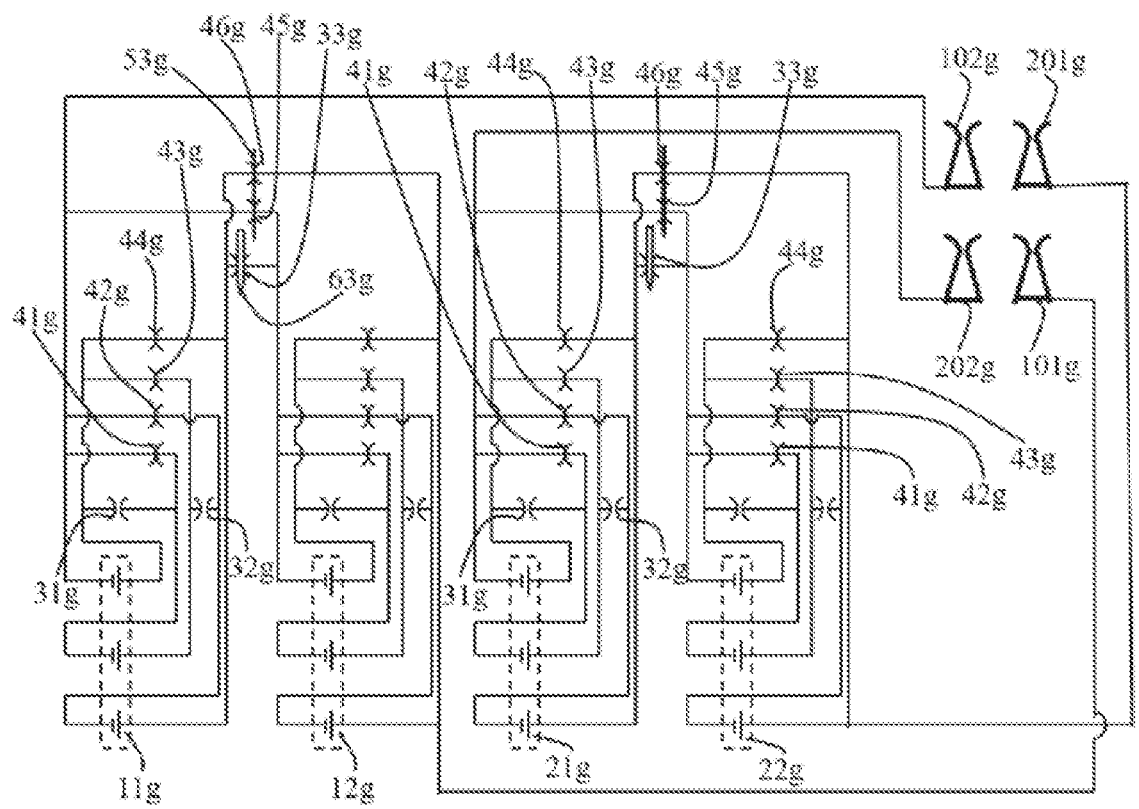
FIG. 50 is a schematic view of the connection between the electric energy storage device and a third medium-voltage plug, according to the seventh embodiment.
Figure 51:
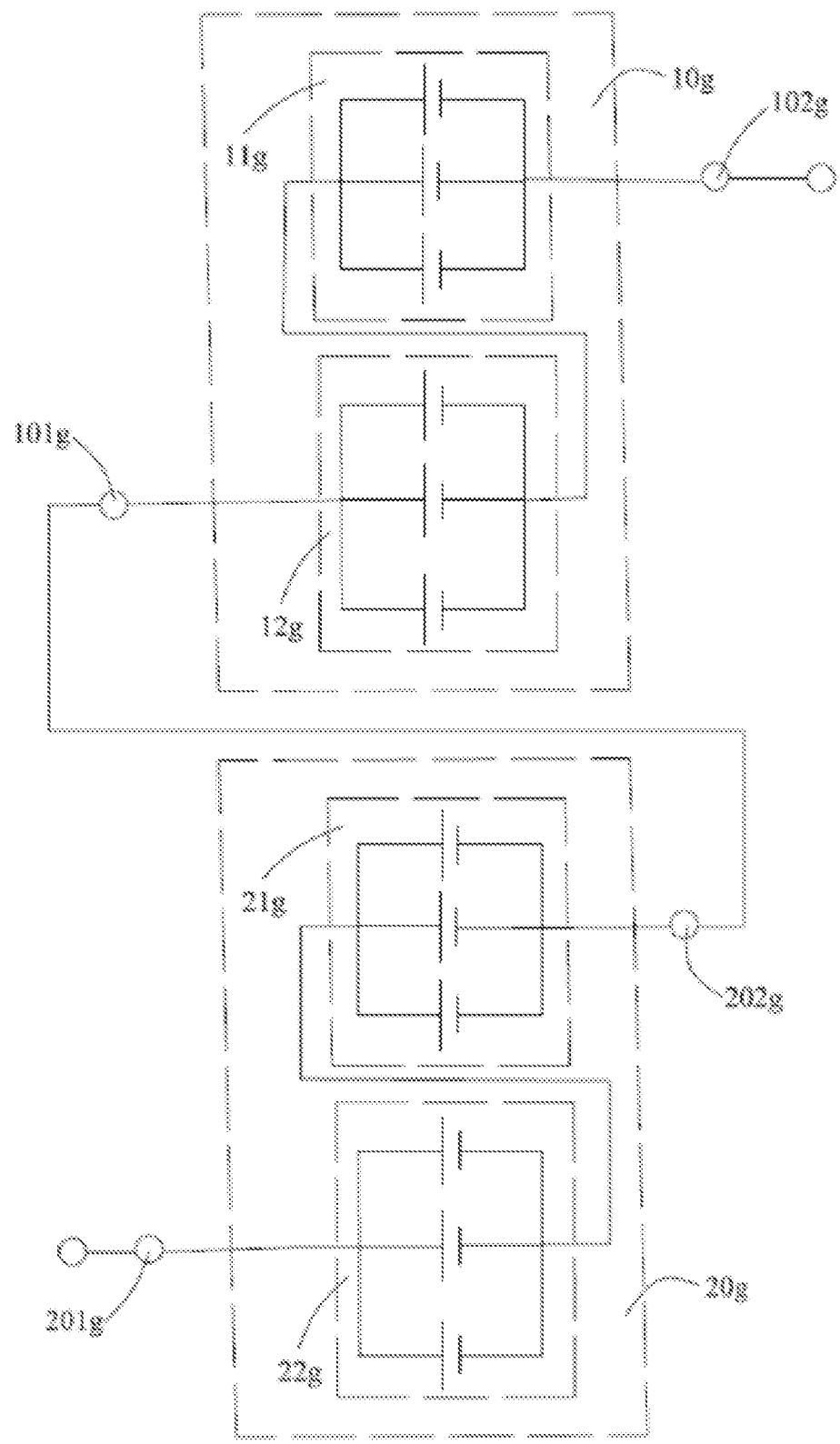
FIG. 51 is a schematic view of the circuit when the electric energy storage device is matched with the third medium-voltage plug, according to the seventh embodiment.

Please refer to FIG. 50 and FIG. 51, a third medium—voltage electric tool (not shown) is provided with a third medium—voltage plug and its working voltage is 4 nV. The third medium—voltage plug is also provided with an external switching part corresponding to the inter—module control unit of each module 10g and 20g. The external switching part includes an insulating part 53g for disconnecting the parallel switches 45g and 46g of the inter—module control unit and a conductive part 63g for turning on the series switch 33g of the inter—module control unit, so that the two energy modules 11g, 12g, 21g, 22g in each module 10g, 20g are changed from parallel connection state to series connection state, and the three energy units of each energy module 11g, 12g, 21g, 22g are kept being connected in parallel. The output voltage of each module 10g, 20g is 2 nv. The third medium—voltage plug is also provided with connecting pieces that connects the voltage output terminals 101g, 102g, 201g, 202g in series, so that the modules 10g and 20g are connected in series to output the third medium voltage of 4 nV to the third medium—voltage electric tool.

Figure 52:
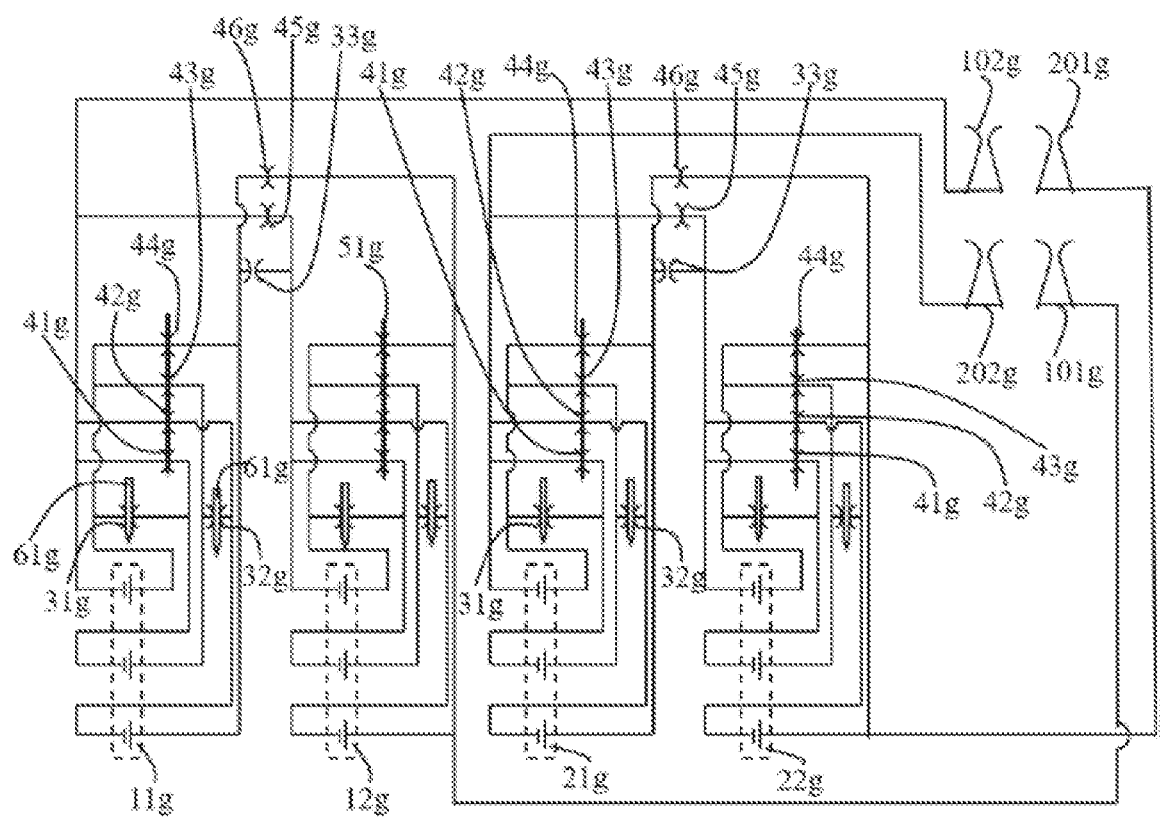
FIG. 52 is a schematic view of the connection between the electric energy storage device and a fourth medium-voltage plug, according to the seventh embodiment.
Figure 53:
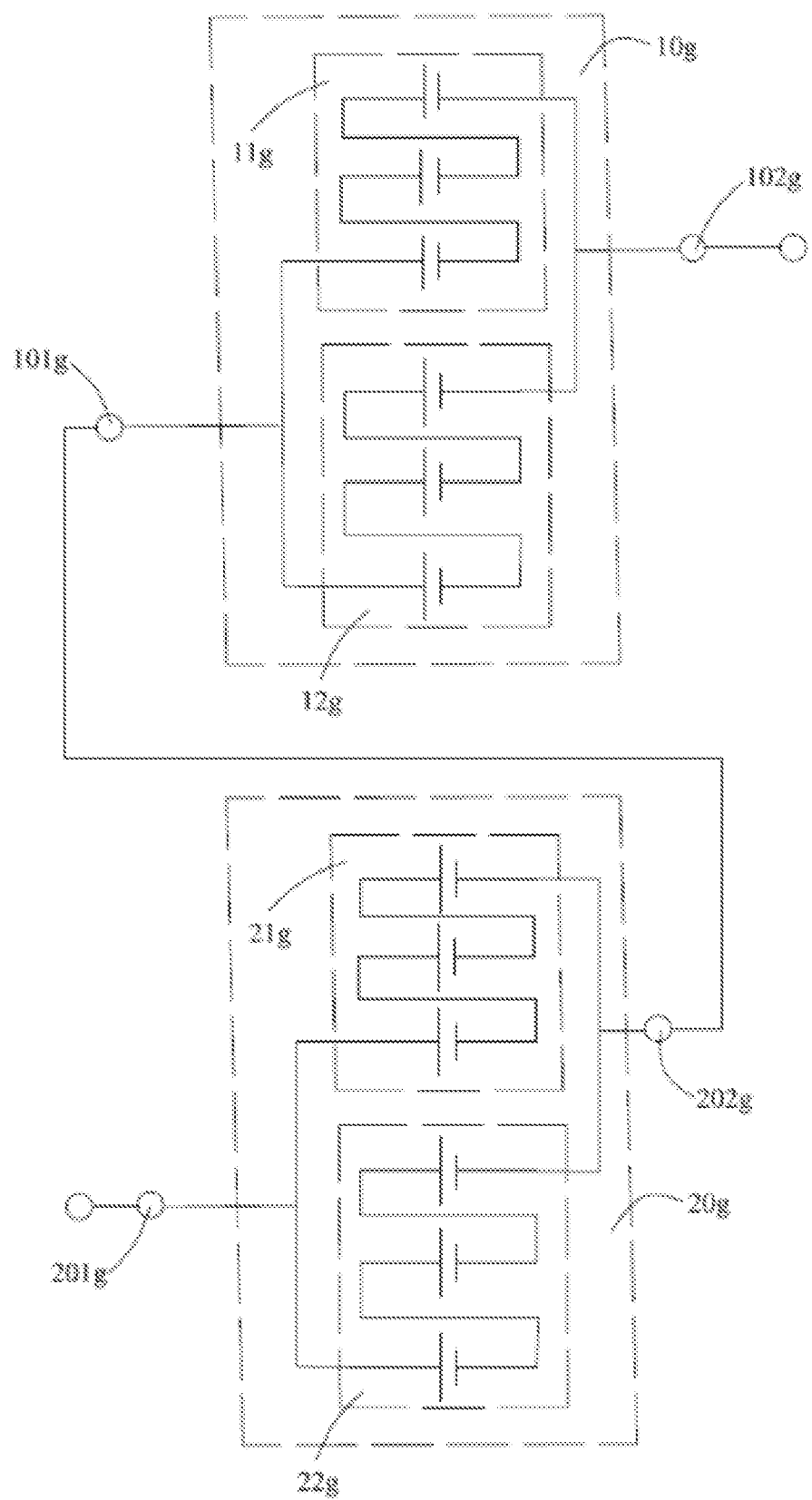
FIG. 53 is a schematic view of the circuit when the electric energy storage device is mated with the fourth medium-voltage plug, according to the seventh embodiment.

Please refer to FIG. 52 and FIG. 53, a fourth medium—voltage electric tool (not shown) is provided with a fourth medium—voltage plug and its working voltage is 6 nV. The fourth medium—voltage plug is also provided with an internal switching part corresponding to the in—module control unit of each module 10g and 20g. The internal switching part includes an insulating part 51g for disconnecting the parallel switches 41g, 42g, 43g, 44g of the in—module control unit and a conductive part 61g for turning on the series switches 31g and 32g of the in—module control unit, so that the three energy units in each energy module 11g, 12g, 21g, 22g are changed from parallel connection state to series connection state, the energy modules 11g, 12g, 21g, 22g of each module 10g, 20g are kept being connected in parallel, and the output voltage of each module 10g, 20g is 3 nv. The second medium—voltage plug is also provided with connecting pieces which connects the voltage output terminals 101g, 102g, 201g, 202g in series, so that the modules 10g and 20g are connected in series to output the fourth medium voltage of 6 nV to the fourth medium—voltage electric tool.

Figure 54:
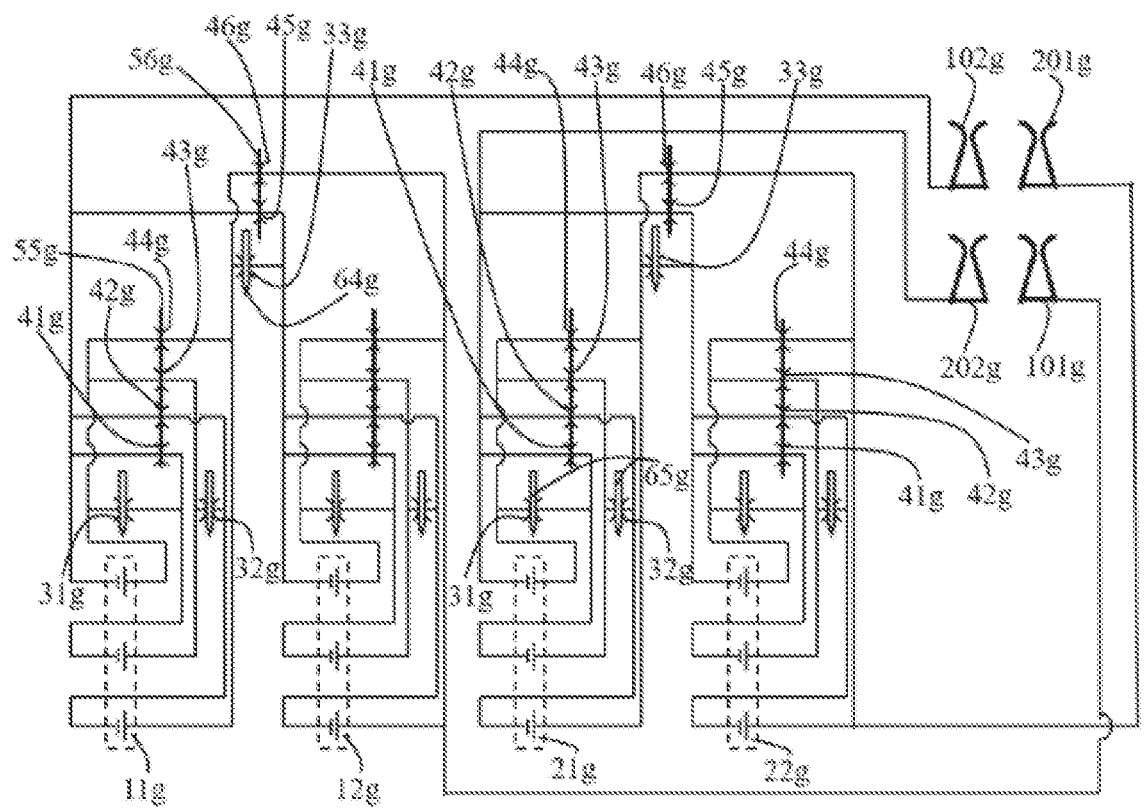
FIG. 54 is a schematic view of the connection between the electric energy storage device and a high-voltage plug, according to the seventh embodiment.
Figure 55:
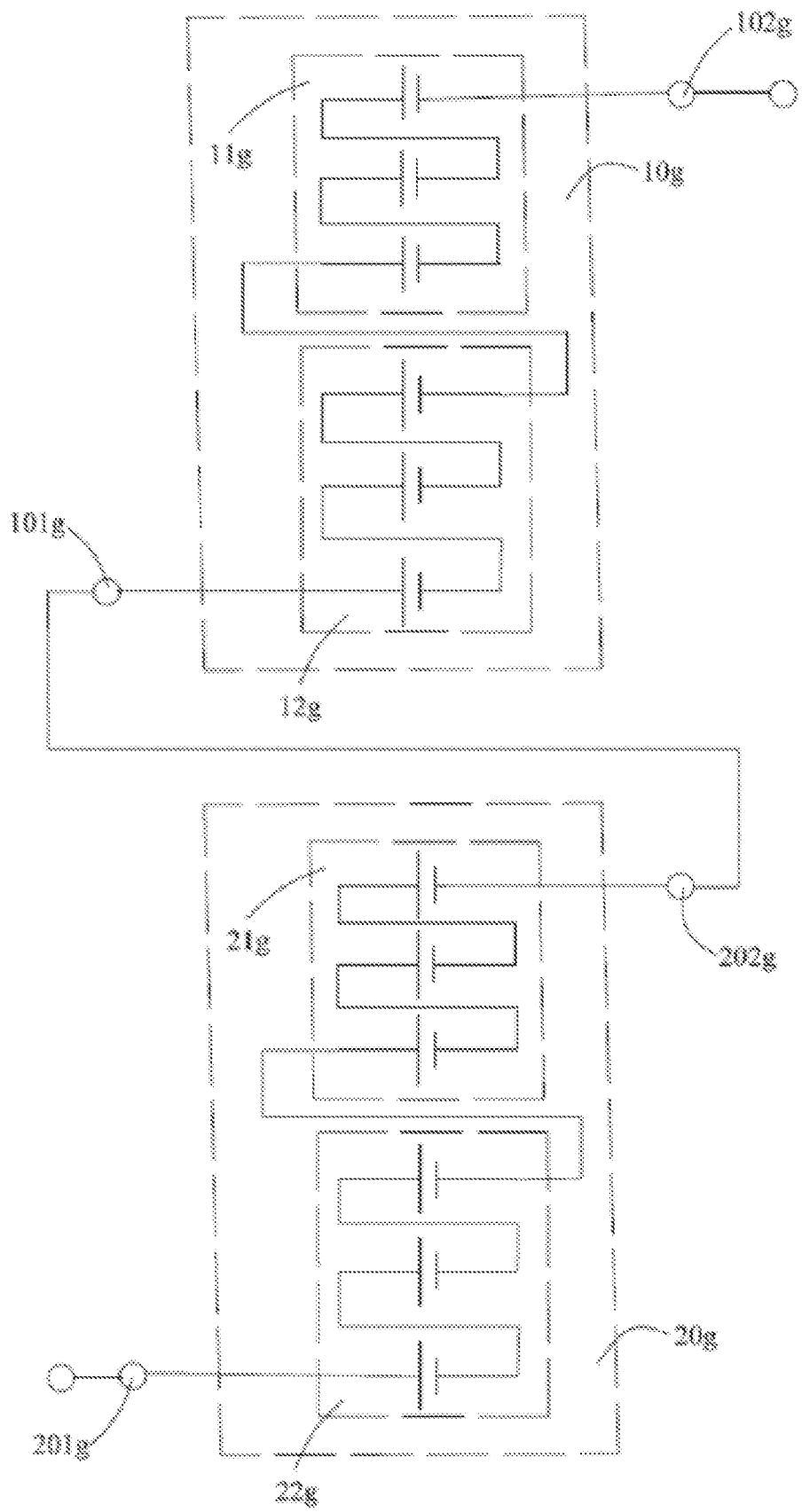
FIG. 55 is a schematic view of the circuit when the electric energy storage device is matched with the high-voltage plug, according to the seventh embodiment.

Please refer to FIG. 54 and FIG. 55, a high—voltage electric tool (not shown) is provided with a high—voltage plug and its working voltage is 12 nV. The high—voltage plug is also provided with an internal switching part corresponding to the in—module control unit of each module 10g and 20g. The internal switching part includes an insulating part 55g for disconnecting the parallel switches 41g, 42g, 43g, 44g of the in—module control unit and a conductive part 65g for turning on the series switches 31g and 32g of the in—module control unit, so that the 3 energy units in each energy module 11g, 12g, 21g, 22g are changed from parallel connection state to series connection state. The high—voltage plug is also provided with an external switching part corresponding to the inter—module control unit of each module 10g and 20g. The external switching part includes an insulating section 56g for disconnecting the parallel switches 45g and 46g of the inter—module control unit, and a conductive part 64g for turning on the series switch 33g of the inter—module control unit, so that the two energy modules 11g, 12g, 21g, 22g in each module 10g, 20g are also changed from parallel connection state to series connection state, and the output voltage of each module 10g, 20g is 6 nv. The high—voltage plug is also provided with connecting pieces that connect the voltage output terminals 101g, 102g, 201g, and 202g in series to connect the modules 10g and 20g in series to output high—voltage of 12 nV to the high—voltage electric tools.

Which means that when N is 12 and the voltage of a single energy unit is nV, the electric energy storage device can provide 6 kinds of voltages, they are low voltage of nV, high voltage of 12 nV and four medium voltages of 2 nV, 3 nV, 4 nV and 6 nV.

In the embodiments mentioned above, the distribution level of N is: energy unit→energy module→electric energy storage device, and the distribution level of N in the seventh embodiment is energy unit→energy module→module-→electrical energy storage device, which is one distribution level more than the first one. Considering the distribution formula of the energy unit, N=M*K, which means that when M≥4 or K≥4, or it can also be said that when N≥8, it can be further divided equally, so that N=k1*k2*k3 . . . , and the value of k1/k2/k3 . . . is greater than 1 and less than 4, which means it is 2 or 3. In other words, the energy units can be equally divided into multi—level modules. Each level module includes 2 or 3 secondary modules, and the lowest level energy module includes 2 or 3 energy units.

The output voltage of N energy units is U=k1*k2*k3*nV, when any one of the levels is connected in parallel, it is equivalent to omitting this coefficient, which is equivalent to various permutations and combinations of k1, k2, k3 . . . . Simultaneously, the same result should be removed, which corresponds to the various factors of N. That means the number of the output voltage of the electric energy storage device equals the number of factors of N, except for the lowest low voltage and the highest high voltage, the values in the middle are all medium—voltage values.

The distribution formula corresponding to the 12 energy units in the seventh embodiment is 12=2*2*3. Each level includes two connection modes: parallel and series. When it is in parallel at a level, it can be regarded as level 1. That means 12 energy units include the following combinations: 1*1*1=1, 1*1*3=3, 1*2*1=2, 1*2*3=6, 2*1*1=2, 2*1*3=6, 2*2*1=4, 2*2*3=12, if the repeated values are removed, each factor of 12 can be seen. Therefore, the maximum of the number of the voltage which can be output by the N energy units is the same as the number of factors of N.

For example, as mentioned in the disclosure, when N is 4, the factor of 4 includes 1, 2 and 4, a total of 3, so there are 3 kinds of output voltages. When N is 6, the factors of 6 include 1, 2, 3 and 6, a total of 4, so there are 4 kinds of output voltages. When N is 12, the factors of 12 include 1, 2, 3, 4, 6 and 12, a total of 6, so there are 6 kinds of output voltages. It is understandable that when N is 8, the factors of 8 are 1, 2, 4, and 8, a total of 4, so there should be 4 kinds of output voltages; when N is 9, the factors of 9 are 1, 3, and 9, a total of 3, so there should be 3 kinds of output voltages.

Eighth Embodiment

In the embodiment mentioned above, the energy storage device is provided with an in—module control unit. The eighth embodiment provides another solution without an in—module control unit. Please refer to FIG. 56. The energy storage device includes four energy units and four sockets electrically connected with the four energy units. The socket includes several conductive terminals which are independently arranged, and the several conductive terminals include eight electrode terminals connected to the positive and negative electrodes of the four energy units. Specifically, the eight electrode terminals comprise a first positive terminal 211 and a first negative terminal 212 connected to the positive and negative electrodes of a first energy unit, a second positive terminal 213 and a second negative terminal 214 connected to the positive and negative electrodes of a second energy unit, a third positive terminal 215 and a third negative terminal 216 connected to the positive and negative electrodes of a third energy unit, and a fourth positive terminal 217 and a fourth negative terminal 218 connected to the positive and negative electrodes of a fourth energy unit. The first energy unit and the second energy unit form the first energy module, and the third energy unit and the fourth energy unit form the second energy module The eight electrode terminals are arranged in a straight line. From left to right there are the fourth negative terminal 218, the third negative terminal 216, the second negative terminal 214, the first negative terminal 212, the second positive terminal 213, the third positive terminal 215, the fourth positive terminal 217, and the first positive terminal 211.

It is understandable that the eight electrode terminals can be connected in different ways through connecting to the common inserts, so that the four battery packs can be connected in different ways to obtain different output voltages, which is similar to the four batteries in the first embodiment or the third embodiment. And the difference is that when the energy storage device in the eighth embodiment is in the initial state, each energy unit is independent and is not connected to each other. Only when connected to the plug, there will be a parallel or series connection state among the energy units.

Figure 56:
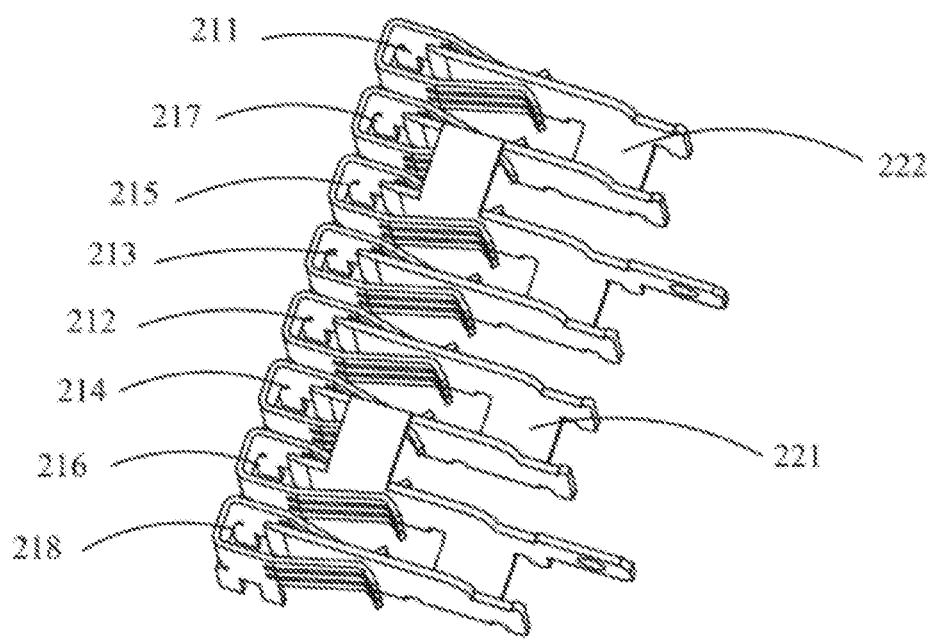
FIG. 56 is a schematic view of the coordination between the conductive terminals of the electric energy storage device and the low-voltage inserts, according to the eighth embodiment.
Figure 57:
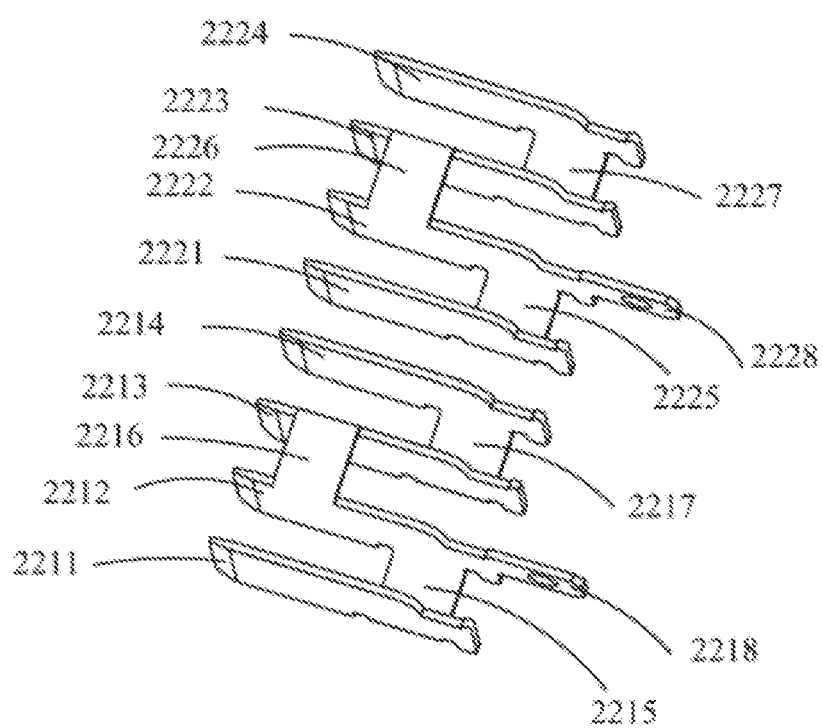
FIG. 57 is a structural view of the low-voltage insert of the low-voltage plug in the eighth embodiment.

FIG. 56 shows that the conductive terminals of the socket of the energy storage device of the disclosure are matched with low—voltage inserts of a low—voltage plug of a low—voltage electric tool. As shown in FIG. 57, the low—voltage plug includes two independent low—voltage inserts 221, 222. The first low—voltage insert 221 includes four contact arms 2211, 2212, 2213, 2214 arranged side by side, three connecting parts 2215, 2216, 2217 which connect two adjacent contact arms and a voltage output part 2218. The second low—voltage insert 222 includes four contact arms 2221, 2222, 2223, 2224 arranged side by side, three connecting parts 2225, 2226, 2227 which connect two adjacent contact arms and a voltage output part 2228.

When the socket is mated with the low—voltage plug, the contact arms 2211, 2212, 2213, and 2214 of the first low—voltage insert 221 are sequentially inserted into the fourth negative terminal 218, the third negative terminal 216, the second negative terminal 214, and the first negative terminal 212, which means connecting these negative poles of the four energy units in parallel. The contact arms 2221, 2222, 2223, and 2224 of the second low—voltage insert 222 are sequentially inserted into the second positive terminal 213, the third positive terminal 215, the fourth positive terminal 217, and the first positive terminal 211, which means connecting these positive poles of four energy units in parallel. Therefore, two low—voltage inserts 221, 222 connect four energy units in parallel, which is equivalent to that the two energy units in two energy modules are connected in parallel, and the two energy modules are also connected in parallel. The energy storage device outputs voltage of nV to the low—voltage electric tools through the two voltages output parts 2218 and 2228.

Figure 58:
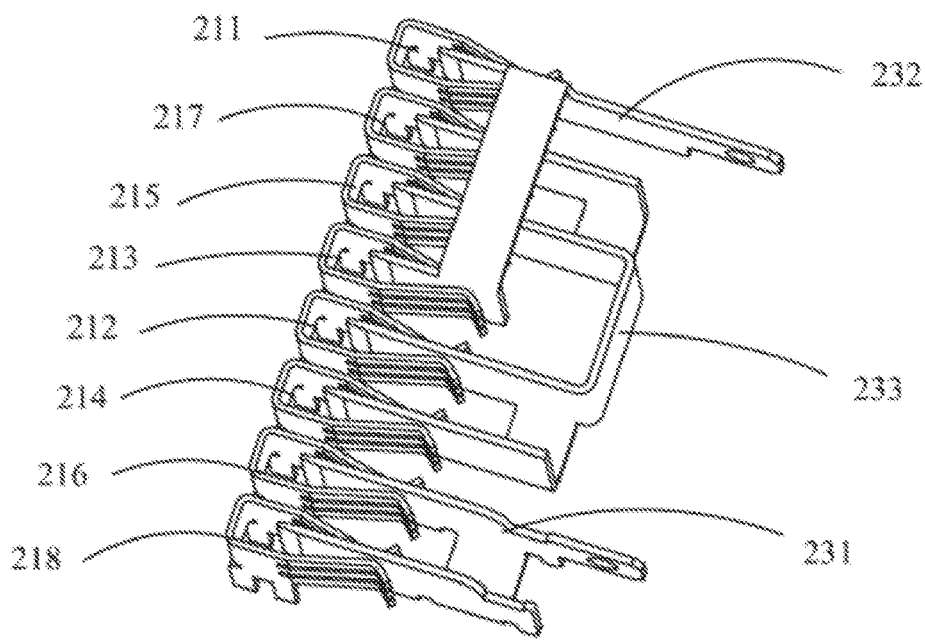
FIG. 58 is a schematic view of the coordination between the conductive terminals of the electric energy storage device and the medium-voltage insert, according to the eighth embodiment.
Figure 59:
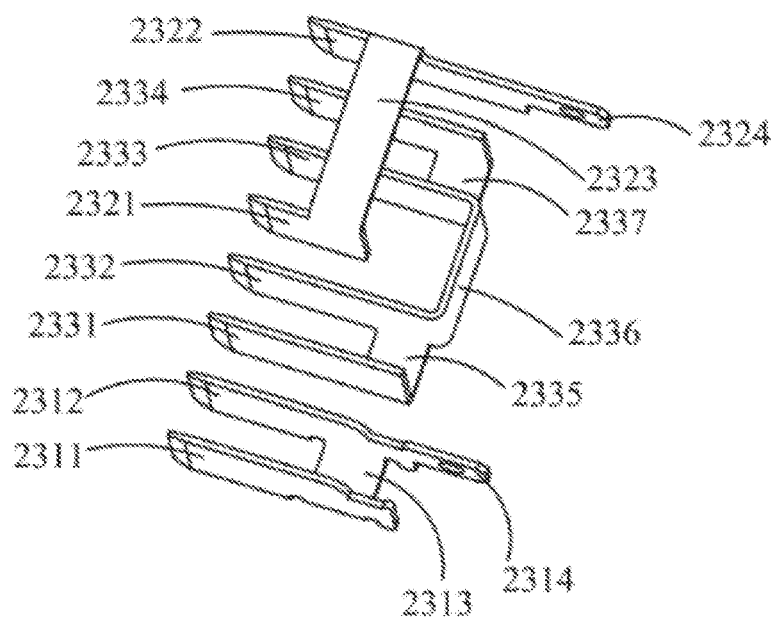
FIG. 59 is a structural view of the medium-voltage insert of the medium-voltage plug in the eighth embodiment.

FIG. 58 shows that the conductive terminals of the socket of the energy storage device of the disclosure can be matched with medium—voltage inserts of a medium—voltage plug of a medium—voltage electric tool As shown in FIG. 59, the medium—voltage plug 230 includes three independent medium—voltage inserts 231, 232, 233 arranged side by side. The first medium—voltage insert 231 includes two contact arms 2311, 2312 arranged oppositely, a connecting part 2313 that connects the contact arms 2311, 2312, and a voltage output part 2314. The second medium—voltage common 232 includes two contact arms 2321, 2322 arranged oppositely, a connecting part 2323 that connects the two contact arms 2321, 2322, and a voltage output portion 2324. The third medium—voltage insert 233 includes four contact arms 2331, 2332, 2333, 2334 arranged side by side, and three connecting parts 2335, 2336, 2337 which connect adjacent contact arms 2331, 2332, 2333, 2334 in pairs.

When the socket is mated with the medium—voltage plug 230, the two contact arms 2311, 2312 of the first medium—voltage insert 231 are respectively inserted into the fourth negative terminal 218 and the third negative terminal 216. The two contact arms 2321, 2322 of the second medium—voltage insert 232 are respectively inserted into the second positive terminal 213 and the first positive terminal 211. The four contact arms 2331, 2332, 2333, and 2334 of the third medium—voltage insert 233 are sequentially inserted into the second negative terminal 214, the first negative terminal 212, the third positive terminal 215, and the fourth positive terminal 217. In this way, it is equivalent to that after connecting the first energy unit and the second energy unit in the first energy module in parallel and connecting the third energy unit and the fourth energy unit in the second energy module in parallel, the first energy module and the second energy module are connected in series. The energy storage device outputs a voltage of 2 nV to the medium—voltage electric tools through the two voltage output units 2314 and 2324.

Figure 60:
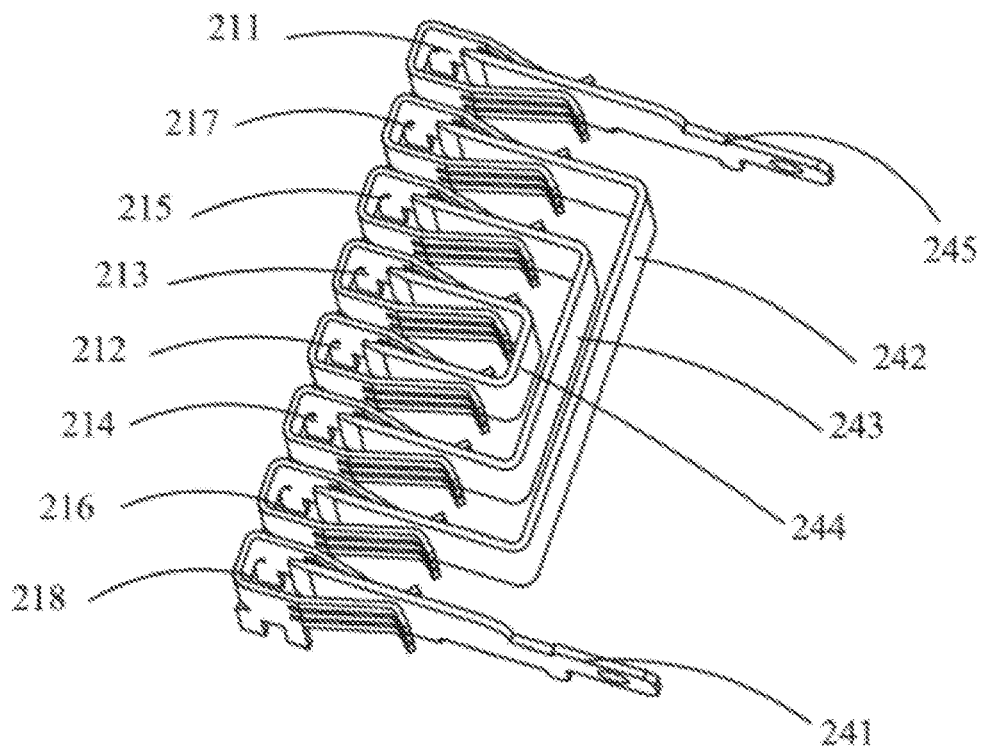
FIG. 60 is a schematic view of the coordination between the conductive terminals of the electric energy storage device and the high-voltage inserts according to the eighth embodiment.
Figure 61:
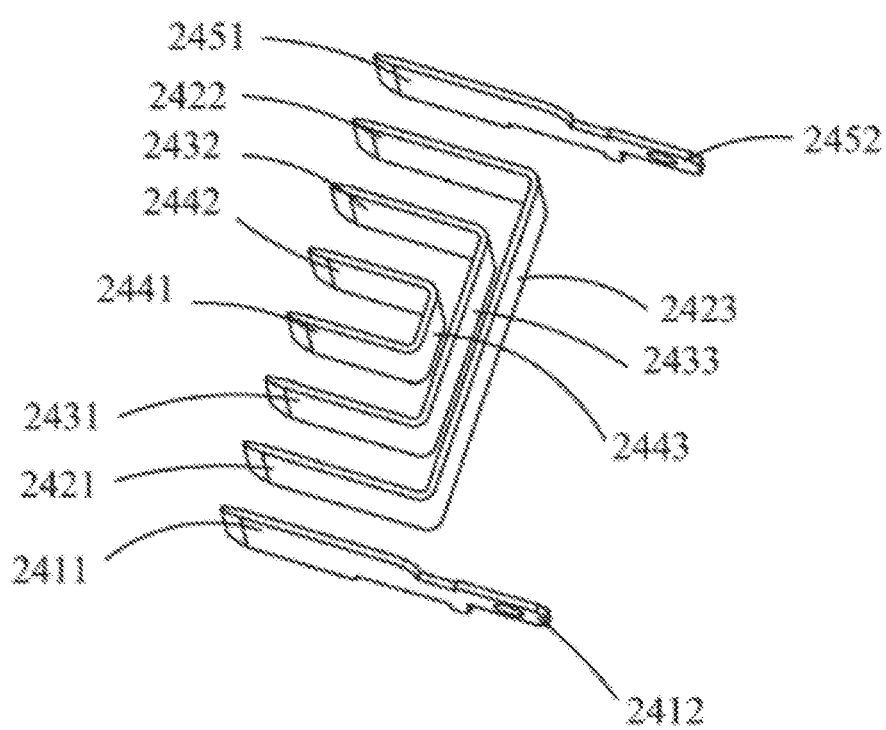
FIG. 61 is a structural view of the high-voltage insert of the high-voltage plug in the eighth embodiment.

FIG. 60 shows that the conductive terminals of the socket of the energy storage device of the disclosure are matched with high—voltage inserts of a high—voltage plug of a high—voltage electric tool. As shown in FIG. 61, the high—voltage plug includes five independent high—voltage inserts 241, 242, 243, 244, 245. The first high—voltage inserts 241 includes a contact arm 2411 and a voltage output part 2412. The fifth high—voltage insert 245 includes a contact arm 2451 and a voltage output part 2452. The second high—voltage insert 242 includes two contact arms 2421, 2422 and a connecting part 2423 which connects the two contact arms 2421, 2422. The third high—voltage insert 243 includes two contact arms 2431, 2432 and a connecting part 2433 which connects the contact arms 2431, 2432. The fourth high—voltage insert 244 includes two contact arms 2441, 2442 and a connecting part 2443 which connects the contact arms 2441, 2442.

When the socket is mated with the high—voltage plug, the first contact arm 2411 of the first high—voltage inserts 241 is inserted into the fourth negative terminal 218, the fifth contact arm 2451 of the fifth high—voltage insert 245 is inserted into the first positive terminal 211. The second contact arms 2421, 2422 of the second high—voltage insert 242 are respectively inserted into the fourth positive terminal 217 and the third negative terminal 216 to connect the third and the fourth energy units in series. The third contact arms 2431, 2432 of the third high—voltage 243 are respectively inserted into the third positive terminal 215 and the second negative terminal 214 to connect the third and second energy units in series. The fourth contact arms 2441 and 2442 of the fourth high—voltage insert 244 are respectively inserted into the second positive terminal 213 and the first negative terminal 212 to connect to the second and the first energy unit in series. That is, the four energy units are connected in series through the first, second, and third high—voltage common inserts 241, 242, and 243. The first contact arm 2411 of the first high—voltage inserts 241 is inserted into the fourth negative terminal 218, and the fifth contact arm 2451 of the fifth high—voltage insert 245 is inserted into the first positive terminal 211. So all four energy units are connected in series, which is equivalent to that the two energy units in the two energy modules are connected in series, and the two energy modules are connected in series. The energy storage device 100 output a voltage of 4 nV to the high—voltage electric tool through two voltage output parts 2412 and 2452.

It should be noted that the specific forms of the in—module control units and inter—module control units are not limited to the normally open switches or normally closed switches mentioned above. All components that can be with the same function are included in this scope.

It should also be noted that, in the first to seventh embodiments mentioned above, the insulating parts used to switch the normally closed switch in the internal switching part and the external switching part can be arranged independently, or be formed integrally, for example, multiple parallel switches are stacked on top of each other so that one insulating part can be used to separate these parallel switches. The insulating part and the conductive part can be molded together, for example, one part is the insulating part which consists of insulating material, and one part is the conductive part which consists of conductive material. The structure of the conductive part and the insulating part is not limited here. What should be just made sure is that the conductive part should be connected to the corresponding normally open switch, and the insulating part should be connected to the corresponding normally closed switch.

The above embodiments are only used to illustrate the technical solutions of the disclosure but not to limit them. Although the disclosure is described in detail with reference to the preferred embodiments, those of ordinary skill in the art should understand that the technical solutions of the disclosure can be modified or equivalently replaced, without departing from the spirit and scope of the technical solution of the disclosure.

What is claimed is:

1. An electric energy storage device, comprising N energy units with a same rated voltage, wherein the N energy units are equally divided into M energy modules, and each energy module includes K energy units, wherein M≥2 and K≥2, the K energy units in each energy module is capable of being switched to connect to each other in series or in parallel; and a socket;

wherein, the rated voltage of each energy unit is nV, the N energy units of the electric energy storage device have four connection states:

wherein, K energy units in the energy module are connected in parallel, and M energy modules are connected in parallel, and an output voltage of the electric energy storage device is nV, or K energy units in the energy module are connected in series, and M energy modules are connected in series and the output voltage is N*nV, or K energy units in the energy module are connected in series, and the M energy modules are connected in parallel and the output voltage is K*nV, or K energy units in the energy module are connected in parallel, and M energy modules are connected in series and the output voltage is M*nV, which means these four connection states provide at least three output voltages.

2. The electric energy storage device according to claim 1, wherein
   the socket includes an in—module control unit corresponding to the energy module, and
   the in—module control unit includes a plurality of parallel switches connecting the K energy units in parallel connection and one or a plurality of series switches connecting the K energy units in series connection corresponding to each of the energy modules,
   when the plurality of the parallel switches is switched on and the one or the plurality of the series switches is switched off, the K energy units are connected in parallel; and
   when the plurality of the parallel switches is switched off and the one or the plurality of the series switches is switched on, the K energy units are connected in series.

3. The electric energy storage device according to claim 2, wherein
   the in—module control unit includes 2*(K−1) parallel switches, and
   the parallel switches are respectively connected to electrodes with a same polarity of the K energy units in pairs; and
   the in—module control unit includes (K−1) series switches, and
   the series switches are respectively connected to electrodes with different polarities of the K energy unit in pairs.

4. The electric energy storage device according to claim 2, wherein
   the parallel switches are normally closed switches, the series switch(es) is a normally open switch, and the K energy units in the energy module are connected in parallel in an initial state; or
   the parallel switches are normally open switch, the series switch(es) is a normally closed switch, and the K energy units in the energy module are connected in series in an initial state.

5. The electric energy storage device according to claim 2, wherein
   the socket further comprises an inter—module control unit,
   the inter—module control unit comprises a parallel switch connecting M of the energy modules in parallel and a series switch connecting M of the energy modules in series;
   when the parallel switch of the inter—module control unit switches on and the series switch of the inter—module control unit switches off, the M energy modules are connected in parallel; and when the parallel switch of the inter—module control unit is switched off and the series switch is switched on, the M energy modules are connected in series.

6. The electric energy storage device according to claim 5, wherein
the socket further comprises two voltage output terminals.

7. The electrical energy storage device according to claim 1, wherein
each of the energy units is provided with a positive electrode and a negative electrode,
the socket includes eight electrode terminals set independently; and
the eight electrode terminals include four positive terminals connected to positive electrodes of the four energy units and four negative terminals connected to negative electrodes of the four energy units.

8. The electric energy storage device of claim 1, wherein a number of output voltage of the electric energy storage device is equal to the number of factors of N.

9. The electrical energy storage device according to claim 8, wherein
when N≥8, the energy units can be equally divided into multi—level modules,
each level of energy modules includes 2 or 3 secondary modules, and energy modules with the lowest level includes 2 or 3 energy units.

10. An electric tool system, comprising an electric tool and an electrical energy storage device, wherein
the electrical energy storage device comprises N energy units with a same rated voltage, the N energy units are equally divided into M energy modules, and each of the energy modules includes K energy units, wherein M≥2 and K≥2; the K energy units in each energy module is capable of being switched to connect to each other in series or in parallel;
the electrical energy storage device further comprises a socket; and
the electric tool is provided with a plug that matches with the socket;
wherein, the rated voltage of each energy unit is nV, the N energy units of the electric energy storage device have four connection states:
wherein, K energy units in the energy module are connected in parallel, and M energy modules are connected in parallel, and an output voltage of the electric energy storage device is nV, or K energy units in the energy module are connected in series, and M energy modules are connected in series and the output voltage is N*nV, or K energy units in the energy module are connected in series, and the M energy modules are connected in parallel and the output voltage is K*nV, or K energy units in the energy module are connected in parallel, and M energy modules are connected in series and the output voltage is M*nV,
which means these four connection states provide at least three output voltages.

11. The electric tool system according to claim 10, wherein
the socket includes an in—module control unit corresponding to each of the energy modules, and
the in—module control unit includes a plurality of parallel switches connecting the K energy units in parallel connection and one or a plurality of series switches connecting the K energy units in series connection;
when the plurality of the parallel switches is switched on and the one or the plurality of the series switches is switched off, the K energy units are connected in parallel; and
when the plurality of the parallel switches is switched off and the one or the plurality of the series switches is switched on, the K energy units are connected in series.

12. The electric tool system according to claim 11, wherein
the plug is provided with an internal switching part;
the internal switching part cooperates with the in—module control unit, and simultaneously switches the parallel connection state and the series connection state of the in—module control unit, which makes the K energy units in the energy module switch from parallel connection to series connection or from series connection to parallel connection.

13. The electric tool system according to claim 12, wherein
the internal switching part includes an insulating part and a conductive part, wherein
one kind of the parallel switch and the series switch of the in—module control unit is initially closed and disconnected by the insulating part, and the other one is initially opened and connected by the conductive part.

14. The electric tool system according to claim 11, wherein
the socket further comprises an inter—module control unit which comprises a parallel switch connecting M of the energy modules in parallel and a series switch connecting M of the energy modules in series;
when the parallel switch is switched on and the series switch is switched off, M of the energy modules are connected in parallel; and
when the parallel switch is switched off and the series switch is switched on, M of the energy modules are connected in series.

15. The electric tool system according to claim 14, wherein
the plug is provided with an external switching part;
the external switching part cooperates with the inter—module control unit and switches connection states of the parallel switch and the series switch of the inter—module control unit, which makes the M energy units switch from parallel to series or from series to parallel.

16. The electric tool system according to claim 15, wherein
the external switching part includes an insulating part and a conductive part,
wherein one kind of the parallel switch and the series switch of the inter—module control unit is initially closed and disconnected by the insulating part, and the other one is initially opened and connected by the conductive part.

17. The electric tool system according to claim 10, wherein
each of the energy modules is provided with a positive electrode and a negative electrode,
the socket includes 2*M voltage output terminals which respectively connected to the positive electrode and the negative electrode of the energy modules, and
the plug is provided with a connecting piece connected with the voltage output terminal, and a series or a parallel connection between the M energy modules can be determined by the connecting piece.

18. An electric tool system, comprising a low—voltage electric tool, a medium—voltage electric tool and a high—voltage electric tool, wherein:

the electric tool system comprises an electric energy storage device having

N energy units with a same rated voltage, wherein the N energy units are equally divided into M energy modules, and each energy module includes K energy units, Wherein M≥2 and K≥2, the K energy units in each energy module is capable of being switched to connect to each other in series or in parallel;

and a socket;

wherein, the rated voltage of each energy unit is nV, the N energy units of the electric energy storage device have four connection states:

wherein, K energy units in the energy module are connected in parallel, and M energy modules are connected in parallel, and an output voltage of the electric energy storage device is nV, or K energy units in the energy module are connected in series, and M energy modules are connected in series and the output voltage is N*nV, or K energy units in the energy module are connected in series, and the M energy modules are connected in parallel and the output voltage is K*nV, or K energy units in the energy module are connected in parallel, and M energy modules are connected in series and the output voltage is M*nV, which means these four connection states provide at least three output voltages;

the low—voltage electric tool is provided with a low—voltage plug which is connected with the socket and makes the N energy units in a full parallel connection state, the medium—voltage electric tool is provided with a medium—voltage plug which is connected to the socket and makes the N energy units in a medium—voltage state, the high—voltage electric tool is provided with a high—voltage plug which is connected to the socket and makes the N energy units in a full series connection state.

19. The electric tool system according to claim 18, further comprising:

a low—voltage battery pack connected with the low—voltage electric tool, a medium—voltage battery pack connected with the medium—voltage electric tool, or a high—voltage battery pack connected with the high—voltage electric tool.

* * * * *